(12) United States Patent
Kim et al.

(10) Patent No.: US 11,614,844 B2
(45) Date of Patent: Mar. 28, 2023

(54) TOUCH INPUT DEVICE

(71) Applicant: HiDeep Inc., Seongnam-si (KR)

(72) Inventors: Seyeob Kim, Seongnam-si (KR);
Bonkee Kim, Seongnam-si (KR);
Jongsik Kim, Seongnam-si (KR);
Young Ho Cho, Seongnam-si (KR)

(73) Assignee: HiDeep Inc.

( * ) Notice: Subject to any disclaimer, the term of this patent is extended or adjusted under 35 U.S.C. 154(b) by 0 days.

(21) Appl. No.: 17/105,691

(22) Filed: Nov. 27, 2020

(65) Prior Publication Data

US 2021/0191575 A1 Jun. 24, 2021

(30) Foreign Application Priority Data

Nov. 27, 2019 (KR) .......................... 10-2019-0154921

(51) Int. Cl.
*G06F 3/044* (2006.01)
*G06F 3/041* (2006.01)
(52) U.S. Cl.
CPC ............ *G06F 3/0447* (2019.05); *G06F 3/044* (2013.01); *G06F 3/0418* (2013.01); *G06F 3/0445* (2019.05); *G06F 3/0446* (2019.05); *G06F 3/0448* (2019.05); *G06F 3/04186* (2019.05); *G06F 2203/04104* (2013.01); *G06F 2203/04106* (2013.01)
(58) Field of Classification Search
CPC .... G06F 3/0447; G06F 3/0418; G06F 3/0445; G06F 3/04186; G06F 3/0446; G06F 3/0448; G06F 3/0443; G06F 3/044; G06F 2203/04104; G06F 2203/04106
See application file for complete search history.

(56) References Cited

U.S. PATENT DOCUMENTS

2013/0173211 A1* 7/2013 Hoch .................... G06F 3/0445
702/150
2013/0181942 A1* 7/2013 Bulea .................... G06F 3/0448
345/174
(Continued)

FOREIGN PATENT DOCUMENTS

KR 10-2015-0114405 10/2015
KR 10-2016-0057572 5/2016
KR 10-2020-0089537 7/2020

OTHER PUBLICATIONS

European Search Report issued in connection with corresponding EP Patent Application No. 20210065.7-1231, dated Apr. 23, 2021, pp. 1-7.

*Primary Examiner* — Patrick N Edouard
*Assistant Examiner* — Joseph P Fox
(74) *Attorney, Agent, or Firm* — The Belles Group, P.C.

(57) ABSTRACT

Disclosed is a touch input device including: a touch sensor including a plurality of electrodes; a drive unit configured to apply a driving signal to at least some of the plurality of electrodes of the touch sensor; a touch signal detection unit configured to detect a touch-position-related signal related to a touch position of an object inputted to the touch surface from at least some of the plurality of electrodes of the touch sensor; and an LGM disturbance signal detection unit configured to detect an LGM-disturbance-signal-related signal related to an LGM disturbance signal generated from the touch surface from at least some of the plurality of electrodes of the touch sensor.

15 Claims, 58 Drawing Sheets

(56) References Cited

U.S. PATENT DOCUMENTS

| | | |
|---|---|---|
| 2015/0277618 A1 | 10/2015 | Bulea |
| 2016/0179283 A1 | 6/2016 | Hoch |
| 2016/0266710 A1* | 9/2016 | Bytheway ............. G06F 3/0446 |
| 2018/0004338 A1 | 1/2018 | Khazeni et al. |
| 2018/0321793 A1 | 11/2018 | Kim et al. |

* cited by examiner

| | RX0 | RX1 | RX2 | RX3 | RX4 | RX5 | RX6 | RX7 | RX8 | RX9 | RX10 | RX11 | RX12 | RX13 | RX14 | RX15 | RX16 | RX17 | RX18 | RX19 | RX20 | RX21 | RX22 | RX23 | RX24 | RX25 | RX26 | RX27 | RX28 | RX29 | RX30 | RX31 | RX32 | RX33 |
|---|---|---|---|---|---|---|---|---|---|---|---|---|---|---|---|---|---|---|---|---|---|---|---|---|---|---|---|---|---|---|---|---|---|---|
| TX0 | -3 | -2 | -1 | -3 | -1 | -1 | -2 | -2 | -2 | -1 | -1 | -1 | 0 | -1 | -1 | 3 | 9 | 12 | 13 | 12 | 10 | 0 | 0 | -1 | 0 | -1 | -2 | 0 | -3 | -3 | -4 | -5 | -4 | -2 |
| TX1 | -4 | -3 | -2 | -3 | -2 | -3 | -1 | -2 | -2 | -2 | -2 | -2 | -2 | -2 | -2 | 5 | 6 | 13 | 14 | 14 | 9 | 2 | -2 | -1 | -1 | -1 | -3 | -2 | -4 | -4 | -5 | -5 | -5 | -1 |
| TX2 | -4 | -3 | -3 | -4 | -2 | -3 | -4 | -3 | -3 | -3 | -3 | -3 | -3 | -2 | -2 | 6 | 12 | 15 | 15 | 15 | 10 | 1 | -1 | -2 | 0 | 0 | -1 | 0 | -3 | -4 | -6 | -5 | -6 | -1 |
| TX3 | -3 | -3 | -2 | -3 | -3 | -2 | -2 | -2 | -3 | -3 | -2 | -2 | -2 | -1 | 0 | 5 | 12 | 16 | 16 | 14 | 11 | -1 | 1 | 0 | 1 | 0 | -1 | -1 | -2 | -3 | -5 | -5 | -4 | -3 |
| TX4 | -2 | -2 | -2 | -1 | -2 | -1 | 0 | 0 | 0 | 0 | 0 | -1 | 0 | 0 | 1 | 28 | 44 | 59 | 65 | 53 | 11 | 1 | 1 | 0 | 0 | 0 | 2 | 1 | 0 | 0 | -2 | -2 | -4 | -2 |
| TX5 | -2 | -1 | -1 | -1 | -1 | -1 | -1 | 0 | 0 | 0 | 0 | -2 | -2 | -1 | 4 | 33 | 62 | 131 | 178 | 104 | 23 | 7 | 6 | 5 | 5 | 5 | 2 | 1 | 0 | 0 | -2 | -2 | -3 | 2 |
| TX6 | 0 | 1 | 1 | -3 | 1 | 2 | 2 | 3 | 3 | 0 | 0 | 1 | 4 | 4 | 9 | 16 | 63 | 207 | 264 | 244 | 54 | 14 | 9 | 9 | 8 | 8 | 8 | 8 | 7 | 6 | 6 | 5 | 6 | 6 |
| TX7 | 3 | 3 | 4 | 3 | 4 | 5 | 6 | 7 | 6 | 4 | 4 | 5 | 8 | 10 | 15 | 34 | 204 | 273 | 263 | 253 | 104 | 19 | 15 | 14 | 12 | 12 | 11 | 10 | 8 | 8 | 8 | 9 | 11 | 11 |
| TX8 | 2 | 2 | 2 | -3 | 4 | 3 | 5 | 5 | 4 | 6 | 7 | 8 | 9 | 11 | 16 | 63 | 263 | 278 | 269 | 239 | 52 | 14 | 12 | 11 | 9 | 11 | 11 | 11 | 8 | 9 | 9 | 10 | 11 | 11 |
| TX9 | 1 | 1 | 1 | -4 | 2 | 2 | 3 | 3 | 3 | 3 | 4 | 6 | 6 | 6 | 13 | 48 | 246 | 276 | 276 | 228 | 14 | 8 | 7 | 7 | 6 | 6 | 4 | 4 | 1 | 3 | 2 | 4 | 4 | 5 |
| TX10 | -3 | -4 | -3 | -4 | -3 | -4 | -5 | -3 | -2 | -1 | 0 | -3 | -1 | -1 | 1 | 19 | 102 | 149 | 62 | 23 | 6 | 3 | 1 | 2 | 2 | 4 | 2 | 0 | -1 | -1 | -1 | -1 | -2 | -1 |
| TX11 | -4 | -5 | -4 | -5 | -4 | -5 | -4 | -4 | -4 | -4 | -5 | -3 | -3 | -3 | 2 | 6 | 42 | 50 | 37 | 21 | 2 | 0 | -2 | -1 | -1 | -4 | -6 | -6 | -5 | -5 | -5 | -5 | -5 | -4 |
| TX12 | -3 | -4 | -4 | -4 | -3 | -3 | -3 | -3 | -3 | -4 | -4 | -3 | -3 | -2 | 2 | 7 | 36 | 41 | 33 | 17 | 2 | 0 | 0 | -1 | -1 | -1 | -4 | -4 | -4 | -5 | -5 | -5 | -3 | -3 |
| TX13 | -3 | -3 | -3 | -4 | -3 | -3 | -3 | -3 | -3 | -3 | -3 | -2 | -1 | -1 | 0 | 9 | 9 | 7 | 7 | 4 | -1 | -1 | -2 | -1 | -2 | -2 | -3 | -2 | -6 | -3 | -5 | -4 | -3 | -2 |
| TX14 | -3 | -2 | -3 | -3 | -2 | -3 | -3 | -3 | -3 | -2 | -2 | -2 | -1 | -1 | -1 | 8 | 8 | 6 | 6 | 5 | 0 | 1 | -1 | -1 | -2 | -2 | -2 | -2 | -5 | -3 | -2 | -3 | -3 | -2 |
| TX15 | -2 | -3 | -3 | -4 | -3 | -2 | -2 | -3 | -3 | -2 | -2 | -2 | -2 | -2 | -2 | 8 | 9 | 5 | 5 | 3 | 0 | -1 | -3 | -3 | -3 | -3 | -2 | -2 | -4 | -2 | -3 | -2 | -2 | -1 |
| TX16 | -2 | -3 | -3 | -4 | -4 | -2 | -3 | -2 | -2 | -2 | -2 | -3 | -2 | -2 | -2 | 8 | 8 | 2 | 4 | 2 | -3 | -3 | -3 | -3 | -3 | -3 | -3 | -3 | -3 | -2 | 0 | -1 | -1 | -2 |

| | A1 | B1 | A2 | B2 | A3 | B3 | A4 | B4 | A5 | B5 | A6 | B6 | A7 | B7 | A8 | B8 | A9 |
|---|---|---|---|---|---|---|---|---|---|---|---|---|---|---|---|---|---|
| Set | 0 | 0 / 15 | 0 | 1 / 14 | 0 | 2 / 13 | 0 | 3 / 12 | 0 | 4 / 11 | 0 | 5 / 10 | 0 | 6 / 9 | 0 | 7 / 8 | 0 |
| | 1 | 0 / 15 | 1 | 1 / 14 | 1 | 2 / 13 | 1 | 3 / 12 | 1 | 4 / 11 | 1 | 5 / 10 | 1 | 6 / 9 | 1 | 7 / 8 | 1 |
| | 2 | 0 / 15 | 2 | 1 / 14 | 2 | 2 / 13 | 2 | 3 / 12 | 2 | 4 / 11 | 2 | 5 / 10 | 2 | 6 / 9 | 2 | 7 / 8 | 2 |
| | 3 | 0 / 15 | 3 | 1 / 14 | 3 | 2 / 13 | 3 | 3 / 12 | 3 | 4 / 11 | 3 | 5 / 10 | 3 | 6 / 9 | 3 | 7 / 8 | 3 |

| Grip | Floating |
|---|---|
| | |

Fig. 47

TOUCH INPUT DEVICE

CROSS-REFERENCE TO RELATED APPLICATIONS

This application claims priority to and the benefit of Korean Patent Application No. 10-2019-0154921 filed in the Korean Intellectual Property Office on Nov. 27, 2019, the entire contents of which are incorporated herein by reference.

TECHNICAL FIELD

The present invention relates to a touch input device, and more particularly, to a touch input device including a touch sensor capable of accurately detecting whether an inputted object touches a touch surface and/or a touch position at which a touch is made even in a situation in which the touch input device is in a state in which the touch input device is affected by low ground mass (LGM).

BACKGROUND ART

Various types of input devices are used to manipulate computing systems. For example, the input devices such as a button, a key, a joystick, and a touch screen are used. There is increasing use of the touch screens for manipulating the computing systems because the touch screen is easy and convenient to manipulate.

The touch screen may constitute a touch surface of a touch input device including a touch sensor panel that may be a transparent panel having a touch-sensitive surface. The touch sensor panel is attached to a front surface of a display screen so that the touch-sensitive surface may cover a visible surface of the display screen. A user may manipulate the computing system by simply touching the touch screen with a finger or the like. In general, the computing system recognizes a touch and a touch position on the touch screen and analyzes the touch, thereby performing an arithmetic operation.

In a case in which a driving electrode and a receiving electrode are implemented to have a single layer or a double layer, the touch input device, such as a smartphone, mounted with the touch sensor may be sometimes affected by low ground mass (LGM) when a user touches the touch input device in a state (floating state) in which the user does not hold the touch input device with his/her hand. For example, a signal, which needs to be normally detected, disappears or a signal, which needs to be detected, is split, and as a result, the signal sometimes shows that two or more points are touched. Korean Patent Application No. 10-2019-0006389 filed by the applicant of the present application discloses in detail the influence of the LGM.

SUMMARY OF THE INVENTION

The present invention has been made in an effort to provide a touch sensor and a touch input device including the touch sensor, which are capable of detecting a touch signal even in a state in which the touch input device is affected by LGM, like or similar to a state in which the touch input device is not affected by the LGM.

The present invention has also been made in an effort to provide a touch sensor and a touch input device including the touch sensor, which are capable of recognizing two or more multiple touches even in a state in which the touch input device is affected by LGM.

The present invention has also been made in an effort to provide a touch sensor and a touch input device including the touch sensor, which are capable of recognizing a third touch ($3^{rd}$ Touch) touched together with cross touches even in a state in which the touch input device is affected by LGM.

An exemplary embodiment of the present invention provides a touch input device having a touch surface, the touch input device including: a touch sensor including a plurality of electrodes; a drive unit configured to apply a driving signal to at least some of the plurality of electrodes of the touch sensor; a touch signal detection unit configured to detect a touch-position-related signal related to a touch position of an object inputted to the touch surface from at least some of the plurality of electrodes of the touch sensor; and an LGM disturbance signal detection unit configured to detect an LGM-disturbance-signal-related signal related to an LGM disturbance signal generated from the touch surface from at least some of the plurality of electrodes of the touch sensor.

The touch-position-related signal may include information about the amount of change in mutual capacitance made by the object between at least some of the plurality of electrodes, and the LGM-disturbance-signal-related signal may include information about capacitance that reduces the amount of change in mutual capacitance generated by coupling between the object and at least some of the plurality of electrodes.

The touch-position-related signal may include information about capacitance that reduces the amount of change in mutual capacitance generated by coupling between the object and at least some of the plurality of electrodes.

The LGM-disturbance-signal-related signal may not include information about the amount of change in mutual capacitance between at least some of the plurality of electrodes.

The touch input device may further include a control unit configured to inhibit the LGM-disturbance-signal-related signal from the touch-position-related signal.

The touch signal detection unit may convert the touch-position-related signal into a digital signal and output the digital signal, the LGM disturbance signal detection unit may convert the LGM-disturbance-signal-related signal into a digital signal and output the digital signal, and the control unit may inhibit the LGM-disturbance-signal-related signal, which is converted into the digital signal, from the touch-position-related signal, which is converted into the digital signal.

The touch sensor may include a plurality of driving electrodes and a plurality of touch signal detection electrodes, the touch signal detection unit may detect the touch-position-related signal related to the touch position of the object inputted to the touch surface from at least one touch signal detection electrode, among the plurality of touch signal detection electrodes, which forms mutual capacitance with at least one of the plurality of driving electrodes, and the LGM disturbance signal detection unit may detect the LGM-disturbance-signal-related signal from at least another touch signal detection electrode, among the plurality of touch signal detection electrodes, which does not form mutual capacitance with at least one driving electrode.

The touch-position-related signal may include information about capacitance that reduces the mutual capacitance generated by at least one of coupling between the object and at least one driving electrode and coupling between the object and at least one touch signal detection electrode, and the LGM-disturbance-signal-related signal may include information about capacitance that reduces the mutual capacitance generated by at least one of coupling between the object and at least one driving electrode and coupling between the object and at least another touch signal detection electrode.

The touch input device may further include a control unit configured to inhibit the LGM-disturbance-signal-related signal from the touch-position-related signal.

At least one touch signal detection electrode may be disposed to be adjacent to at least one driving electrode, and at least another touch signal detection electrode may be disposed to be spaced apart from at least one driving electrode at a predetermined distance and connected to a channel different from a channel to which at least one touch signal detection electrode is connected.

At least one of the driving electrodes disposed between at least one touch signal detection electrode and at least another touch signal detection electrode may be set to be grounded, or at least one touch signal detection electrode may be set to be grounded.

A sum of an area of at least another touch signal detection electrode may be equal to a sum of an area of at least one touch signal detection electrode.

The touch sensor may include a plurality of driving electrodes, a plurality of touch signal detection electrodes, and a plurality of LGM disturbance signal detection electrodes, the touch signal detection unit may detect the touch-position-related signal related to the touch position of the object inputted to the touch surface from at least one touch signal detection electrode, among the plurality of touch signal detection electrodes, which forms mutual capacitance with at least one of the plurality of driving electrodes, and the LGM disturbance signal detection unit may detect the LGM-disturbance-signal-related signal from at least one LGM disturbance signal detection electrode, among the plurality of LGM disturbance signal detection electrodes, which does not form mutual capacitance with at least one driving electrode.

According to the exemplary embodiment, the touch-position-related signal may include information about capacitance that reduces the mutual capacitance generated by at least one of coupling between the object and at least one driving electrode and coupling between the object and at least one touch signal detection electrode, and the LGM-disturbance-signal-related signal may include information about capacitance that reduces the mutual capacitance generated by at least one of coupling between the object and at least one driving electrode and coupling between the object and at least one LGM disturbance signal detection electrode.

The touch input device may further include a control unit configured to inhibit the LGM-disturbance-signal-related signal from the touch-position-related signal.

Each of the plurality of LGM disturbance signal detection electrodes may be disposed in each of the plurality of touch signal detection electrodes.

A center of each of the plurality of LGM disturbance signal detection electrodes and a center of each of the plurality of touch signal detection electrodes may be coincident.

A sum of areas of the plurality of LGM disturbance signal detection electrodes may be equal to a sum of areas of the plurality of touch signal detection electrodes.

Each of the plurality of LGM disturbance signal detection electrodes may be formed by removing a part of an inner portion of each of the plurality of touch signal detection electrodes.

At least one touch signal detection electrode may be disposed between at least one driving electrode and at least one LGM disturbance signal detection electrode, and at least one touch signal detection electrode may be set to be grounded.

The plurality of touch signal detection electrodes and the plurality of LGM disturbance signal detection electrodes may be disposed on a layer different from a layer on which the plurality of driving electrodes is disposed, and a first region in which the plurality of driving electrodes overlaps the plurality of touch signal detection electrodes may be larger than a second region in which the plurality of driving electrodes overlaps the plurality of LGM disturbance signal detection electrodes.

Each of the plurality of LGM disturbance signal detection electrodes may be disposed in each of the plurality of touch signal detection electrodes.

A center of each of the plurality of LGM disturbance signal detection electrodes and a center of each of the plurality of touch signal detection electrodes may be coincident.

A sum of areas of the plurality of LGM disturbance signal detection electrodes may be equal to a sum of areas of the plurality of touch signal detection electrodes.

Each of the plurality of LGM disturbance signal detection electrodes may be formed by removing a part of an inner portion of each of the plurality of touch signal detection electrodes.

At least one touch signal detection electrode may be disposed between at least one driving electrode and at least one LGM disturbance signal detection electrode, and at least one touch signal detection electrode may be set to be grounded.

The plurality of touch signal detection electrodes and the plurality of LGM disturbance signal detection electrodes may be disposed on a layer different from a layer on which the plurality of driving electrodes is disposed, and a first region in which the plurality of driving electrodes overlaps the plurality of touch signal detection electrodes may be larger than a second region in which the plurality of driving electrodes overlaps the plurality of LGM disturbance signal detection electrodes.

Each of the plurality of LGM disturbance signal detection electrodes may be disposed in each of the plurality of touch signal detection electrodes.

A center of each of the plurality of LGM disturbance signal detection electrodes and a center of each of the plurality of touch signal detection electrodes may be coincident.

A sum of areas of the plurality of LGM disturbance signal detection electrodes may be equal to a sum of areas of the plurality of touch signal detection electrodes.

A width of the first region may be larger than a width of the second region.

According to the exemplary embodiment, the touch sensor may include a plurality of driving electrodes and a plurality of touch signal detection electrodes, the touch signal detection unit may detect the touch-position-related signal related to the touch position of the object inputted to the touch surface from at least one touch signal detection electrode, among the plurality of touch signal detection electrodes, which forms mutual capacitance with at least one of the plurality of driving electrodes, and the LGM disturbance signal detection unit may detect the LGM-disturbance-signal-related signal from at least one touch signal detection electrode, among the plurality of touch signal detection electrodes, which does not form mutual capacitance with at least another of the plurality of driving electrodes.

The touch-position-related signal may include information about capacitance that reduces the mutual capacitance generated by at least one of coupling between the object and at least one driving electrode and coupling between the object and at least one touch signal detection electrode, and the LGM-disturbance-signal-related signal may include information about capacitance that reduces the mutual capacitance generated by at least one of coupling between the object and at least another driving electrode and coupling between the object and at least one touch signal detection electrode.

Another exemplary embodiment of the present invention provides a touch input device having a touch surface, the touch input device including: a touch sensor including a plurality of first electrode columns having a plurality of first electrodes, and a plurality of second electrode columns having a plurality of second electrodes; in which in a first touch region of the touch sensor, at least two second electrodes included in the second electrode column, which is any one of the plurality of second electrode columns, are disposed to be adjacent in a column direction so as to correspond to the first electrode included in the first electrode column, which is any one of the plurality of first electrode columns, in which in a second touch region adjacent to the first touch region in a row direction, at least two other second electrodes included in the second electrode column are disposed to be adjacent in the column direction so as to correspond to another first electrode included in the first electrode column, in which the second electrode, which is disposed first in the row direction among at least two second electrodes included in the second touch region, is connected, with one trace, to the second electrode disposed immediately before the second electrode, which is disposed lastly in the row direction among at least two second electrodes disposed in the first touch region, in which the second electrode, which is disposed second in the row direction among at least two second electrodes disposed in the second touch region, is connected, with one trace, to the second electrode, which is disposed lastly in the row direction among at least two second electrodes disposed in the first touch region, and in which any one of the remaining second electrodes, which are disposed in the row direction among at least two second electrodes disposed in the second touch region, is connected with one trace, to the second electrode, which is disposed to be symmetrical with any one of the remaining second electrodes in the first touch region.

The touch input device may further include: a touch signal detection unit configured to detect a touch-position-related signal related to a touch position of an object inputted to the touch surface from the first electrode which is included in the first electrode column and forms mutual capacitance with at least one second electrode among at least two second electrodes included in the second electrode column; and an LGM disturbance signal detection unit configured to detect an LGM-disturbance-signal-related signal from the first electrode, which does not form mutual capacitance with at least one second electrode among the first electrodes included in the first electrode column and another first electrode column.

The touch-position-related signal may include information about capacitance that reduces the mutual capacitance generated by coupling between the object, at least one second electrode, and the first electrode included in the first electrode column, and the LGM-disturbance-signal-related signal may include information about capacitance that reduces the mutual capacitance generated by coupling between the object, at least one second electrode, and the first electrode included in another first electrode column.

Still another exemplary embodiment of the present invention provides a touch input device having a touch surface, the touch input device including: a touch sensor including a plurality of first electrode columns having a plurality of first electrodes, and a plurality of second electrode columns having a plurality of second electrodes; in which in a first touch region of the touch sensor, a first electrode set and a second electrode set included in the second electrode column, which is any one of the plurality of second electrode columns, are disposed to be adjacent in a column direction so as to correspond to the first electrode included in the first electrode column, which is any one of the plurality of first electrode columns, in which each of the first electrode set and the second electrode set comprises at least two second electrodes, in which in a second touch region adjacent to the first touch region in a row direction, a third electrode set and a fourth electrode set included in the second electrode column are disposed to be adjacent in the column direction so as to correspond to another first electrode included in the first electrode column, in which each of the third electrode set and the fourth electrode set comprises at least two second electrodes, in which any one of at least two second electrodes included in the third electrode set is connected, with one trace, to the second electrode disposed at a position symmetrical, in the row direction, with any one of at least two second electrodes in the first electrode set, and in which any one of at least two second electrodes included in the fourth electrode set is connected, with one trace, to the second electrode disposed at a position symmetrical, in the row direction, with any one of at least two second electrodes in the second electrode set.

The touch input device may further include: a touch signal detection unit configured to detect a touch-position-related signal related to a touch position of an object inputted to the touch surface from the first electrode which is included in the first electrode column and forms mutual capacitance with at least one second electrode among at least two second electrodes included in the second electrode column; and an LGM disturbance signal detection unit configured to detect an LGM-disturbance-signal-related signal from the first electrode, which does not form mutual capacitance with at least one second electrode among the first electrodes included in the first electrode column and another first electrode column.

The touch-position-related signal may include information about capacitance that reduces the mutual capacitance generated by at least one of coupling between the object and at least one second electrode and coupling between the object and the first electrode included in the first electrode column, and the LGM-disturbance-signal-related signal may include information about capacitance that reduces the mutual capacitance generated by at least one of coupling between the object and at least one second electrode and coupling between the object and the first electrode included in another first electrode column.

Yet another exemplary embodiment of the present invention provides a touch input device having a touch surface, the touch input device including: a touch sensor including a plurality of first electrode columns having a plurality of first electrodes, and a plurality of second electrode columns having a plurality of second electrodes; in which a second electrode column is disposed at one side based on the first electrode column, which is any one of the plurality of first electrode columns, and another second electrode column is disposed at the other side, in which a second electrode included in the second electrode column and another second electrode included in another second electrode column constitute the same channel based on any one first electrode included in the first electrode column, and in which the first electrode constitutes the same channel with some of the first electrodes disposed in the same row as the first electrode.

A second-1 electrode and a second-2 electrode, which are included in the second electrode column, may be disposed at one side based on the first electrode, a second-3 electrode and a second-4 electrode, which are included in another second electrode column, may be disposed at the other side based on the first electrode, the second-1 electrode and the second-3 electrode may constitute the same channel, and the second-2 electrode and the second-4 electrode may constitute the same channel.

Some of the first electrodes and the first electrode may be half in number of the first electrodes disposed in the same row.

A second-1 electrode and a second-2 electrode, which are included in the second electrode column, may be disposed to be adjacent to one side so as to correspond to the first electrode included in the first electrode column, a second-3 electrode and a second-4 electrode, which are included in the second electrode column, may be disposed to be adjacent to one side so as to correspond to another first electrode included in the first electrode column, the second-1 electrode and the second-3 electrode may be connected with one second trace, and the second-2 electrode and the second-4 electrode may be connected with another second trace.

A second-1 electrode and a second-2 electrode, which are included in the second electrode column, may be disposed to be adjacent to one side so as to correspond to the first electrode included in the first electrode column, a second-3 electrode and a second-4 electrode, which are included in the second electrode column, may be disposed to be adjacent to one side so as to correspond to another first electrode included in the first electrode column, the second-1 electrode and the second-4 electrode may be connected with one second trace, and the second-2 electrode and the second-3 electrode may be connected with another second trace.

A second-1 electrode and a second-2 electrode, which are included in the second electrode column, may be disposed to be adjacent to one side so as to correspond to the first electrode included in the first electrode column, the second-2 electrode and a second-3 electrode, which are included in the second electrode column, may be disposed to be adjacent to one side so as to correspond to another first electrode included in the first electrode column, and the second-1 electrode and the second-3 electrode may be connected with one second trace.

A second-1 electrode and a second-2 electrode, which are included in the second electrode column, may be disposed to be adjacent to one side so as to correspond to the first electrode included in the first electrode column, the second-2 electrode and a second-3 electrode, which are included in the second electrode column, may be disposed to be adjacent to one side so as to correspond to another first electrode included in the first electrode column, the second-3 electrode and a second-4 electrode, which are included in the second electrode column, may be disposed to be adjacent to one side so as to correspond to still another first electrode included in the first electrode column, the second-1 electrode and the second-3 electrode may be connected with one second trace, the second-2 electrode and the second-4 electrode may be connected with another second trace, a second-1' electrode and a second-2' electrode, which are included in another second electrode column, may be disposed to be adjacent to the other side so as to correspond to the first electrode included in the first electrode column, the second-2' electrode and a second-3 electrode, which are included in another second electrode column, may be disposed to be adjacent to the other side so as to correspond to another first electrode included in the first electrode column, the second-3' electrode and a second-4' electrode, which are included in another second electrode column, may be disposed to be adjacent to the other side so as to correspond to still another first electrode included in the first electrode column, the second-1' electrode and the second-3' electrode may be connected with one second trace, and the second-2' electrode and the second-4' electrode may be connected with another second trace.

One side may correspond to one of left and right sides based on the first electrode, the other side may correspond to the other of the left and right sides based on the first electrode, and at least one of a part of one second trace and a part of another second trace may be disposed above the first electrode.

The first electrode and some of the first electrodes disposed in the same row as the first electrode may constitute the same channel electrodes, and all of the same channel electrodes may be connected with one first trace.

The same row may be a first row of the touch sensor, and one first trace may be disposed above the touch sensor.

The first electrode and some of the first electrodes disposed in the same row as the first electrode may constitute the same channel electrodes, and some of the same channel electrodes may be connected with one first trace.

The same row may be a first row of the touch sensor, and one first trace may be disposed above the touch sensor.

The first electrode and some of the first electrodes disposed in the same row as the first electrode may constitute the same channel electrodes, and some of the same channel electrodes may be connected with one first trace.

The same row may be a first row of the touch sensor, and one first trace may be disposed above the touch sensor.

The touch input device may further include: a touch signal detection unit configured to detect a touch-position-related signal related to a touch position of an object inputted to the touch surface from the second electrode and another second electrode which form mutual capacitance with the first electrode; and an LGM disturbance signal detection unit configured to detect an LGM-disturbance-signal-related signal from the second electrodes, which do not form mutual capacitance with the first electrode among the plurality of second electrodes.

Still yet another exemplary embodiment of the present invention provides a touch input device having a touch surface, the touch input device including: a touch sensor including a plurality of first electrode columns having a plurality of first electrodes, and a plurality of second electrode columns having a plurality of second electrodes, in which a second electrode column is disposed at one side based on the first electrode column, which is any one of the plurality of first electrode columns, and another second electrode column is disposed at the other side, in which a second electrode included in the second electrode column and another second electrode included in another second electrode column constitute the same channel based on any one first electrode included in the first electrode column, in which a second-1 electrode and a second-2 electrode included in the second electrode column are disposed to be adjacent to one side so as to correspond to the first electrode included in the first electrode column, in which a second-3 electrode and a second-4 electrode included in the second electrode column are disposed to be adjacent to one side so as to correspond to another first electrode included in the first electrode column, and in which the second-1 electrode and the second-3 electrode are connected with one second trace, and the second-2 electrode and the second-4 electrode are connected with another second trace.

With the use of the touch sensor and the touch input device including the touch sensor according to the exemplary embodiment of the present invention, there is an advantage in that the touch signal may be detected even in the state in which the touch input device is in the floating state, like or similar to the gripped state.

There is an advantage in that the two or more multiple touches may be recognized even in the state in which the touch input device is in the floating state.

There is an advantage in that the third touch ($3^{rd}$ Touch) touched together with the cross touches may be recognized.

BRIEF DESCRIPTION OF THE DRAWINGS

FIGS. 5 and 6 are views illustrating output data for explaining a reason why an LGM disturbance signal is generated in the touch input device having the touch sensor illustrated in FIG. 2 and/or FIG. 3.

FIG. 10 is a view illustrating an enlarged part of another example in which the touch sensor 10 illustrated in FIG. 1 is formed to have a single layer (1-layer).

FIGS. 11A and 11B are views illustrating raw data outputted from the touch input device when an object such as a thumb comes into contact with a specific part of the touch surface of the touch input device having the structure of the touch sensor illustrated in FIG. 10.

FIG. 13 is a view illustrating raw data when an object such as a thumb comes into contact with a specific part of the touch surface of the touch input device having the structure of the touch sensor illustrated in FIG. 12.

FIG. 27 is a view illustrating raw data outputted in a gripped state and a floating state from the touch input device having the touch sensor illustrated in FIG. 10 when a test is performed with a 15 φ conductive rod.

FIG. 28 is a view illustrating raw data outputted in the gripped state and the floating state from the touch input device according to the exemplary embodiment of the present invention having the touch sensor illustrated in FIG. 12 when a test is performed with the 15 φ conductive rod.

FIG. 29 is a view illustrating raw data outputted in the gripped state and the floating state from the touch input device having the touch sensor illustrated in FIG. 10 when a test is performed with a 20 φ conductive rod.

FIG. 30 is a view illustrating raw data outputted in the gripped state and the floating state from the touch input device according to the exemplary embodiment of the present invention having the touch sensor illustrated in FIG. 12 when a test is performed with the 20 φ conductive rod.

FIG. 31 is a view illustrating raw data outputted in the gripped state and the floating state from the touch input device having the touch sensor illustrated in FIG. 10 when a test is performed with a person's thumb.

FIG. 32 is a view illustrating raw data outputted in the gripped state and the floating state from the touch input device according to the exemplary embodiment of the present invention having the touch sensor illustrated in FIG. 12 when a test is performed with a person's thumb.

FIGS. 38 to 48 are views illustrating various types of electrode arrangement forms and trace connection forms according to another exemplary embodiment of the present invention and explain a case in which inhibition of LGM is applied to each of the exemplary embodiments.

DETAILED DESCRIPTION

Figure 1A:
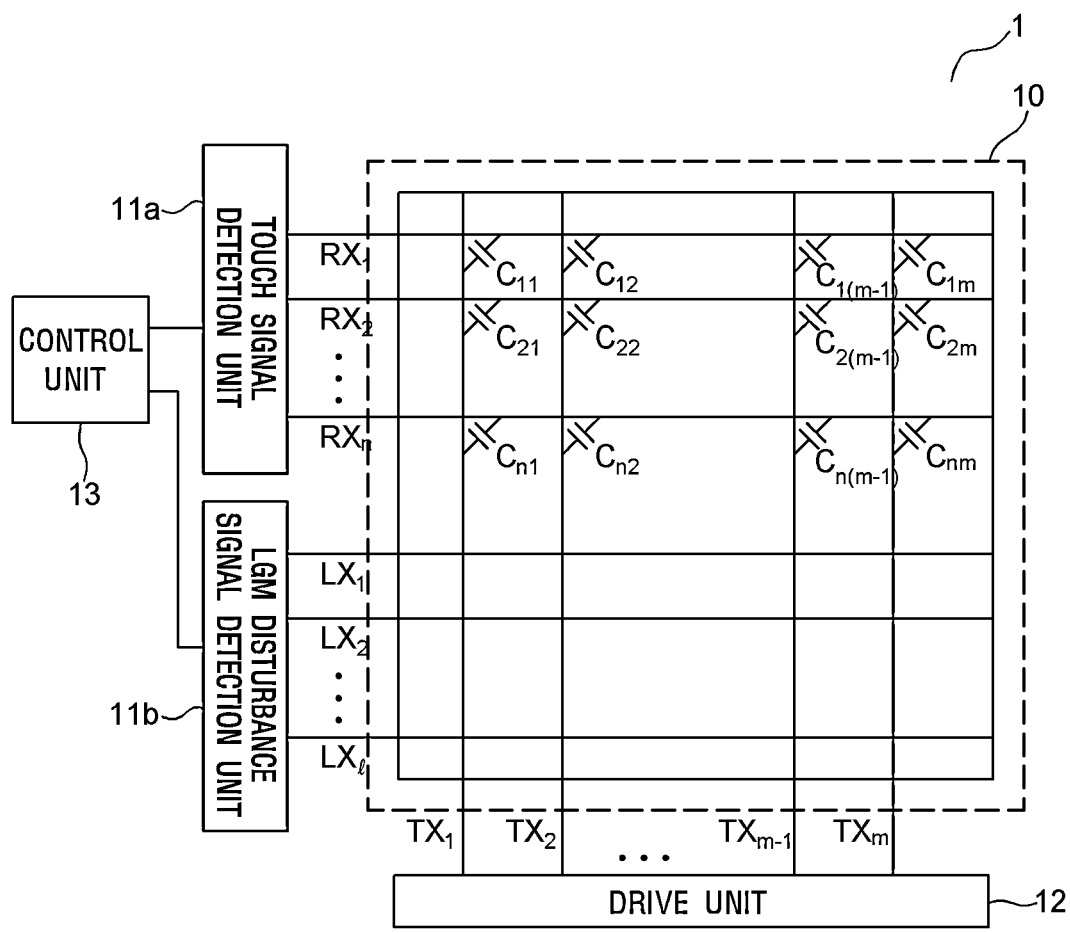
FIG. 1A is a schematic view illustrating a touch sensor of a touch input device according to an exemplary embodiment and a configuration for operating the touch sensor.

The following detailed description of the present invention will be made with reference to the accompanying drawings illustrating specific exemplary embodiments for carrying out the present invention. These exemplary embodiments will be described in detail enough to carry out the present invention by those skilled in the art. It should be understood that various exemplary embodiments of the present invention are different from one another but need not be mutually exclusive. For example, particular shapes, structures, and characteristics described herein in respect to one exemplary embodiment may be implemented in other exemplary embodiments without departing from the spirit and scope of the present invention. In addition, it should be understood that the position or arrangement of each constituent element in the respective disclosed exemplary embodiments may be changed without departing from the spirit and scope of the present invention. Therefore, the following detailed description is not considered as having limited meanings, and the scope of the present invention, if adequately explained, is limited only by the appended claims as well as all the scopes equivalent to the features claimed in the appended claims. Like reference numerals in the drawings refer to the same or similar functions throughout several aspects.

Hereinafter, a touch sensor and a touch input device including the same according to an exemplary embodiment of the present invention will be described with reference to the accompanying drawings. Hereinafter, a capacitance type touch sensor 10 will be illustratively described, but the present invention may be equally/similarly applied to the touch sensor 10 that may detect a touch position in any way.

Referring to FIG. 1A, the touch sensor 10 according to the exemplary embodiment may include patterns having a predetermined shape, and the predetermined patterns may include a plurality of driving electrodes TX1 to TXm, a plurality of touch signal detection electrodes RX1 to RXn, and a plurality of LGM disturbance signal detection electrodes LX1 to LX1.

The touch sensor 10 may include a drive unit 12 configured to apply a driving signal to the plurality of driving electrodes TX1 to TXm in order to operate the touch sensor 10, a touch signal detection unit 11a configured to detect, from the plurality of touch signal detection electrodes RX1 to RXn, a touch and a touch position with a touch-position-related signal which includes information about the amount of change in capacitance that changes in accordance with a touch of an object on a touch surface, and an LGM disturbance signal detection unit 11b configured to detect an LGM-disturbance-signal-related signal from the plurality of LGM disturbance signal detection electrodes.

The touch signal detection unit 11a according to the exemplary embodiment may output the touch-position-related signal from the predetermined touch signal detection electrode that forms mutual capacitance with any driving electrode.

The touch-position-related signal according to the exemplary embodiment may include information about the amount of change in mutual capacitance generated between any driving electrode and the predetermined touch signal detection electrode by a touch of an object, and information about capacitance that reduces the amount of change in mutual capacitance generated by coupling between the object and any driving electrode and/or the predetermined touch signal detection electrode (1).

Meanwhile, the LGM disturbance signal detection unit 11b according to the exemplary embodiment may output the LGM-disturbance-signal-related signal from the predetermined LGM disturbance signal detection electrode. The predetermined LGM disturbance signal detection electrode does not form the mutual capacitance with any driving electrode. In this case, insignificant mutual capacitance may be actually formed, but the insignificant mutual capacitance may be ignored when whether the touch is made is detected.

The LGM-disturbance-signal-related signal according to the exemplary embodiment may include the information about capacitance that reduces the amount of change in mutual capacitance generated by coupling between the object and any driving electrode and/or the predetermined LGM disturbance signal detection electrode which is generated by the touch of the object (2).

(1) and (2) may be referred to as an LGM disturbance signal, and a principle of generating the LGM disturbance signal will be described below with reference to FIGS. 7 and 8.

A control unit 13 may obtain the amount of change in pure mutual capacitance generated between any driving electrode and the predetermined touch signal detection electrode by using the touch-position-related signal outputted from the touch signal detection unit 11a and the LGM-disturbance-signal-related signal outputted from the LGM disturbance signal detection unit 11b.

According to the exemplary embodiment, there may be various methods of obtaining the amount of change in mutual capacitance by using the touch-position-related signal and the LGM-disturbance-signal-related signal.

According to the specific exemplary embodiment, the control unit 13 may derive a LGM disturbance signal component generated by an LGM phenomenon by using the LGM-disturbance-signal-related signal outputted from the LGM disturbance signal detection unit 11*b*. The control unit 13 may inhibit the LGM disturbance signal component from the signal detected from the touch signal detection electrode, for example, by using the derived LGM disturbance signal component, thereby obtaining the amount of change in pure mutual capacitance generated between any driving electrode and the predetermined touch signal detection electrode.

There may be various methods of inhibiting the LGM disturbance signal component from the signal detected from the touch signal detection electrode. According to the specific exemplary embodiment, the control unit 13 may obtain the amount of change in pure mutual capacitance generated between any driving electrode and the predetermined touch signal detection electrode by subtracting the LGM-disturbance-signal-related signal, which is outputted from the LGM disturbance signal detection unit 11*b*, from the touch-position-related signal outputted from the touch signal detection unit 11*a*. That is, when the touch surface is touched by the object, (A) some of the touch signal detection electrodes form mutual capacitance with any driving electrode and form capacitance by coupling, but (B) some of the LGM disturbance signal detection electrodes form only the capacitance by coupling without forming the mutual capacitance with any driving electrode, and as a result, only a pure mutual capacitance value may be obtained by subtracting B from A.

Alternatively, according to another exemplary embodiment, the touch-position-related signal X and the LGM disturbance signal Y may be processed by linear superposition by applying an expression of aX+bY (a, b: coefficients), thereby inhibiting the LGM disturbance signal. According to the exemplary embodiment, the expression may be applied by changing the coefficients a and b in accordance with the positions of the electrodes.

In the case of the present invention, local noise such as the LGM disturbance signal may be inhibited, particularly, eliminated, from the signal detected from the touch signal detection electrode through the above-mentioned method, thereby improving touch sensitivity.

FIG. 1A illustrates that the plurality of driving electrodes TX1 to TX*m*, the plurality of touch signal detection electrodes RX1 to RX*n*, and the plurality of LGM disturbance signal detection electrodes LX1 to LX1 of the touch sensor 10 constitute an orthogonal array, but the present invention is not limited thereto. The plurality of driving electrodes TX1 to TX*m*, the plurality of touch signal detection electrodes RX1 to RX*n*, and the plurality of LGM disturbance signal detection electrodes LX1 to LX1 may have any number of dimensions and application arrangements thereof including diagonal lines, concentric circles, and three-dimensional random arrangements. In this case, n, 1, and m are positive integers, may have an equal value or different values, and may have dimensions that vary depending on the exemplary embodiments.

Figure 2:
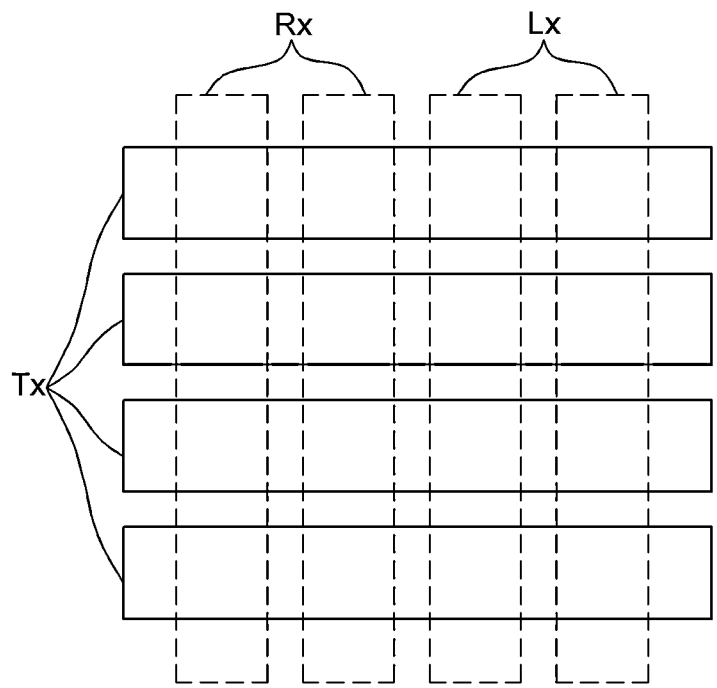
FIGS. 2 and 3 are views illustrating examples of the touch sensor having a double-layer structure.
Figure 3:
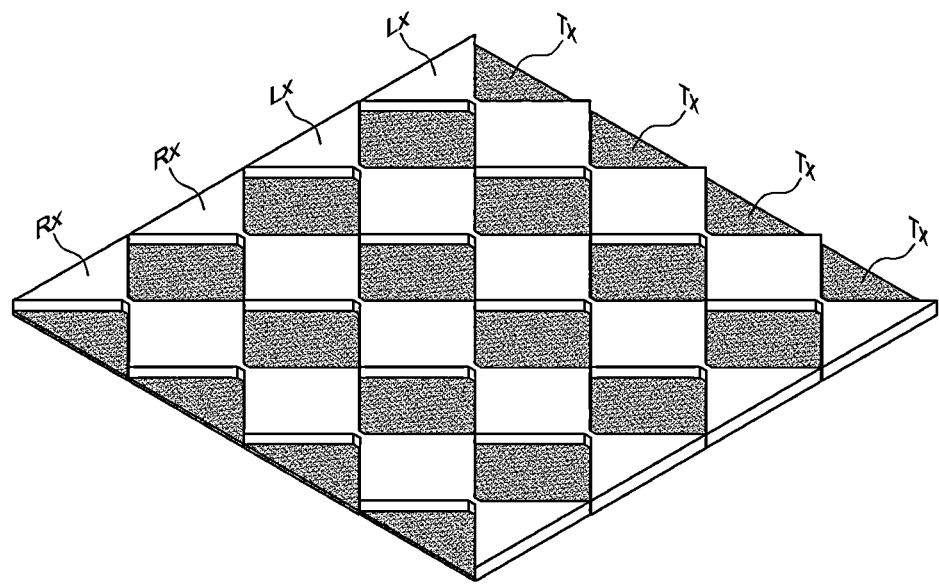

As illustrated in FIGS. 2 and 3, the plurality of driving electrodes TX1 to TX*m*, the plurality of touch signal detection electrodes RX1 to RX*n*, and the plurality of LGM disturbance signal detection electrodes LX1 to LX1 may be arranged to intersect one another. Specifically, the plurality of driving electrodes TX1 to TX*m* may extend in a direction of a first axis, and the plurality of touch signal detection electrodes RX1 to RX*n* and the plurality of LGM disturbance signal detection electrodes LX1 to LX1 may be disposed to extend in a direction of a second axis that intersects the direction of the first axis.

As illustrated in FIGS. 2 and 3, the plurality of driving electrodes TX1 to TX*m*, the plurality of touch signal detection electrodes RX1 to RX*n*, and the plurality of LGM disturbance signal detection electrodes LX1 to LX1 may be formed on different double layers (2-layers). For example, the electrodes may have a bar pattern as illustrated in FIG. 2, or a diamond pattern as illustrated in FIG. 3. In this case, the layer on which the plurality of driving electrodes TX1 to TX*m* is formed may be disposed above the layer on which the plurality of touch signal detection electrodes RX1 to RX*n* is formed, or vice versa. An insulating layer, which prevents a short circuit between the plurality of driving electrodes and a plurality of receiving electrodes, may be formed between the double layer.

For reference, FIGS. 1A, 2, and 3 illustrate that the plurality of touch signal detection electrodes RX1 to RX*n* is disposed all together and then the plurality of LGM disturbance signal detection electrodes LX1 to LX1 is disposed, but according to another exemplary embodiment, at least one of the plurality of touch signal detection electrodes RX1 to RX*n* and at least one of the plurality of LGM disturbance signal detection electrodes LX1 to LX1 may be alternately disposed. That is, the electrodes may be disposed in the form of RX1-LX1-RX2-LX2.

Figure 4A:
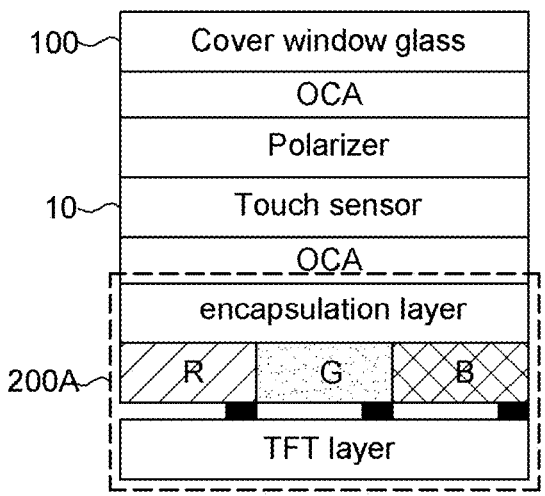
FIGS. 4A to 4F are illustrative cross-sectional structural views of the touch input device having the touch sensor.
Figure 4B:
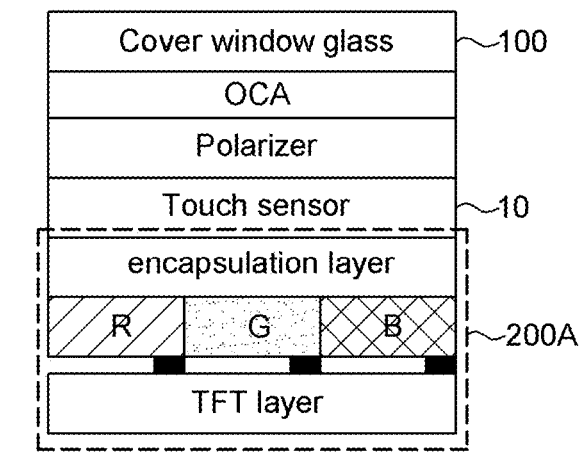

As illustrated in FIG. 4A, the touch sensor 10 including the plurality of driving electrodes TX1 to TX*m*, the plurality of touch signal detection electrodes RX1 to RX*n*, and the plurality of LGM disturbance signal detection electrodes LX1 to LX1 may be disposed between a cover layer 100 and a display panel 200A together with OCA disposed above/below the touch sensor 10 (Add-on). As illustrated in FIG. 4B, the touch sensor 10 may be disposed directly on an upper surface of the display panel 200A (e.g., an upper surface of an encapsulation layer of the display panel 200A) (on-cell). Meanwhile, as illustrated in FIG. 4C, the touch sensor 10 including the plurality of driving electrodes TX1 to TX*m*, the plurality of touch signal detection electrodes RX1 to RX*n*, and the plurality of LGM disturbance signal detection electrodes LX1 to LX1 may be disposed in the display panel 200A (e.g., between the encapsulation layer and an organic light emitting layer of the display panel 200A) (in-cell).

Figure 4C:
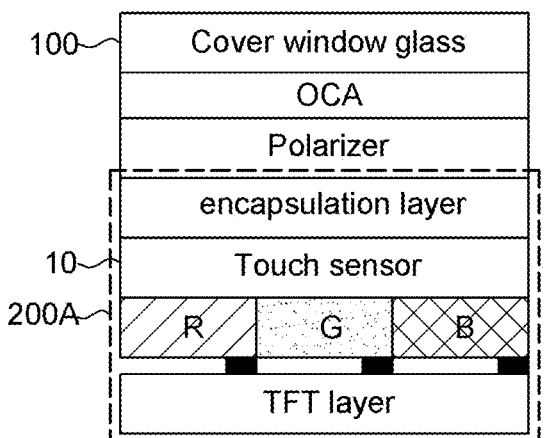

In FIGS. 4A to 4C, the display panel 200A may be a rigid OLED panel or a flexible OLED panel. In the case in which the display panel is the rigid OLED panel, the encapsulation layer and a TFT layer may be made of glass. In the case in which the display panel is the flexible OLED panel, the encapsulation layer may be made of a thin film, and the TFT layer may be made of a RPM polyimide film.

Figure 4D:
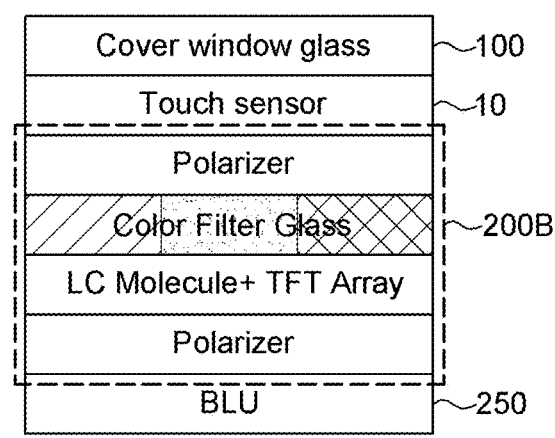
Figure 4E:
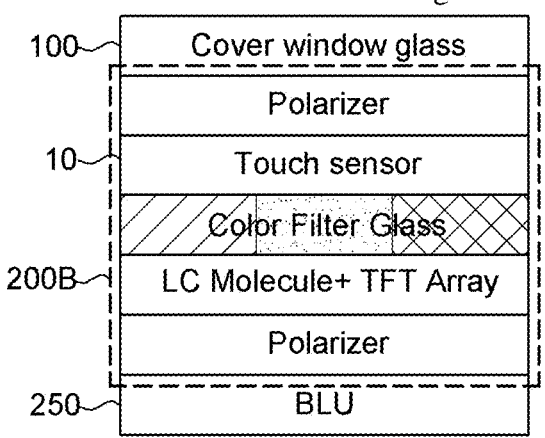
Figure 4F:
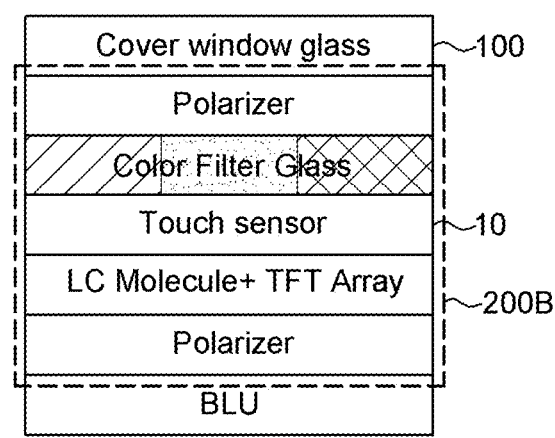

Meanwhile, FIGS. 4A to 4C illustrate that the display panel 200A is the OLED panel, but the present invention is not limited thereto. As illustrated in FIGS. 4D to 4F, a display panel 200B may be an LCD panel. Because of the characteristics of the LCD panel, a back light unit (BLU) 250 is disposed below the display panel 200B.

Specifically, as illustrated in FIG. 4D, the touch sensor 10 may be attached to (added on) the cover window glass 100. In this case, although not illustrated in the drawings, the touch sensor 10 may be attached, in the form of a film, to an upper surface of the cover window glass 100. As illustrated in FIG. 4E, the touch sensor 10 may be formed (on-cell) on a color filter glass of the display panel 200B. In this case, as illustrated in the drawings, the touch sensor 10 may be formed on an upper surface of the color filter glass. However, although not illustrated in the drawings, the touch sensor 10 may be formed on a lower surface of the color filter glass. As illustrated in FIG. 4F, the touch sensor 10 may be formed on the TFT layer (TFT array) (in-cell). In this case, as illustrated in the drawings, the touch sensor 10 may be formed on an upper surface of the TFT layer (TFT array). However, although not illustrated in the drawings, the touch sensor 10 may be formed on a lower surface of the TFT layer (TFT array). In addition, although not illustrated in the separate drawings, one of the driving electrode and the receiving electrode may be formed on the color filter glass of the display panel 200B, and the other of the driving electrode and the receiving electrode may be formed on the TFT layer.

Referring to FIG. 1 again, at least one of the plurality of driving electrodes TX1 to TXm, the plurality of touch signal detection electrodes RX1 to RXn, and the plurality of LGM disturbance signal detection electrodes LX1 to LX1 may be made of a transparent electrically conductive material, for example, ITO (indium tin oxide) or ATO (antimony tin oxide) including tin oxide $SnO_2$ and indium oxide $In_2O_3$. However, this configuration is merely an example, and at least one of the plurality of driving electrodes TX1 to TXm, the plurality of touch signal detection electrodes RX1 to RXn, and the plurality of LGM disturbance signal detection electrodes LX1 to LX1 may be made of another transparent electrically conductive material or an opaque electrically conductive material. For example, the electrode may include at least one of silver ink, copper, nano silver, and carbon nanotube (CNT). In addition, at least one of the plurality of driving electrodes TX1 to TXm, the plurality of touch signal detection electrodes RX1 to RXn, and the plurality of LGM disturbance signal detection electrodes LX1 to LX1 may be implemented as a metal mesh.

The drive unit 12 may apply the driving signal to the driving electrodes TX1 to TXm. The touch signal detection unit 11*a* may detect whether the touch is made and the touch position by receiving the touch-position-related signal including the information about the amount of change in mutual capacitance generated between the touch signal detection electrodes RX1 to RXn and the driving electrodes TX1 to TXm to which the driving signal is applied through the touch signal detection electrodes RX1 to RXn. The touch-position-related signal also include a noise signal as well as a signal coupled by the mutual capacitance generated between the touch signal detection electrodes RX1 to RXn and the driving electrodes TX1 to TXm by the driving signal applied to the driving electrodes TX1 to TXm. The noise signal may include LGM disturbance signal information generated in the floating state.

The touch signal detection unit 11*a* may include a receiver connected to each of the touch signal detection electrodes RX1 to RXn through a switch. The switch is turned on in a time section in which the signals of the corresponding touch signal detection electrodes RX1 to RXn are detected, thereby allowing the receiver to output the touch-position-related signal from the touch signal detection electrodes RX1 to RXn.

Figure 1B:
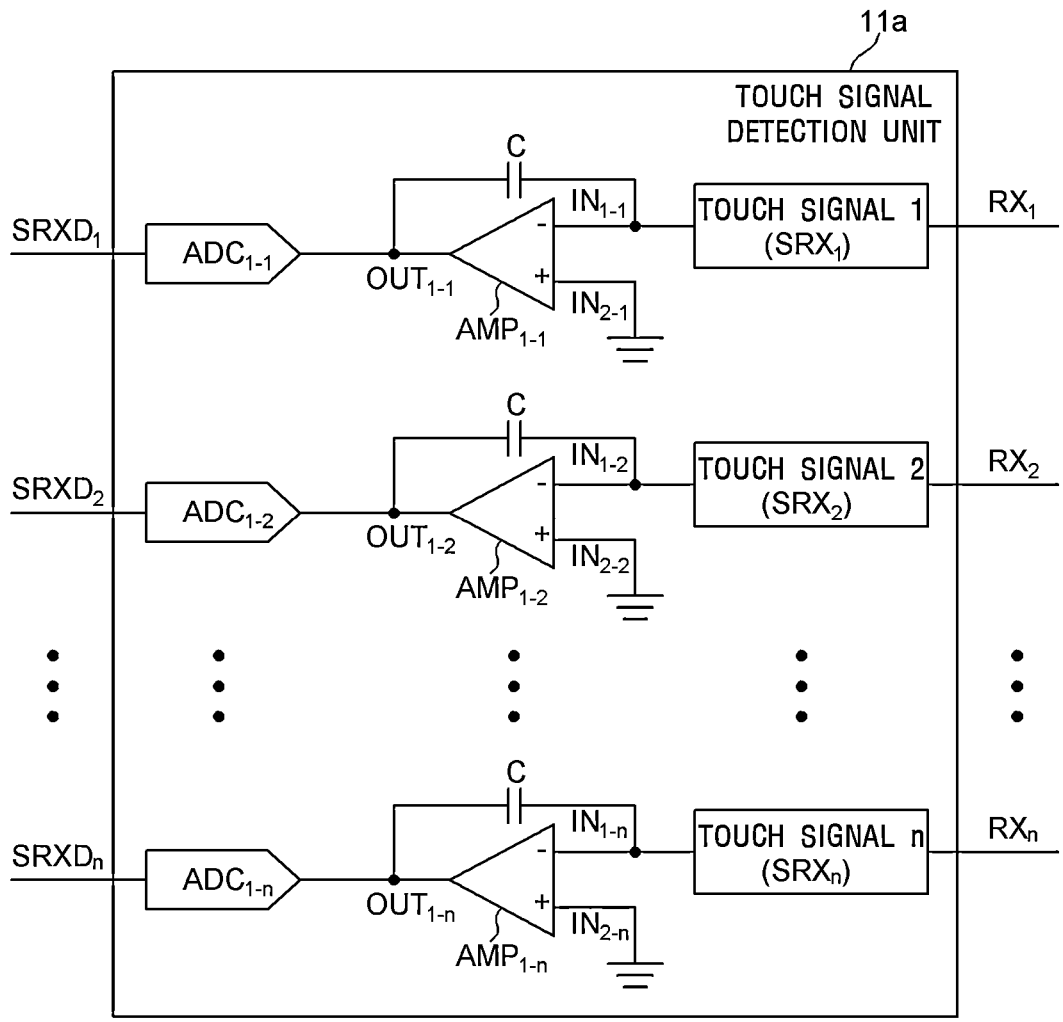
FIGS. 1B and 1C are circuit diagrams of a touch signal detection unit and an LGM disturbance signal detection unit that constitute FIG. 1A.

For example, referring to FIG. 1B, the receiver may include amplifiers $AMP_{1-1}$ to $AMP_{1-n}$, and feedback capacitors coupled between negative-input terminals $IN_{1-1}$ to of the amplifiers and output terminals $OUT_{1-1}$ to $OUT_{1-n}$ of the amplifiers, that is, coupled in feedback routes. In this case, positive+input terminals ($IN_{2-1}$ to $IN_{2-n}$) of the amplifiers may be connected to a reference voltage. In this case, the reference voltage may be, for example, a ground voltage, but the present invention is not limited thereto. In addition, the receiver may further include a reset switch connected in parallel with the feedback capacitor. The reset switch may reset conversion of current to voltage performed by the receiver. The negative input terminals $IN_{1-1}$ to $IN_{1-n}$ of the amplifiers are connected to the corresponding touch signal detection electrodes RX1 to RXn, respectively, may receive and integrate touch-position-related signals SRX1 to SRXn, and then may convert the integrated touch-position-related signals SRX1 to SRXn into the voltage.

The touch signal detection unit 11*a* may further include an ADC (analog to digital converter) that converts the data integrated by the receiver into digital data values. Thereafter, the digital data may be inputted to a processor (not illustrated) and processed to obtain information about the touch on the touch sensor 10. The touch signal detection unit 11*a* may include the ADC and the processor in addition to the receiver.

The touch signal detection unit 11*a* according to the exemplary embodiment may convert the touch-position-related signals SRX1 to SRXn integrated by the receiver into digital data values SRXD1 to SRXDn and output the digital data values SRXD1 to SRXDn.

The touch signal detection unit 11*a* may include the receiver and the ADC corresponding to each of the touch signal detection electrodes with a one-to-one relationship. Therefore, each of the touch-position-related signals is outputted from each of the touch signal detection electrodes, and each of the digital data values may be outputted through the corresponding receiver and the corresponding ADC.

Meanwhile, the LGM disturbance signal detection unit 11*b* may include the receiver connected to each of the LGM disturbance signal detection electrodes LX1 to LX1 through the switch. The switch is turned on in a time section in which the signals of the corresponding LGM disturbance signal detection electrodes LX1 to LX1 are detected, thereby allowing the receiver to output the LGM-disturbance-signal-related signal from the LGM disturbance signal detection electrodes LX1 to LX1.

Figure 1C:
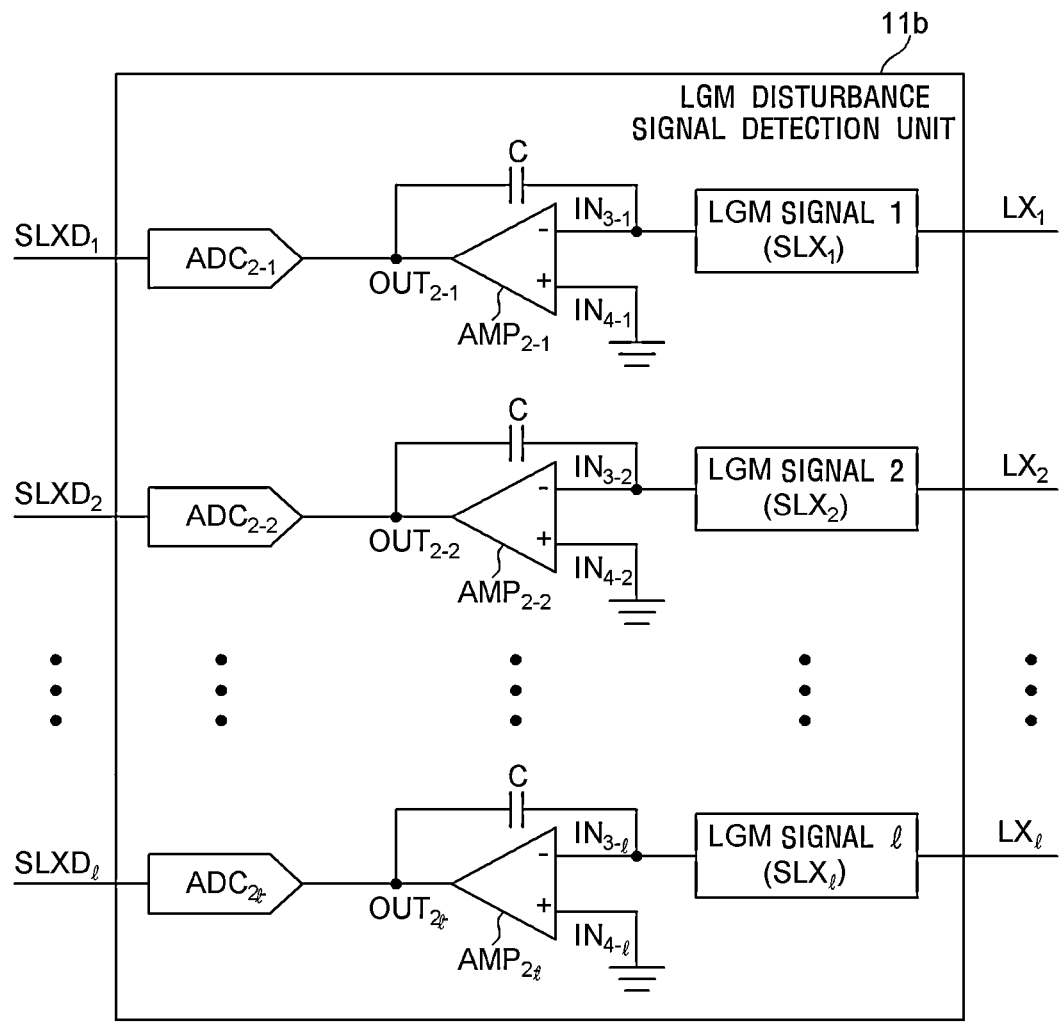

For example, referring to FIG. 1C, the receiver may include amplifiers $AMP_{2-1}$ to $AMP_{2-L}$, and feedback capacitors coupled between negative (−) input terminals $IN_{3-1}$ to $IN_{3-1}$ of the amplifiers and output terminals $OUT_{2-1}$ to $OUT_{2-1}$ of the amplifiers, that is, coupled in feedback routes. In this case, positive (+) input terminals $IN_{4-1}$ to $IN_{4-1}$ of the amplifiers may be connected to a reference voltage. In this case, the reference voltage may be, for example, a ground voltage, but the present invention is not limited thereto. In addition, the receiver may further include a reset switch connected in parallel with the feedback capacitor. The reset switch may reset conversion of current to voltage performed by the receiver. The negative input terminals IN3-1 to IN3-1 of the amplifiers are connected to the corresponding LGM disturbance signal detection electrodes LX1 to LX1, respectively, may receive and integrate LGM-disturbance-signal-related signals SLX1 to SLXL1, and then may convert the LGM-disturbance-signal-related signals SLX1 to SLXL1 into the voltage.

The LGM disturbance signal detection unit 11*b* may further include an ADC (analog to digital converter) that converts the data integrated by the receiver into digital data values. Thereafter, the digital data may be inputted to a processor (not illustrated) and processed to obtain the LGM-disturbance-signal-related signal with respect to the touch sensor 10. The LGM disturbance signal detection unit 11*b* may include the ADC and the processor in addition to the receiver.

The LGM disturbance signal detection unit 11*b* according to the exemplary embodiment may convert the LGM-disturbance-signal-related signals SLX1 to SLX1 integrated by the receiver into digital data values SLXD1 to SLXD1 and output the digital data values SLXD1 to SLXD1.

The LGM disturbance signal detection unit 11b may include the receiver and the ADC corresponding to each of the LGM disturbance signal detection electrodes with a one-to-one relationship. Therefore, each of the LGM-disturbance-signal-related signals may be outputted from each of the LGM disturbance signal detection electrodes, and each of the digital data values may be outputted through the corresponding receiver and the corresponding ADC.

The control unit 13 may perform a function of controlling the operation of the drive unit 12, the touch signal detection unit 11a, and the LGM disturbance signal detection unit 11b. For example, the control unit 13 generates a driving control signal and then transmits the driving control signal to a drive unit 12 so that the driving signal may be applied to the predetermined driving electrodes TX1 to TXm within a predetermined time. In addition, the control unit 13 generates a detection control signal and then transmits the detection control signal to the touch signal detection unit 11a so that the touch signal detection unit 11a may receive the touch-position-related signal from the predetermined touch signal detection electrodes RX1 to RXn within a predetermined time and perform a predetermined function. The control unit 13 generates a detection control signal and then transmits the detection control signal to the LGM disturbance signal detection unit 11b so that the LGM disturbance signal detection unit 11b may receive the LGM-disturbance-signal-related signal from the predetermined LGM disturbance signal detection electrodes LX1 to LX1 within a predetermined time and perform a predetermined function.

In FIG. 1A, the drive unit 12, the touch signal detection unit 11a, and the LGM disturbance signal detection unit 11b may constitute a touch detection unit (not illustrated) that may detect whether the touch is made on the touch sensor 10 and the touch position. In addition, the touch detection unit may further include the control unit 13. The touch detection unit may be implemented by being integrated on a touch sensing integrated circuit (IC). For example, the driving electrodes TX1 to TXm, the touch signal detection electrodes RX1 to RXn, and the LGM disturbance signal detection electrodes LX1 to LX1, which are included in the touch sensor 10, may be connected to the drive unit 12, the touch signal detection unit 11a, and the LGM disturbance signal detection unit 11b, which are included in the touch sensing IC, through a conductive trace and/or a conductive pattern printed on a circuit board. The touch sensing IC may be positioned on a circuit board having a printed conductive pattern, for example, a touch circuit board (hereinafter, referred to as a 'touch PCB'). According to the exemplary embodiment, the touch sensing IC may be mounted on a main board for operating the touch input device.

As described above, predetermined capacitance Cm is generated for each intersection point between the driving electrodes TX1 to TXm and the touch signal detection electrodes RX1 to RXn, and a value of the capacitance Cm may be changed when an object such as a finger approaches the touch sensor 10. In FIG. 1A, the capacitance may be mutual capacitance Cm. The touch signal detection unit 11a may detect the electrical characteristics, thereby detecting whether the touch is made on the touch sensor 10 and/or the touch position. For example, it is possible to detect whether the touch is made on the surface of the touch sensor 10 having a two-dimensional plane having the first axis and the second axis and/or the touch position.

Figure 6:
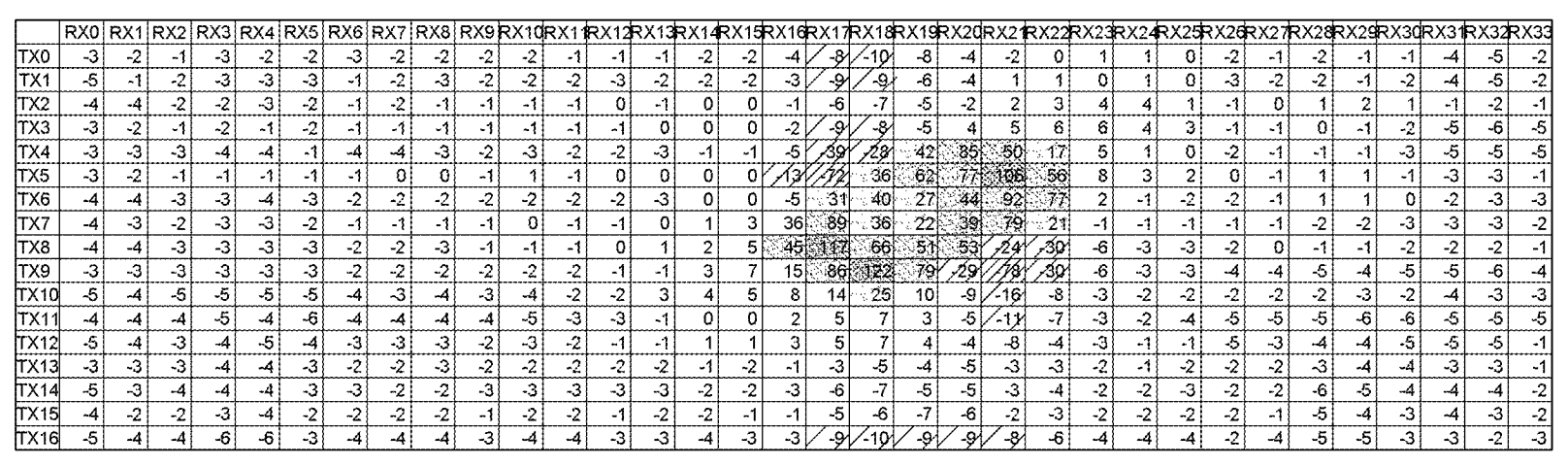

FIGS. 5 and 6 are views illustrating output data for explaining a reason why an LGM disturbance signal is generated in the touch input device having the touch sensor illustrated in FIG. 2 and/or FIG. 3.

FIG. 5 is a view illustrating data made by converting the touch-position-related signal, which is outputted through touch signal detection electrodes RX0 to RX33, into a digital value (or a signal level value) when an object comes into contact with a specific part of the touch surface of the touch input device illustrated in FIG. 2 or 3 in a normal situation in which the touch input device is gripped. FIG. 6 is a view illustrating data made by converting the touch-position-related signal, which is outputted through the touch signal detection electrodes RX0 to RX33, into a digital value (or a signal level value) when an object comes into contact with the specific part of the touch surface of the touch input device illustrated in FIG. 2 or 3 in a state in which the touch input device is in the floating state.

As illustrated in FIG. 5, in the normal situation, a region, in which digital values having relatively large values among the outputted digital values are distributed, is positioned at a central portion. However, in the floating state as illustrated in FIG. 6, the digital values at the central portion have absolutely different aspects (signal split) in comparison with FIG. 5. That is, in FIG. 6, the digital values at the central portion have significantly small values. In this manner, even though the user actually makes one touch or a big touch on the touch surface of the touch input device, the touch input device may erroneously recognize that one touch is not made or two or more touches are made. This is caused by the LGM disturbance signal generated by coupling between the object and the driving electrode. The normal situation illustrated in FIG. 5 is a situation in which the finger touches the touch surface of the touch input device in a state in which the user grips the touch input device, and the finger acts as a normal ground. Further, the floating state as illustrated in FIG. 6 is a situation in which the finger cannot act as the normal ground because the user touches, with his/her finger, the touch surface of the touch input device in a state in which the touch input device is placed on a bottom or a mount (e.g., a mount in a vehicle).

Hereinafter, the reason why there is a difference between the digital value (or the signal level value) outputted in a state in which the touch input device is in the floating state illustrated in FIG. 6 and the digital value (or the signal level value) outputted in the normal situation will be specifically described with reference to FIGS. 7 to 9.

Figure 7:
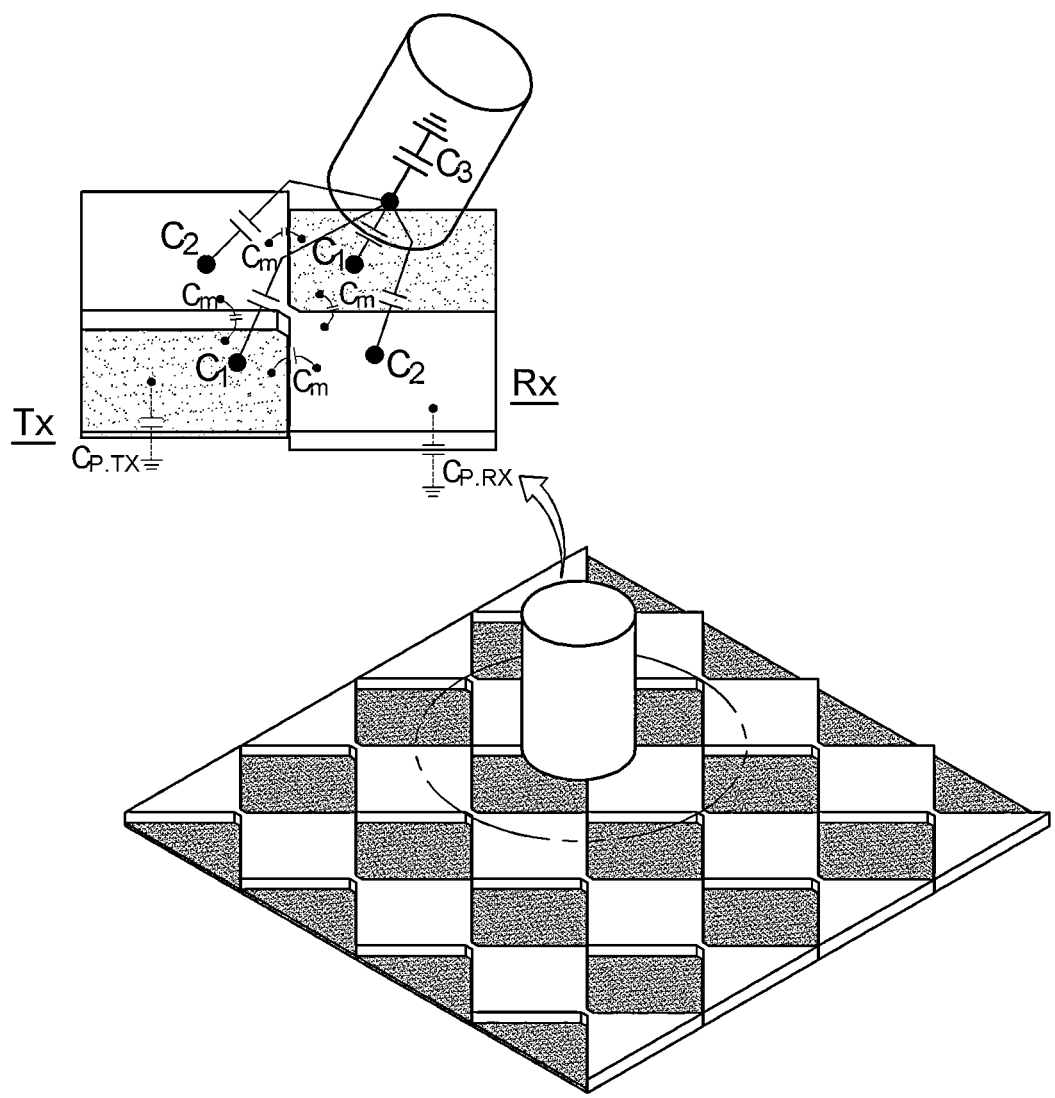
FIGS. 7 and 8 are views for explaining a principle of generating the LGM disturbance signal in a state in which the touch input device having the touch sensor implemented to have a double layer (2-layer) is in a floating state.
Figure 8:
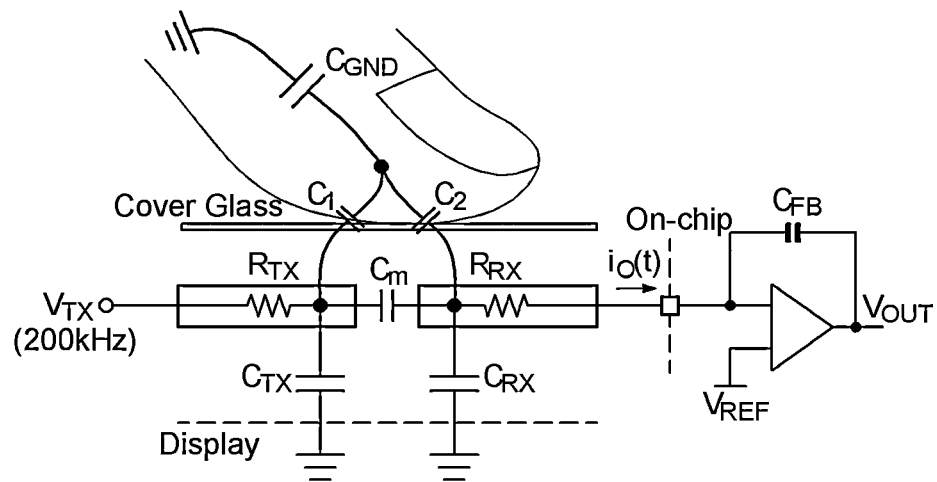

FIGS. 7 and 8 are views for explaining a principle of generating the LGM disturbance signal in a state in which the touch input device having the touch sensor implemented to have a double layer (2-layer) is in a floating state. For reference, in the following description, the object may include a finger or a stylus.

For reference, the following normal situation means a situation in which the user touches the surface of the touch input device in a state in which the user grips the touch input device, such that the finger acts as the normal ground. Further, the situation in which the LGM disturbance signal is generated means a situation in which the user touches the surface of the touch input device in a state in which the touch input device is placed on the bottom, such that the floating occurs and thus the finger cannot act as the normal ground.

For example, when the user touches the surface of the touch input device with his/her thumb, the amount $\Delta Cm1$ of change in first mutual capacitance is detected between any driving electrode and the predetermined touch signal detection electrode in the normal situation in which the LGM disturbance signal is not generated, but the amount $\Delta Cm2$ of change in second mutual capacitance, which is smaller than the amount ΔCm1 of change in first mutual capacitance, is detected in the situation in which the LGM disturbance signal is generated. That is, the LGM disturbance signal may be defined as a signal including information about capacitance that acts opposite to the amount ΔCm1 of change in first mutual capacitance to reduce the amount ΔCm1 of change in first mutual capacitance. (For reference, in this case, ΔCm1 and ΔCm2 are defined as absolute values.) In other words, when any driving electrode and the predetermined touch signal detection electrode are connected through the touch of a low-ground conductive object, a separate current route is generated by coupling between the object and any driving electrode and/or the predetermined touch signal detection electrode, and the driving signal is transmitted to the predetermined touch signal detection electrode through this route, such that the LGM disturbance signal opposite to a normal touch signal is generated.

In the present invention, the LGM disturbance signal may be formed not only between the object and any driving electrode and/or the predetermined touch signal detection electrode, but also between the object and any driving electrode and/or the predetermined LGM disturbance signal detection electrode.

Referring to FIGS. 7 and 8, when the amount of generated LGM disturbance signal is relatively increased in any one cell region (including the plurality of driving electrodes and the plurality of touch signal detection electrodes included in the dotted line region), the digital value corresponding to the finally outputted touch-position-related signal is decreased as illustrated in FIG. 6. In particular, the number of LGM disturbance signals is relatively increased when the big touch (in the present invention, a case in which a touch area, like the touch area of the thumb, is larger than a touch area of a finger except for the thumb is defined as the big touch) is made.

As illustrated in FIGS. 7 and 8, the LGM disturbance signals C1 and C2 are generated by coupling between the object and the driving electrode and/or the touch signal detection electrode in addition to the case in which the mutual capacitance Cm is generated between the driving electrode and the touch signal detection electrode when the object touches the touch surface of the touch input device in the floating state.

Figure 9:
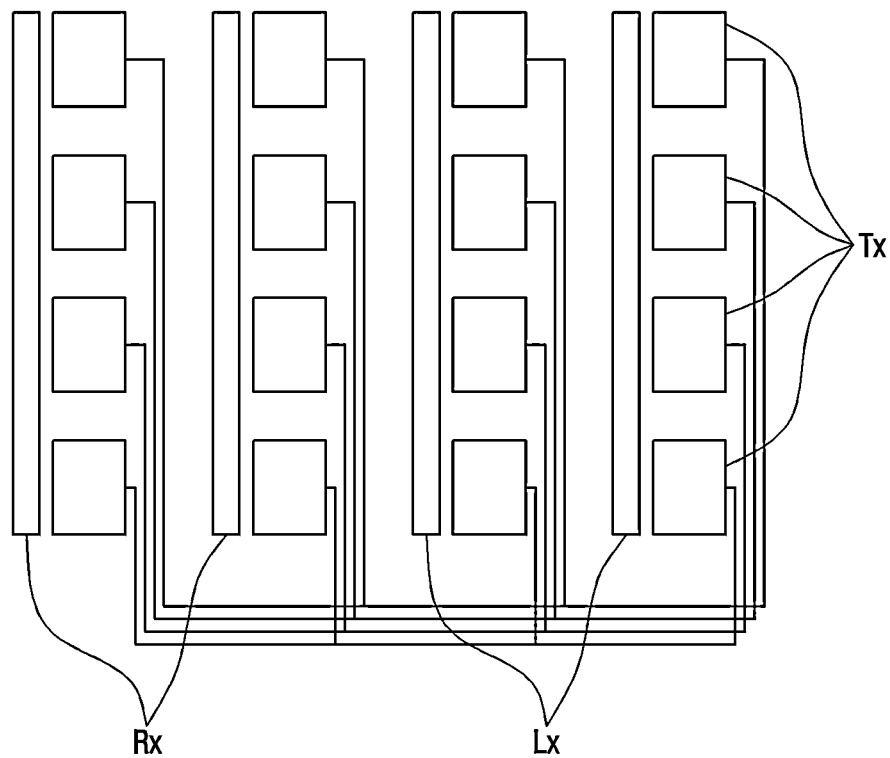
FIG. 9 is a view illustrating an example in which the touch sensor 10 illustrated in FIG. 1 is configured to have a single layer (1-layer).

FIG. 9 is a view illustrating an example in which the touch sensor 10 illustrated in FIG. 1A is configured to have a single layer (1-layer).

Referring to FIG. 9, the plurality of driving electrodes TX1 to TXm, the plurality of touch signal detection electrodes RX1 to RXn, and the plurality of LGM disturbance signal detection electrodes LX1 to LX1 illustrated in FIG. 1A are formed on one layer. For example, a set of the plurality of driving electrodes TX1 to TXm may be arranged in a plurality of column and row directions adjacent to one rectangular touch signal detection electrode and/or one rectangular LGM disturbance signal detection electrode. In this case, the number of driving electrodes adjacent to one rectangular touch signal detection electrode and/or one rectangular LGM disturbance signal detection electrode may be four as illustrated, but the present invention is not limited thereto. For example, the number of driving electrodes may be three, two, or five or more. In addition, the driving electrode and the touch signal detection electrode and the LGM disturbance signal detection electrode may be configured in the opposite manner.

The touch input device having the touch sensor 10 having the single layer structure illustrated in FIG. 9 has different aspects in accordance with the gripped state and the floating state, as illustrated in FIGS. 5 and 6. This results from the fact that the object is placed on the low ground mass LGM in the floating state.

More specifically, through the object in the LGM state, the driving signal applied through the specific driving electrode is inputted to the plurality of touch signal detection electrodes and/or the LGM disturbance signal detection electrodes which are in contact with the object. That is, the object in the LGM state forms a current path. Therefore, the LGM disturbance signal having the opposite sign to the normal touch signal is outputted from the touch signal detection electrode and/or the LGM disturbance signal detection electrode which are in contact with the object. In this case, the reason why the LGM disturbance signal and the normal touch signal have the opposite signs is that the normal touch signal causes the mutual capacitance Cm to be decreased in case of the contact with the object in the state in which the predetermined mutual capacitance Cm is formed between the driving electrode and the touch signal detection electrode, but the LGM disturbance signal causes the coupling capacitance to be generated in case of the contact with the object in the floating state. Therefore, the LGM disturbance signal generated in the floating state acts as a factor that decreases the digital value (or the signal level value) corresponding to the touch-position-related signal outputted through the touch signal detection electrode.

Hereinafter, with reference to FIGS. 10 and 12, more specific examples of the touch sensor having the single layer structure will be described, and raw data, which are outputted when the touch input device having the touch sensor is in the floating state, will be described.

FIG. 10 is a view illustrating an enlarged part of another example in which the touch sensor 10 illustrated in FIG. 1A is formed to have a single layer (1-layer).

Referring to FIG. 10, the touch sensor includes the plurality of driving electrodes TX0 to TX3, the plurality of touch signal detection electrodes RX0 to RX3 and RX12 to RX15, and the LGM disturbance signal detection electrodes LX4 to LX11. The plurality of driving electrodes TX0 to TX3, the plurality of touch signal detection electrodes RX0 to RX3 and RX12 to RX15, and the LGM disturbance signal detection electrodes LX4 to LX11 are arranged in the form of a matrix on the same layer.

The plurality of driving electrodes TX0 to TX3, the plurality of touch signal detection electrodes RX0 to RX3 and RX12 to RX15, and the LGM disturbance signal detection electrodes LX4 to LX11 may be made of a transparent electrically conductive material, for example, ITO (indium tin oxide) or ATO (antimony tin oxide) including tin oxide $SnO_2$ and indium oxide $In_2O_3$. However, this configuration is merely an example, and at least one of the driving electrodes TX0 to TX3, the touch signal detection electrodes RX0 to RX3 and RX12 to RX15, and the LGM disturbance signal detection electrodes LX4 to LX11 may be made of another transparent electrically conductive material or an opaque electrically conductive material. For example, at least one of the driving electrodes TX0 to TX3, the touch signal detection electrodes RX0 to RX3 and RX12 to RX15, and the LGM disturbance signal detection electrodes LX4 to LX11 may include at least one of silver ink, copper, nano silver, and carbon nanotube (CNT).

At least one of the driving electrodes TX0 to TX3, the touch signal detection electrodes RX0 to RX3 and RX12 to RX15, and the LGM disturbance signal detection electrodes LX4 to LX11 may be implemented as a metal mesh. When at least one of the driving electrodes TX0 to TX3, the touch signal detection electrodes RX0 to RX3 and RX12 to RX15, and the LGM disturbance signal detection electrodes LX4 to LX11 is implemented as a metal mesh, a wire connected to at least one of the driving electrodes TX0 to TX3, the touch signal detection electrodes RX0 to RX3 and RX12 to RX15, and the LGM disturbance signal detection electrodes LX4 to LX11 may also be implemented as a metal mesh, and the wire and at least one of the driving electrodes TX0 to TX3, the touch signal detection electrodes RX0 to RX3 and RX12 to RX15, and the LGM disturbance signal detection electrodes LX4 to LX11 may be integrally implemented as a metal mesh. When the wire and at least one of the driving electrodes TX0 to TX3, the touch signal detection electrodes RX0 to RX3 and RX12 to RX15, and the LGM disturbance signal detection electrodes LX4 to LX11 are integrally implemented as a metal mesh, a dead zone, in which the touch position cannot be detected, such as a zone between the electrode and the wire and/or between the electrode and another electrode, is reduced, thereby further improving sensitivity in detecting the touch position.

The touch sensor is arranged based on the plurality of touch signal detection electrodes RX0 to RX3 and RX12 to RX15, and the LGM disturbance signal detection electrodes LX4 to LX11. Therefore, hereinafter, an arrangement structure of the plurality of touch signal detection electrodes RX0 to RX3 and RX12 to RX15 and the plurality of LGM disturbance signal detection electrodes LX4 to LX11 arranged in columns B1 to B8 will be described first, and then an arrangement structure of the plurality of driving electrodes TX0 to TX3 will be described.

The plurality of touch signal detection electrodes RX0 to RX3 and RX12 to RX15 is disposed in a plurality of columns B1, B2, B3, and B4, and the plurality of LGM disturbance signal detection electrodes LX4 to LX11 is disposed in a plurality of columns B5, B6, B7, and B8. In this case, the plurality of driving electrodes TX0 to TX3 is arranged between the plurality of columns B1, B2, B3, B4, B5, B6, B7, and B8 in which the touch signal detection electrodes RX0 to RX3 and RX12 to RX15 and the LGM disturbance signal detection electrodes LX4 to LX11 are arranged, and the plurality of driving electrodes TX0 to TX3 is arranged outside the first column B1 and in the plurality of columns A1, A2, A3, A4, A5, A6, A7, A8, and A9 formed outside the eighth column B8.

The two driving electrodes adjacent to both sides based on the touch signal detection electrodes RX0 to RX3 and RX12 to RX15 and the LGM disturbance signal detection electrodes LX4 to LX11 are identical to each other. That is, the two driving electrodes adjacent to both sides based on the touch signal detection electrodes RX0 to RX3 and RX12 to RX15 and the LGM disturbance signal detection electrodes LX4 to LX11 have an equal number. In this case, the configuration in which the two driving electrodes are identical to each other or the two driving electrodes have an equal number means that the two driving electrodes are electrically connected to each other through the wire.

The touch sensor includes one or more sets in which the plurality of touch signal detection electrodes RX0 to RX3 and RX12 to RX15, the LGM disturbance signal detection electrodes LX4 to LX11, and the plurality of identical driving electrodes are disposed in a predetermined arrangement. The plurality of sets may be configured and repeatedly arranged in a row direction.

One set may include the plurality of different touch signal detection electrodes RX0 to RX3 and RX12 to RX15 and the different LGM disturbance signal detection electrodes LX4 to LX11. For example, one set may include the eight touch signal detection electrodes RX0 to RX3 and RX12 to RX15 and the eight LGM disturbance signal detection electrodes LX4 to LX11. The eight touch signal detection electrodes RX0 to RX3 and RX12 to RX15 and the eight LGM disturbance signal detection electrodes LX4 to LX11 are in a predetermined arrangement. The eight touch signal detection electrodes RX0 to RX3 and RX12 to RX15 and the eight LGM disturbance signal detection electrodes LX4 to LX11 are divided into two rows and continuously arranged in a column direction. The electrodes having numbers from 0 to 7 are arranged in the first row from the left to the right in the order of RX0, RX1, RX2, RX3, LX4, LX5, LX6, and LX7, and the electrodes having numbers from 8 to 15 are arranged in the second row from the right to the left in the order of LX8, LX9, LX10, LX11, RX12, RX13, RX14, and RX15.

Meanwhile, the touch sensor includes the plurality of driving electrodes TX0 to TX3, and for example, the plurality of driving electrodes TX0 to TX3 may include the 0th driving electrode TX0 to the third driving electrode TX3. In this case, the respective driving electrodes may be disposed to satisfy the following arrangement conditions.

The plurality of driving electrodes TX0 to TX3 are arranged to satisfy the following conditions. 1) The identical driving electrodes TX0 are disposed, one for each of the left and right sides, based on the two different touch signal detection electrodes RX0 and RX15 disposed continuously in the row direction. 2) The two driving electrodes TX0 and TX0, which face each other based on the two different touch signal detection electrodes RX0 and RX15 and the two different LGM disturbance signal detection electrodes LX4 and LX11 disposed continuously in the row direction, have an equal number. 3) The driving electrodes TX0 to TX3 arranged in the row direction have different numbers, and the driving electrodes TX0 to TX3 arranged in the column direction have an equal number. 4) A length (horizontal length) of the driving electrodes arranged at both edges of each set may be half a length (horizontal length) of other driving electrodes, but the present invention is not limited thereto, and the driving electrodes may have an equal length.

In the case of FIG. 10, according to the exemplary embodiment, the driving signal is applied to the predetermined driving electrode TX0, the touch-position-related signal is detected from the predetermined touch signal detection electrodes RX0 to RX3 and RX12 to RX15 by the touch made by the object, the LGM-disturbance-signal-related signal is detected from the predetermined LGM disturbance signal detection electrodes LX4 to LX11, and a value of the amount of change in pure mutual capacitance may be calculated by subtracting the LGM-disturbance-signal-related signal from the touch-position-related signal.

However, referring to FIG. 10, the configuration in which the touch signal detection electrode and the LGM disturbance signal detection electrode are physically separated is described, but according to another exemplary embodiment, the principle described above with reference to FIG. 10 may be equally/similarly applied even in the case in which some of the touch signal detection electrodes are used as the LGM disturbance signal detection electrodes.

FIG. 10 illustrates that the plurality of touch signal detection electrode columns is disposed first and then the plurality of LGM disturbance signal detection electrode columns is disposed (or vice versa), but the respective touch signal detection electrode columns and the respective LGM disturbance signal detection electrode columns may be disposed alternately (in the form of RX-LX-RX-LX).

Figures 11A, 11B:
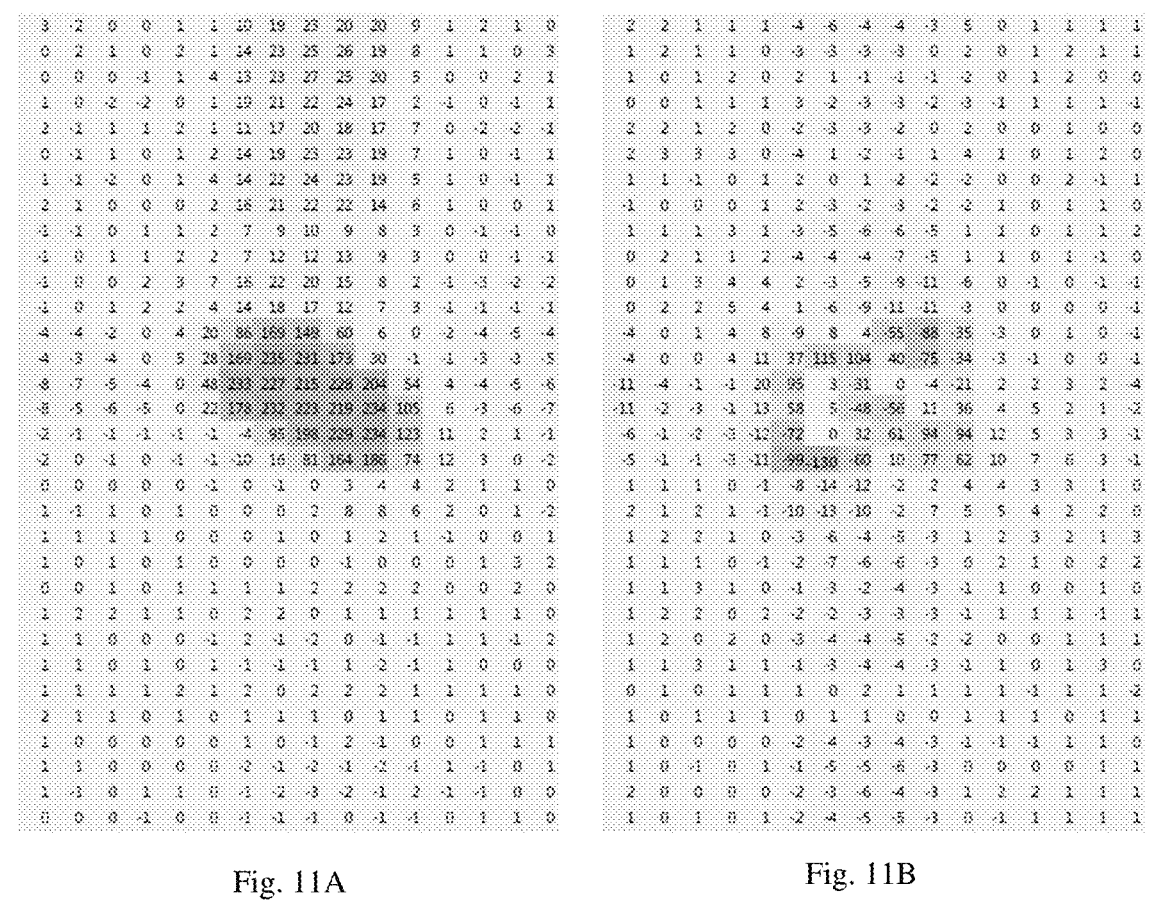

FIGS. 11A and 11B are views illustrating raw data outputted from the touch input device when an object such as a thumb comes into contact with a specific part of the touch surface of the touch input device having the structure of the touch sensor illustrated in FIG. 10.

Specifically, FIG. 11A is a view illustrating raw data outputted when the touch input device having the structure of the touch sensor illustrated in FIG. 10 is in the gripped state, and FIG. 11B is a view illustrating raw data outputted when the touch input device having the structure of the touch sensor illustrated in FIG. 10 is in the floating state.

The raw data illustrated in FIGS. 11A and 11B may be data derived through the following remapping process. When the driving signal is sequentially applied to the plurality of driving electrodes of the touch sensor illustrated in FIG. 10, the predetermined touch-position-related signal is outputted from the plurality of touch signal detection electrodes. The outputted touch-position-related signal is converted into the digital value (or the signal level value) corresponding to the touch-position-related signal by the touch signal detection unit 11a illustrated in FIG. 1A and then outputted. Further, the touch signal detection unit 11a illustrated in FIG. 1A perform mapping on the outputted digital values corresponding to the respective positions on the touch surface of the touch input device. Through the mapping process, the raw data illustrated in FIGS. 11A and 11B may be outputted.

The numbers designated to the raw data illustrated in FIGS. 11A and 11B may be expressed as integers, and when the corresponding integer is equal to or larger than a predetermined reference integer value, for example, +65, the touch signal detection unit 11a of the touch input device may identify or recognize that the object touches a part on which the corresponding number is positioned.

Referring to FIG. 11A, in the gripped state (normal situation), the data values distributed in a middle part of the raw data may have integer values relatively larger than the data values distributed in other parts. In contrast, referring to FIG. 11B, in the floating state, the digital values distributed in the middle part has a different aspect from FIG. 11A. Specifically, the entire middle part has a relatively small integer value in comparison with FIG. 11A, and some portions of the middle part even have a negative (−) value. This is caused by the LGM disturbance signal generated in the floating state, and as a result, the touch input device may erroneously recognize that two touches are made on the middle part instead of one touch or absolutely no touch is made on the middle part.

Figure 12:
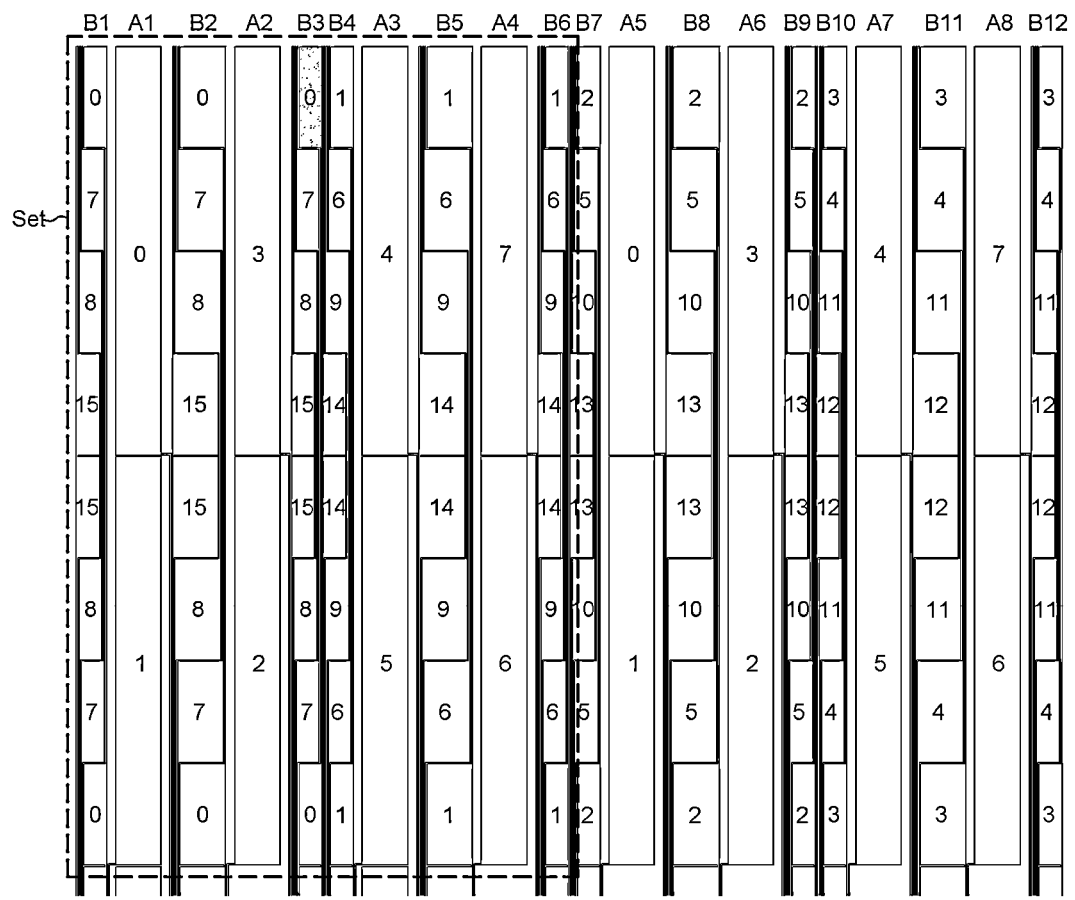
FIG. 12 is a view illustrating an enlarged part of still another example in which the touch sensor 10 illustrated in FIG. 1 is formed to have a single layer (1-layer).

FIG. 12 is a view illustrating an enlarged part of still another example in which the touch sensor 10 illustrated in FIG. 1 is formed to have a single layer (1-layer). However, in FIG. 1A, it is assumed that the touch signal detection electrode and the LGM disturbance signal detection electrode are physically separated as separate electrodes. However, according to the arrangement form illustrated in FIG. 12, some of the touch signal detection electrodes may function as the LGM disturbance signal detection electrodes.

Referring to FIG. 12, the touch sensor includes the plurality of driving electrodes TX1 to TXm and the plurality of touch signal detection electrodes RX1 to RXn. The plurality of driving electrodes TX1 to TXm and the plurality of touch signal detection electrodes RX1 to RXn are arranged in the form of a matrix on the same layer.

The plurality of driving electrodes TX1 to TXm and the plurality of touch signal detection electrodes RX1 to RXn may be made of a transparent electrically conductive material, for example, ITO (indium tin oxide) or ATO (antimony tin oxide) including tin oxide $SnO_2$ and indium oxide $In_2O_3$. However, this configuration is merely an example, and the driving electrodes TX1 to TXm and the touch signal detection electrodes RX1 to RXn may be made of another transparent electrically conductive material or an opaque electrically conductive material. For example, the driving electrodes TX1 to TXm and the touch signal detection electrodes RX1 to RXn may include at least one of silver ink, copper, nano silver, and carbon nanotube (CNT).

The driving electrodes TX1 to TXm and the touch signal detection electrodes RX1 to RXn may be implemented as a metal mesh. When the driving electrodes TX1 to TXm and the touch signal detection electrodes RX1 to RXn are implemented as a metal mesh, wires connected to the driving electrodes TX1 to TXm and the touch signal detection electrodes RX1 to RXn may be implemented as a metal mesh, and the wire, the driving electrodes TX1 to TXm, and the touch signal detection electrodes RX1 to RXn may be integrally implemented as a metal mesh. When the wire, the driving electrodes TX1 to TXm, and the touch signal detection electrodes RX1 to RXn are integrally implemented as a metal mesh, a dead zone, in which the touch position cannot be detected, such as a zone between the electrode and the wire and/or between the electrode and another electrode, is reduced, thereby further improving sensitivity in detecting the touch position.

The touch sensor is arranged based on the plurality of touch signal detection electrodes RX1 to RXn. Therefore, hereinafter, an arrangement structure of the plurality of touch signal detection electrodes RX1 to RXn will be described first, and then an arrangement structure of the plurality of driving electrodes TX1 to TXm will be described.

The plurality of touch signal detection electrodes RX1 to RXn is disposed in the plurality of columns A1, A2, A3, A4, A5, A6, A7, and A8, respectively. In this case, the plurality of driving electrodes TX1 to TXm is arranged between the plurality of columns A1, A2, A3, A4, A5, A6, A7, and A8 in which the touch signal detection electrodes RX1 to RXn are arranged, and the plurality of driving electrodes TX1 to TXm is arranged outside the first column A1 and in the plurality of columns B1, B2, B3, B4, B5, B6, B7, B8, B9, B10, B11, and B12 formed outside the eighth column A8. However, the present invention may be equally/similarly applied even in the case in which the driving electrode column is the column A and the touch signal detection electrode column is the column B The two driving electrodes TX1 to TXm adjacent to both sides based on the respective touch signal detection electrodes RX1 to RXn of the plurality of touch signal detection electrodes RX1 to RXn have identical characteristics. That is, the two driving electrodes TX1 to TXm adjacent to both sides based on the respective touch signal detection electrodes RX1 to RXn have an equal number. In this case, the configuration in which the two driving electrodes TX1 to TXm are identical to each other or the two driving electrodes TX1 to TXm have an equal number means that the two driving electrodes TX1 to TXm are electrically connected to each other through the wire. That is, the channels, which are identical to each other, may be implemented.

The touch sensor includes one or more sets in which the plurality of touch signal detection electrodes RX1 to RXn and the plurality of driving electrodes TX1 to TXm are disposed in a predetermined arrangement. The plurality of sets may be configured and repeatedly arranged in the row direction and the column direction.

One set may include the plurality of different touch signal detection electrodes RX1 to RXn. For example, one set may include the eight receiving electrodes including the 0th receiving electrode RX0 to the seventh receiving electrode RX7. The eight receiving electrodes RX0, RX1, RX2, RX3, RX4, RX5, RX6, and RX7 may be disposed in a predetermined arrangement. The eight receiving electrodes including the 0th receiving electrode RX0 to the eighth touch signal detection electrodes RX1 to RXn are divided into four columns A1, A2, A3, and A4 continuously disposed in the row direction. Therefore, the two receiving electrodes may be disposed from above to below in the four columns, respectively.

The plurality of touch signal detection electrodes having continuous numbers is disposed in the respective columns In this case, the arrangement order of the odd-numbered columns A1 and A3 may be opposite to the arrangement order of the even-numbered columns A2 and A4. For example, the touch signal detection electrodes RX0 and RX1 having continuous numbers are sequentially arranged in the first column A1 from above to below, the touch signal detection electrodes RX2 and RX3 having continuous numbers are sequentially arranged in the second column A2 from below to above, the touch signal detection electrodes RX4 and RX5 having continuous numbers are sequentially arranged in the third column A3 from above to below, and the touch signal detection electrodes RX6 and RX7 having continuous numbers are sequentially arranged in the fourth column A4 from below to above. In this case, although not illustrated in the drawings, the plurality of different touch signal detection electrodes included in one set may be randomly arranged without being sequentially arranged in the row or column direction.

Meanwhile, the touch sensor includes the plurality of driving electrodes TX1 to TXm, and for example, the plurality of driving electrodes TX1 to TXm may include the 0th driving electrode TX0 to the fifteenth driving electrode TX15. In this case, the respective driving electrodes may be disposed to satisfy the following arrangement conditions.

The plurality of driving electrodes TX1 to TXm are arranged to satisfy the following conditions. 1) Based on the respective touch signal detection electrodes RX1 to RXn, the four different driving electrodes are arranged at the left side, and the four different driving electrodes are arranged at the right side. 2) The two driving electrodes TX1 to TXm, which face each other based on the respective touch signal detection electrodes RX1 to RXn, have an equal number. 3) The three driving electrodes having an equal number are continuously arranged in the row direction. 4) The eight driving electrodes adjacent to the receiving electrodes RX1 in the even-numbered rows and the eight driving electrodes adjacent to the receiving electrodes RX0 in the odd-numbered rows are symmetrically arranged. 4) The length (horizontal length) of the driving electrodes arranged at both edges of each set and the driving electrodes arranged at the center of each set is half the length (horizontal length) of other driving electrodes.

In FIG. 12, the first-1 touch signal detection electrode RX0 and the first-2 touch signal detection electrode RX1 may be disposed in the column A1. In the second electrode column B2, the second-1' driving electrode TX15, the second-2' driving electrode TX8, the second-3' driving electrode TX7, and the second-4' driving electrode TX0 adjacently corresponding to the second-1 driving electrode TX0, the second-2 driving electrode TX7, the second-3 driving electrode TX8, the second-4 driving electrode TX15, and the first-2 touch signal detection electrode RX1 adjacently corresponding to the first-1 touch signal detection electrode RX0 may be disposed. Further, the second-1 driving electrode TX0 and the second-4' driving electrode TX0 may be electrically connected to each other by using a second-1 trace, the second-2 driving electrode TX7 and the second-3' driving electrode TX7 may be electrically connected to each other by using a second-2 trace, the second-3 driving electrode TX8 and the second-2' driving electrode TX8 may be electrically connected to each other by using a second-3 trace, and the second-4 driving electrode TX15 and the second-1' driving electrode TX15 may be electrically connected to each other by using a second-4 trace. Further, the mutual capacitance may be generated between the first-1 touch signal detection electrode RX0 and the second-1 driving electrode TX0, and the mutual capacitance may be generated between the first-2 touch signal detection electrode RX1 and the second-1' driving electrode TX15. Likewise, the mutual capacitance may be generated between the first-1 touch signal detection electrode RX0 and the second-2 driving electrode TX7, between the first-1 touch signal detection electrode RX0 and the second-3 driving electrode TX8, and between the first-1 touch signal detection electrode RX0 and the second-4 driving electrode TX15. The mutual capacitance may be generated between the first-2 touch signal detection electrode RX1 and the second-2' driving electrode TX8, between the first-2 touch signal detection electrode RX1 and the second-3' driving electrode TX7, and between the first-2 touch signal detection electrode RX1 and the second-4' driving electrode TX0.

That is, in the case of FIG. 12, at least two of the second electrodes TX0, TX7, TX8, and TX15 are disposed to be adjacently corresponding to the first touch signal detection electrode RX0, at least two of the other second electrodes TX0, TX7, TX8, and TX15 are disposed to be adjacently corresponding to another first touch signal detection electrode RX1, and then the electrodes, which have an equal number among at least two of the electrodes and at least two of the other electrodes, are connected by using one trace, such that the number of traces may be reduced in comparison with the structure in which all of the plurality of driving electrodes corresponding to one touch signal detection electrode are connected by using different traces, as illustrated in FIG. 9.

FIG. 12 illustrates that some of the touch signal detection electrodes are used as the LGM disturbance signal detection electrodes. However, according to another exemplary embodiment, the principle described above with reference to FIG. 12 may be equally/similarly applied even in the case in which the touch signal detection electrode and the LGM disturbance signal detection electrode are physically separated from each other as separate electrodes.

In the latter case, the plurality of touch signal detection electrode columns may be disposed first and then the plurality of LGM disturbance signal detection electrode columns may be disposed (or vice versa). The principle described above with reference to FIG. 12 may be equally/similarly applied even in the case in which the respective touch signal detection electrode columns and the respective LGM disturbance signal detection electrode columns are alternately disposed (in the form of RX-LX-RX-LX).

Figure 13:
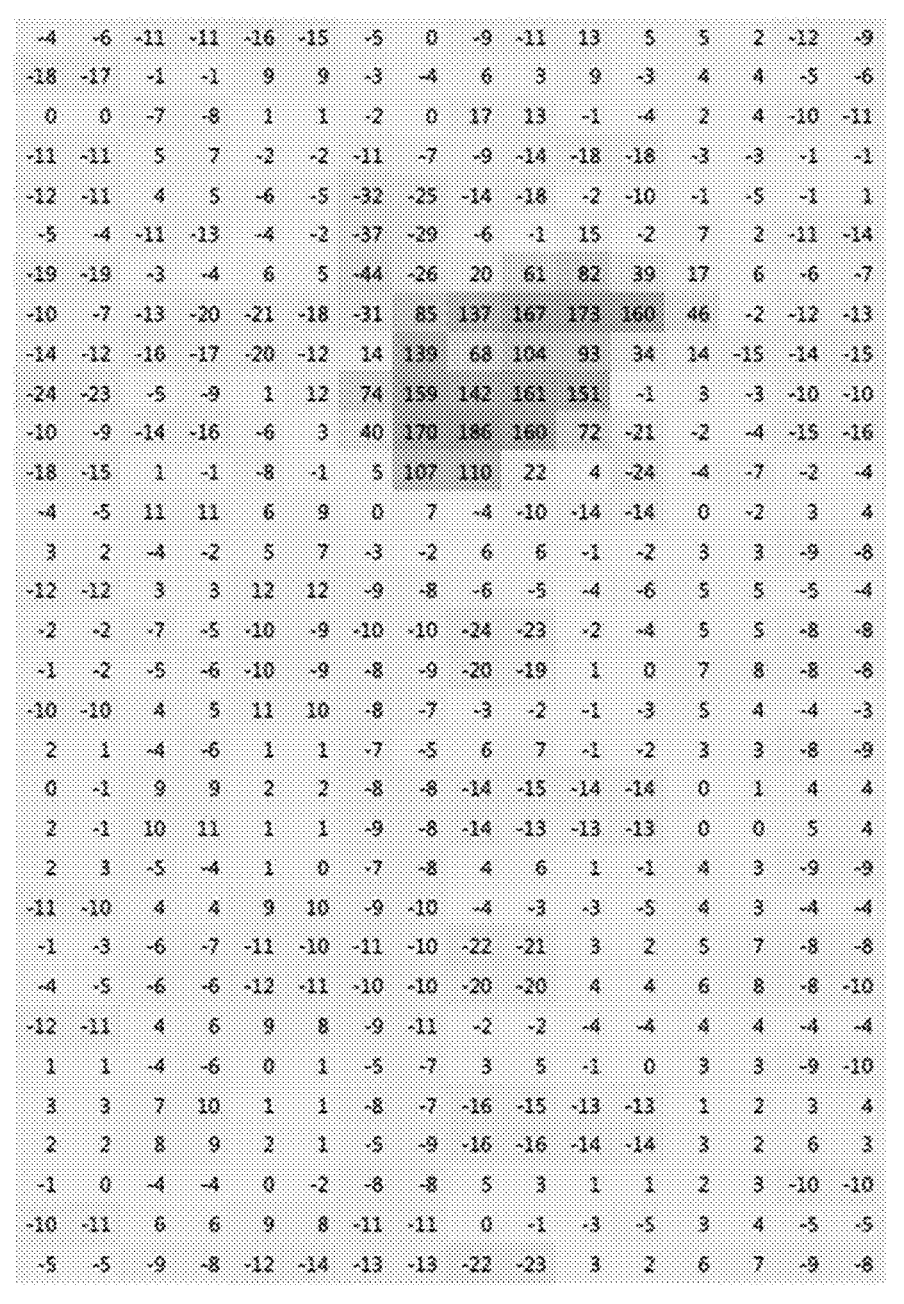

FIG. 13 is a view illustrating raw data when an object such as a thumb comes into contact with a specific part of the touch surface of the touch input device having the structure of the touch sensor illustrated in FIG. 12. Specifically, FIG. 13 illustrates raw data when the touch input device having the structure of the touch sensor illustrated in FIG. 12 is in the floating state.

Referring to FIG. 13, it is ascertained that the digital values (or the level values) outputted from the specific part in the floating state have relatively larger integer values than those in other parts.

With the comparison between the raw data illustrated in FIG. 13 and the raw data illustrated in FIG. 11B, it can be ascertained that in the floating state, the structure of the touch sensor illustrated in FIG. 12 improve the LGM more than the structure of the touch sensor illustrated in FIG. 10.

Figure 14:
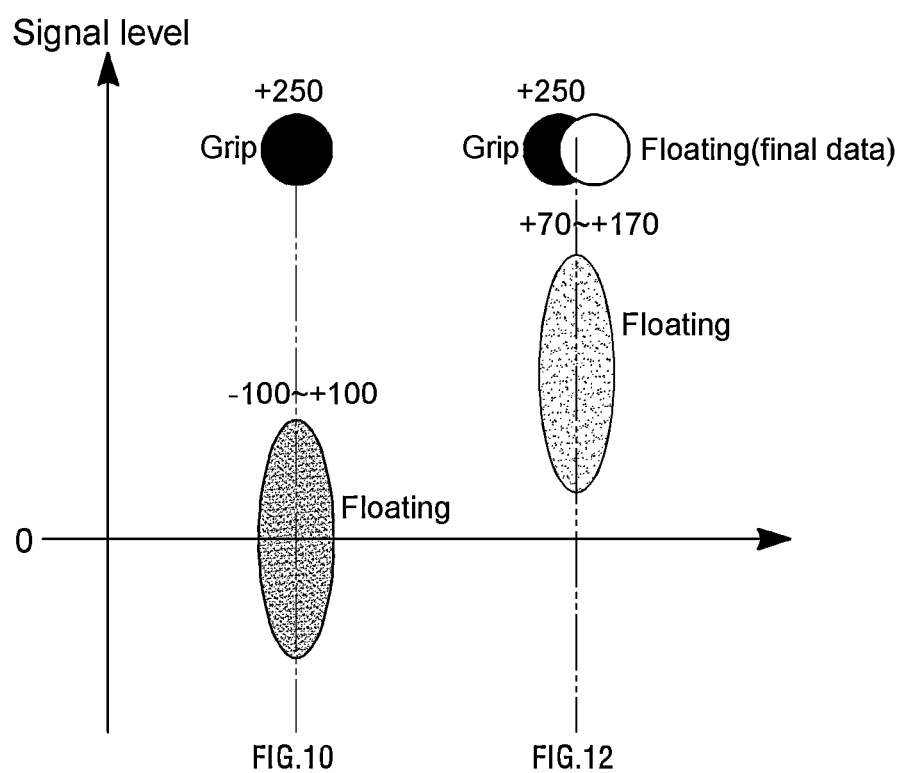
FIG. 14 is a graph approximately comparing LGM performances of the touch sensors illustrated in FIGS. 10 and 12.

FIG. 14 is a graph approximately comparing LGM performances of the touch sensors illustrated in FIGS. 10 and 12.

Referring to FIG. 14, in the case of the touch sensor illustrated in FIG. 10, the relatively large level values, among the level values in the touch region, have a value of approximately +250 in the gripped state, but the relatively large level values have a value of −100 to +100 in the floating state.

Meanwhile, in the case of the touch sensor illustrated in FIG. 12, the relatively large level values, among the level values in the touch region, have a level value of approximately +250 in the gripped state, but the relatively large level values have a value of +70 to +170 in the floating state.

According to the graph in FIG. 14, the touch input device having the touch sensor illustrated in FIG. 10 cannot accurately recognize whether the touch is made and the touch position in the floating state. However, because the touch input device having the touch sensor illustrated in FIG. 12 has the relatively large level values of +70 or more even in the floating state, there is no problem when the touch input device having the touch sensor illustrated in FIG. 12 recognizes whether the touch is made and the touch position. However, the configuration in which even in the floating state, the relatively large level values +250 are outputted, like in the gripped state or similar to the gripped state in which the relatively large level value is +250, is very important when the touch input device recognizes whether the touch is made and/or the touch position.

Hereinafter, the touch sensor and the touch input device including the touch sensor, which are capable of allowing the touch input device having the touch sensor (1-layer) illustrated in FIGS. 9 and 10 and the touch sensor having the double layer (2 layer) illustrated in FIGS. 2 and 3 as well as the touch sensor (1-layer) illustrated in FIG. 12 to output the signal level value in the floating state (floating (final data)), like or similar to the signal level value outputted in the gripped state, will be described in detail with reference to the drawings.

The touch sensor having the single layer or double layer structure may be applied even to any one of the features illustrated in FIGS. 4A to 4E. That is, the method to be described below may be applied to the touch sensors having all currently known structures and the touch input device including the same. In addition, although not illustrated in a separate drawing, in the touch sensor having the double layer structure, one of the plurality of driving electrodes and the plurality of receiving electrodes may be disposed between the touch surface and the display panel, and another of the plurality of driving electrodes and the plurality of receiving electrodes may be disposed in the display panel.

The exemplary embodiment of the present invention is not applied only to the touch input device having the touch sensor illustrated in FIGS. 2, 3, 9, 10, and 12, but may also be applied to the touch input device having the touch sensor having another single layer structure or a double layer structure which is not illustrated in the present specification. As another specific example, the exemplary embodiment of the present invention may also be applied to the touch input device having the touch sensor illustrated in FIGS. 15 and 16.

Figure 15:
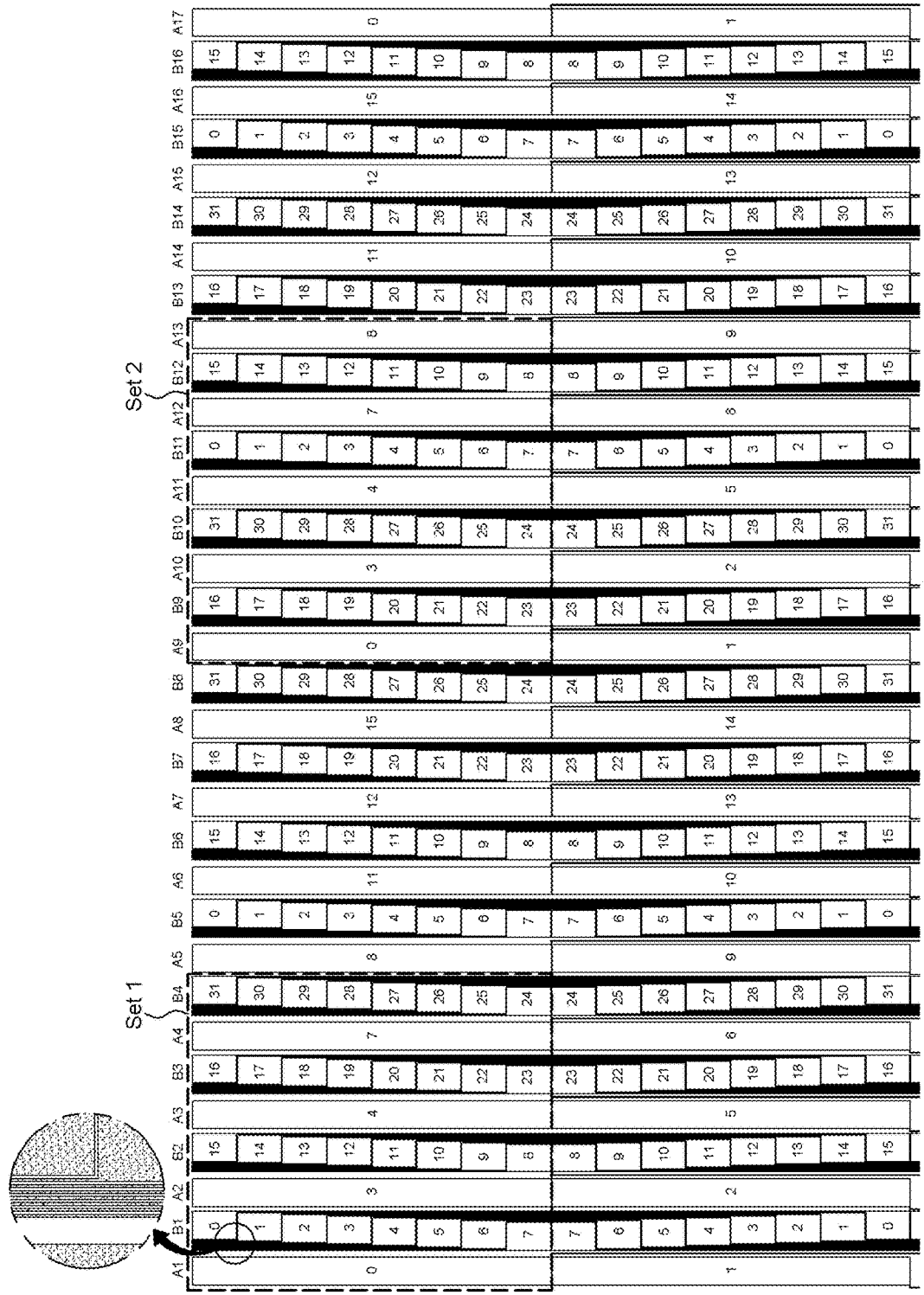
FIG. 15 is a view illustrating an enlarged part of still another example in which the touch sensor 10 illustrated in FIG. 1 is formed to have a single layer (1-layer).

FIG. 15 is a view illustrating an enlarged part of still another example in which the touch sensor 10 illustrated in FIG. 1A is formed to have a single layer (1-layer). However, in FIG. 1A, it is assumed that the touch signal detection electrode and the LGM disturbance signal detection electrode are physically separated as separate electrodes. However, in FIG. 15, some of the touch signal detection electrodes may function as the LGM disturbance signal detection electrodes.

Referring to FIG. 15, the touch sensor according to the exemplary embodiment includes the plurality of driving electrodes TX and the plurality of touch signal detection electrodes RX. The plurality of driving electrodes TX and the plurality of touch signal detection electrodes RX are arranged in the form of matrix.

The plurality of driving electrodes TX and the plurality of touch signal detection electrodes RX may be made of a transparent electrically conductive material, for example, ITO (indium tin oxide) or ATO (antimony tin oxide) including tin oxide $SnO_2$ and indium oxide $In_2O_3$. However, this configuration is merely an example, and the driving electrodes TX and the touch signal detection electrodes RX may be made of another transparent electrically conductive material or an opaque electrically conductive material. For example, the driving electrodes TX and the touch signal detection electrodes RX may include at least one of silver ink, copper, nano silver, and carbon nanotube (CNT).

The driving electrodes TX and the touch signal detection electrodes RX may be implemented as a metal mesh. When the driving electrodes TX and the touch signal detection electrodes RX are implemented as a metal mesh, a wire connected to the driving electrodes TX and the touch signal detection electrodes RX may be implemented as a metal mesh, and the wire, the driving electrode TX and the touch signal detection electrode RX may also be integrally implemented as a metal mesh. When the wire, the driving electrodes TX, and the touch signal detection electrode RX are integrally implemented as a metal mesh, a dead zone, in which the touch position cannot be detected, such as a zone between the electrode and the wire and/or between the electrode and another electrode, is reduced, thereby further improving sensitivity in detecting the touch position.

The touch sensor according to the exemplary embodiment is arranged based on the plurality of driving electrodes TX. Therefore, hereinafter, an arrangement structure of the plurality of driving electrodes TX disposed in the columns B1 to B16 will be described first, and then an arrangement structure of the plurality of touch signal detection electrodes RX will be described.

The plurality of driving electrodes TX is disposed in the plurality of columns B1, B2, B3, B4, B5, B6, B7, B8, B9, B10, B11, B12, B13, B14, B15, and B16, respectively. In this case, the plurality of touch signal detection electrodes RX is arranged between the plurality of columns B1, B2, B3, B4, B5, B6, B7, B8, B9, B10, B11, B12, B13, B14, B15, and B16 in which the driving electrodes TX are arranged, and the plurality of touch signal detection electrodes RX is arranged outside the first column B1 and in the plurality of columns A1, A2, A3, A4, A5, A6, A7, A8, A9, A10, A11, A12, A13, A14, A15, and A16 formed outside the sixteenth column B16. However, the present invention may be equally/similarly applied even in the case in which the driving electrode column is the column A and the touch signal detection electrode column is the column B.

The two touch signal detection electrodes RX adjacent to both sides based on each of the plurality of driving electrodes TX have different characteristics. That is, the two touch signal detection electrodes RX adjacent to both sides based on each of the driving electrodes TX have different numbers. In this case, the configuration in which the two touch signal detection electrodes RX are different from each other or the two touch signal detection electrodes RX have different numbers means that the two touch signal detection electrodes RX are connected through different traces.

The plurality of driving electrodes TX includes a first set (Set 1) in which the thirty-two driving electrodes including the 0th driving electrode TX0 to the thirty-first driving electrode TX31 are disposed in a first arrangement, and a second set (Set 2) in which the thirty-two driving electrodes including the 0th driving electrode TX0 to the thirty-first driving electrode TX31 are disposed in a second arrangement.

The two first sets (Set 1) may be continuously provided in the row direction, and the two first sets (Set 1) may be continuously provided in the column direction. The first set (Set 1) positioned in the even-numbered row and the first set (Set 1) positioned in the odd-numbered row may be symmetric.

The two second sets (Set 2) may be continuously provided in the row direction, and the two second sets (Set 2) may be continuously provided in the column direction. The second set (Set 2) positioned in the even-numbered row and the second set (Set 2) positioned in the odd-numbered row may be symmetric.

The plurality of second sets may be disposed at one side of the plurality of first sets.

In the first arrangement of the first set (Set 1), the thirty-two driving electrodes including the 0th driving electrode TX0 to the thirty-first driving electrode TX31 are arranged and divided into the four columns continuously disposed in the row direction, the driving electrodes having numbers of 0 to 7 are arranged in the first column in the order of TX0, TX1, TX2, TX3, TX4, TX5, TX6, and TX7 from above to below, the driving electrodes having numbers of 8 to 15 are arranged in the second column in the order of TX15, TX14, TX13, TX12, TX11, TX10, TX9, and TX8 from above to below, the driving electrodes having numbers of 16 to 23 are arranged in the third column in the order of TX16, TX17, TX18, TX19, TX20, TX21, TX22, and TX23 from above to below, and the driving electrodes having numbers of 24 to 31 are arranged in the fourth column in the order of TX31, TX30, TX29, TX28, TX27, TX26, TX25, and TX24 from above to below.

In the second arrangement of the second set (Set 2), the thirty-two driving electrodes including the 0th driving electrode TX0 to the thirty-first driving electrode TX31 are arranged and divided into the four columns continuously disposed in the row direction, the driving electrodes having numbers of 16 to 23 are arranged in the first column in the order of TX16, TX17, TX18, TX19, TX20, TX21, TX22, and TX23 from above to below, the driving electrodes having numbers of 24 to 31 are arranged in the second column in the order of TX31, TX30, TX29, TX28, TX27, TX26, TX25, and TX24 from above to below, the driving electrodes having numbers of 0 to 7 are arranged in the third column in the order of TX0, TX1, TX2, TX3, TX4, TX5, TX6, and TX7 from above to below, and the driving electrodes having numbers of 8 to 15 are arranged in the fourth column in the order of TX15, TX14, TX13, TX12, TX11, TX10, TX9, and TX8 from above to below.

Meanwhile, the touch sensor according to the exemplary embodiment includes the plurality of touch signal detection electrodes RX. For example, the plurality of touch signal detection electrodes RX may include the 0th touch signal detection electrode RX0 to the fifteenth touch signal detection electrode RX15. In this case, the respective touch signal detection electrodes may be disposed to satisfy the following arrangement conditions.

The plurality of touch signal detection electrodes RX is arranged to satisfy the following conditions. 1) Based on the eight different driving electrodes TX continuously disposed in the column direction, one touch signal detection electrode is disposed at the left side, and one touch signal detection electrode is disposed at the right side. 2) The two touch signal detection electrodes RX, which face each other based on the eight different driving electrodes TX continuously disposed in the column direction, have different numbers. 3) The two different touch signal detection electrodes RX are arranged in the column direction, and the eight different touch signal detection electrodes RX are repeatedly arranged in the row direction. 4) The length (horizontal length) of the touch signal detection electrodes arranged in the column direction at both edges may be equal to the length (horizontal length) of other touch signal detection electrodes, but the present invention is not limited thereto, and the length (horizontal length) of the touch signal detection electrodes may be half the length (horizontal length) of other touch signal detection electrodes.

In the case of FIG. 15, according to the exemplary embodiment, it is possible to obtain only the value of the amount of change in pure mutual capacitance by subtracting the signal value outputted from the other predetermined touch signal detection electrode used as the LGM disturbance signal detection electrode from the signal value outputted from the predetermined touch signal detection electrode.

According to another exemplary embodiment, even in the case in which the touch signal detection electrode and the LGM disturbance signal detection electrode are physically separated as separate electrodes, the feature described above with reference to FIG. 15 may be equally/similarly applied.

In the latter case, the plurality of touch signal detection electrode columns may be disposed first and then the plurality of LGM disturbance signal detection electrode columns may be disposed (or vice versa). The feature described above with reference to FIG. 15 may be equally/similarly applied even in the case in which the respective touch signal detection electrode columns and the respective LGM disturbance signal detection electrode columns are alternately disposed (in the form of RX-LX-RX-LX).

Figure 16:
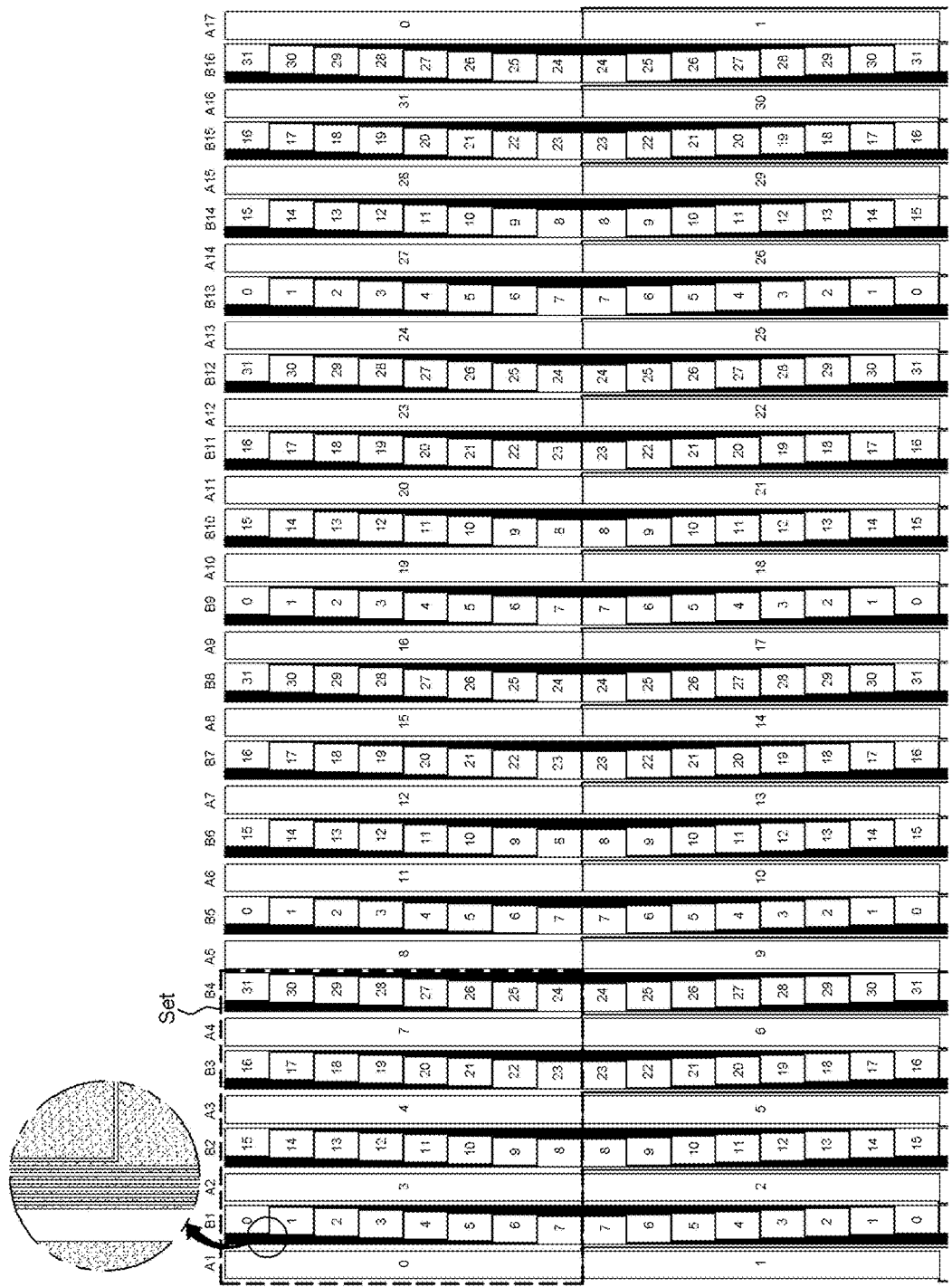
FIG. 16 is a view illustrating an enlarged part of still yet another example in which the touch sensor 10 illustrated in FIG. 1 is formed to have a single layer (1-layer).

FIG. 16 is a view illustrating an enlarged part of still yet another example in which the touch sensor 10 illustrated in FIG. 1A is formed to have a single layer (1-layer). However, in FIG. 1A, it is assumed that the touch signal detection electrode and the LGM disturbance signal detection electrode are physically separated as separate electrodes. However, in FIG. 16, some of the touch signal detection electrodes may function as the LGM disturbance signal detection electrodes.

Referring to FIG. 16, the touch sensor according to the exemplary embodiment includes the plurality of driving electrodes TX and the plurality of touch signal detection electrodes RX. The plurality of driving electrodes TX and the plurality of touch signal detection electrodes RX are arranged in the form of a matrix.

The plurality of driving electrodes TX and the plurality of touch signal detection electrodes RX may be made of a transparent electrically conductive material, for example, ITO (indium tin oxide) or ATO (antimony tin oxide) including tin oxide $SnO_2$ and indium oxide $In_2O_3$. However, this configuration is merely an example, and the driving electrodes TX and the touch signal detection electrodes RX may be made of another transparent electrically conductive material or an opaque electrically conductive material. For example, the driving electrodes TX and the touch signal detection electrodes RX may include at least one of silver ink, copper, nano silver, and carbon nanotube (CNT).

The driving electrodes TX and the touch signal detection electrodes RX may be implemented as a metal mesh. When the driving electrodes TX and the touch signal detection electrodes RX are implemented as a metal mesh, a wire connected to the driving electrodes TX and the touch signal detection electrodes RX may be implemented as a metal mesh, and the wire, the driving electrode TX and the touch signal detection electrode RX may also be integrally implemented as a metal mesh. When the wire, the driving electrodes TX, and the touch signal detection electrode RX are integrally implemented as a metal mesh, a dead zone, in which the touch position cannot be detected, such as a zone between the electrode and the wire and/or between the electrode and another electrode, is reduced, thereby further improving sensitivity in detecting the touch position.

The touch sensor according to the exemplary embodiment is arranged based on the plurality of driving electrodes TX. Therefore, hereinafter, an arrangement structure of the plurality of driving electrodes TX disposed in the columns B1 to B16 will be described first, and then an arrangement structure of the plurality of touch signal detection electrodes RX will be described.

The plurality of driving electrodes TX is disposed in the plurality of columns B1, B2, B3, B4, B5, B6, B7, B8, B9, B10, B11, B12, B13, B14, B15, and B16, respectively. In this case, the plurality of touch signal detection electrodes RX is arranged between the plurality of columns B1, B2, B3, B4, B5, B6, B7, B8, B9, B10, B11, B12, B13, B14, B15, and B16 in which the driving electrodes TX are arranged, and the plurality of touch signal detection electrodes RX is arranged outside the first column B1 and in the plurality of columns A1, A2, A3, A4, A5, A6, A7, A8, A9, A10, A11, A12, A13, A14, A15, and A16 formed outside the sixteenth column B16. However, the present invention may be equally/similarly applied even in the case in which the driving electrode column is the column A and the touch signal detection electrode column is the column B.

The two touch signal detection electrodes RX adjacent to both sides based on each of the plurality of driving electrodes TX have different characteristics. That is, the two touch signal detection electrodes RX adjacent to both sides based on each of the driving electrodes TX have different numbers. In this case, the configuration in which the two touch signal detection electrodes RX are different from each other or the two touch signal detection electrodes RX have different numbers means that the two touch signal detection electrodes RX are connected through different traces.

The plurality of driving electrodes TX includes the set in which the thirty-two driving electrodes including the 0th driving electrode TX0 to the thirty-first driving electrode TX31 are disposed in the first arrangement. In this case, the plurality of sets may be repeatedly arranged in the row direction and the column direction. The set positioned in the even-numbered row and the set positioned in the odd-numbered row may be symmetric.

In the first arrangement of each of the sets, the thirty-two driving electrodes including the 0th driving electrode TX0 to the thirty-first driving electrode TX31 are arranged in the four columns continuously disposed in the row direction, the driving electrodes having numbers of 0 to 7 are arranged in the first column in the order of TX0, TX1, TX2, TX3, TX4, TX5, TX6, and TX7 from above to below, the driving electrodes having numbers of 8 to 15 are arranged in the second column in the order of TX15, TX14, TX13, TX12, TX11, TX10, TX9, and TX8 from above to below, the driving electrodes having numbers of 16 to 23 are arranged in the third column in the order of TX16, TX17, TX18, TX19, TX20, TX21, TX22, and TX23 from above to below, and the driving electrodes having numbers of 24 to 31 are arranged in the fourth column in the order of TX31, TX30, TX29, TX28, TX27, TX26, TX25, and TX24 from above to below.

Meanwhile, the touch sensor according to the exemplary embodiment includes the plurality of touch signal detection electrodes RX. For example, the plurality of touch signal detection electrodes RX may include the 0th touch signal detection electrode RX0 to the thirty-first touch signal detection electrode RX31. In this case, the respective touch signal detection electrodes may be disposed to satisfy the following arrangement conditions.

The plurality of touch signal detection electrodes RX is arranged to satisfy the following conditions. 1) Based on the eight different driving electrodes TX continuously disposed in the column direction, one touch signal detection electrode is arranged at the left side, and one touch signal detection electrode is arranged at the right side. 2) The two touch signal detection electrodes RX, which face each other based on the eight different driving electrodes TX continuously disposed in the column direction, have different numbers. 3) The two different touch signal detection electrodes are arranged in the column direction, and the sixteen different touch signal detection electrodes are repeatedly arranged in the row direction. 4) The length (horizontal length) of the touch signal detection electrodes arranged in the column direction at both edges may be equal to the length (horizontal length) of other touch signal detection electrodes, but the present invention is not limited thereto, and the length (horizontal length) of the touch signal detection electrodes may be half the length (horizontal length) of other touch signal detection electrodes.

In the case of FIG. 16, according to the exemplary embodiment, it is possible to obtain only the value of the amount of change in pure mutual capacitance by subtracting the signal value outputted from the other predetermined touch signal detection electrode used as the LGM disturbance signal detection electrode from the signal value outputted from the predetermined touch signal detection electrode.

According to another exemplary embodiment, even in the case in which the touch signal detection electrode and the LGM disturbance signal detection electrode are physically separated as separate electrodes, the feature described above with reference to FIG. 16 may be equally/similarly applied.

In the latter case, the plurality of touch signal detection electrode columns may be disposed first and then the plurality of LGM disturbance signal detection electrode columns may be disposed (or vice versa). The feature described above with reference to FIG. 16 may be equally/similarly applied even in the case in which the respective touch signal detection electrode columns and the respective LGM disturbance signal detection electrode columns are alternately disposed (in the form of RX-LX-RX-LX).

Figure 17:
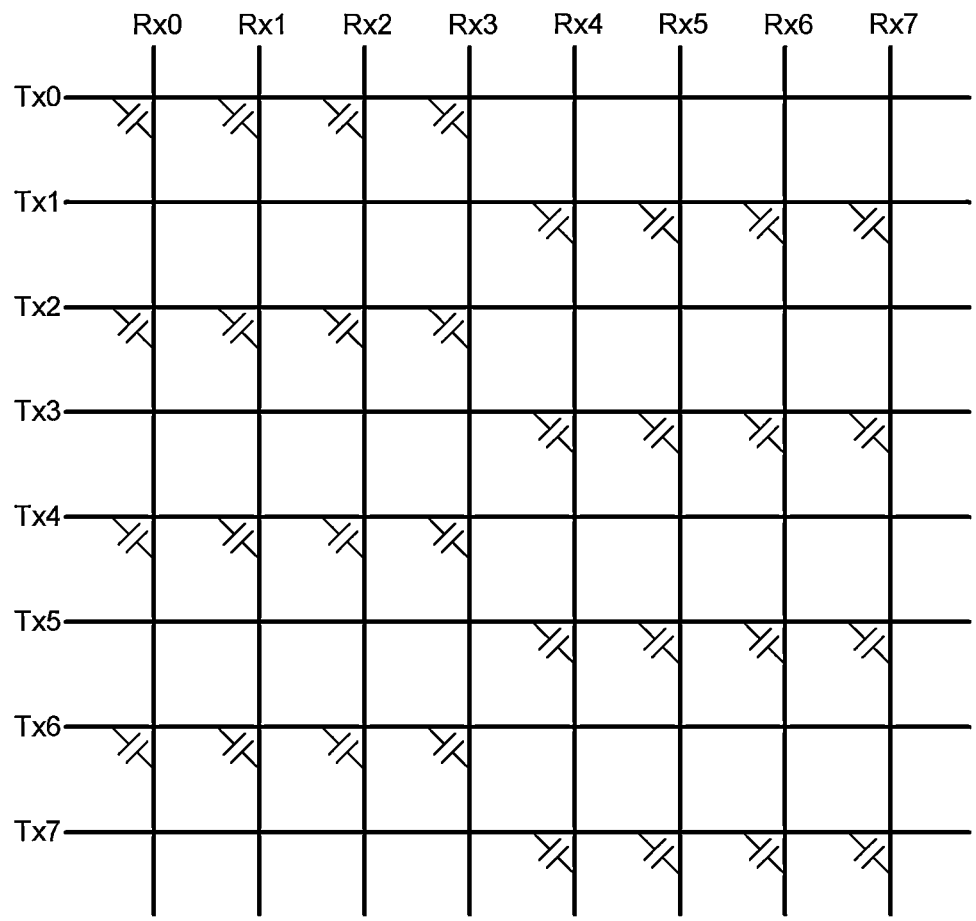
FIG. 17 is an illustrative conceptual view illustrating a conceptualized touch sensor according to the exemplary embodiment of the present invention.

FIG. 17 is an illustrative conceptual view illustrating a conceptualized touch sensor according to the exemplary embodiment of the present invention. However, in FIG. 1A, it is assumed that the touch signal detection electrode and the LGM disturbance signal detection electrode are physically separated as separate electrodes. However, in FIG. 17, some of the touch signal detection electrodes may function as the LGM disturbance signal detection electrodes.

Referring to FIG. 17, the touch sensor according to the exemplary embodiment of the present invention includes the plurality of driving electrodes TX0 to TX7 and the plurality of touch signal detection electrodes RX0 to RX7. In this case, the plurality of driving electrodes TX0 to TX7 and the plurality of touch signal detection electrodes RX0 to RX7 may be formed on the single layer as illustrated in FIG. 10 or 12 or formed on the double layer as illustrated in FIG. 2 or 3.

The touch sensor according to the exemplary embodiment of the present invention, which includes the plurality of driving electrodes TX0 to TX7 and the plurality of touch signal detection electrodes RX0 to RX7, includes nodes that form the mutual capacitance Cm between the plurality of driving electrodes TX0 to TX7 and the plurality of touch signal detection electrodes RX0 to RX7, and nodes that do not form the mutual capacitance Cm.

For example, in FIG. 17, the nodes, which form the mutual capacitance Cm, are (Tx0, Rx0), (Tx0, Rx1), (Tx0, Rx2), (Tx0, Rx3), (Tx1, Rx4), (Tx1, Rx5), (Tx1, Rx6), (Tx1, Rx7), (Tx2, Rx0), (Tx2, Rx1), (Tx2, Rx2), (Tx2, Rx3), (Tx3, Rx4), (Tx3, Rx5), (Tx3, Rx6), (Tx3, Rx7), (Tx4, Rx0), (Tx4, Rx1), (Tx4, Rx2), (Tx4, Rx3), (Tx5, Rx4), (Tx5, Rx5), (Tx5, Rx6), (Tx5, Rx7), (Tx6, Rx0), (Tx6, Rx1), (Tx6, Rx2), (Tx6, Rx3), (Tx7, Rx4), (Tx7, Rx5), (Tx7, Rx6), and (Tx7, Rx7).

The detection signal outputted from the predetermined touch signal detection electrodes of the nodes, which form the mutual capacitance Cm, includes noise information as well as information about the amount of change in capacitance made by the touch of the object. In this case, the noise information includes information about the amount of change in capacitance made by the LGM disturbance signal generated in the floating state. Therefore, when the detection signal received from each of the touch signal detection electrodes of the nodes, which form the mutual capacitance Cm, is converted into the predetermined level value and then outputted, the outputted level value made by reflecting the information about the amount of change in mutual capacitance and the noise information.

Meanwhile, in FIG. 17, the nodes, which do not form the mutual capacitance Cm, are (Tx0, Rx4), (Tx0, Rx5), (Tx0, Rx6), (Tx0, Rx7), (Tx1, Rx0), (Tx1, Rx1), (Tx1, Rx2), (Tx1, Rx3), (Tx2, Rx4), (Tx2, Rx5), (Tx2, Rx6), (Tx2, Rx7), (Tx3, Rx0), (Tx3, Rx1), (Tx3, Rx2), (Tx3, Rx3), (Tx4, Rx4), (Tx4, Rx5), (Tx4, Rx6), (Tx4, Rx7), (Tx5, Rx0), (Tx5, Rx1), (Tx5, Rx2), (Tx5, Rx3), (Tx6, Rx4), (Tx6, Rx5), (Tx6, Rx6), (Tx6, Rx7), (Tx7, Rx0), (Tx7, Rx1), (Tx7, Rx2), and (Tx7, Rx3).

The detection signal outputted from the other predetermined touch signal detection electrodes of the nodes, which do not form the mutual capacitance Cm, may include only the noise information. That is, the other predetermined touch signal detection electrodes may be used as the LGM disturbance signal detection electrodes.

Therefore, the touch input device according to the exemplary embodiment of the present invention having the touch sensor may remove the noise information and obtain the information about the amount of change in capacitance made by the touch of the object by subtracting the detection signal (the second detection signal) outputted from the other predetermined touch signal detection electrodes of the nodes, which do not form the mutual capacitance Cm, from the detection signal (the first detection signal) outputted from the predetermined touch signal detection electrodes of the nodes that form the mutual capacitance Cm. Therefore, a digital value (or a signal level value) corresponding to a final detection signal made by subtracting the detection signal outputted from the other predetermined touch signal detection electrodes of the nodes, which do not form the mutual capacitance Cm, from the detection signal outputted from the predetermined touch signal detection electrodes of the nodes, which form the mutual capacitance Cm by the touch input device, is a value made based on the information about the amount of change in capacitance made by the touch of the object. As a result, even though the touch input device is in the floating state, it is possible to output the digital value equal to or almost similar to the digital value outputted in the gripped state.

In this case, more particularly, the touch input device according to the exemplary embodiment of the present invention may subtract a value made by multiplying a predetermined factor and the detection signal (the second detection signal) outputted from the other predetermined touch signal detection electrodes of the nodes, which do not form the mutual capacitance Cm, from the detection signal (the first detection signal) outputted from the predetermined touch signal detection electrodes of the nodes that form the mutual capacitance Cm. The reason why the second detection signal is multiplied by the factor is to compensate for a change in dimension of the detection signal that may be caused by a structural difference between an active channel and a dummy channel. For example, the factor may have a predetermined value such as 0.8, but the present invention is not limited thereto, and the value of the factor may vary in accordance with design.

Hereinafter, a specific example will be described with reference to FIGS. 18 to 24.

Figure 18:
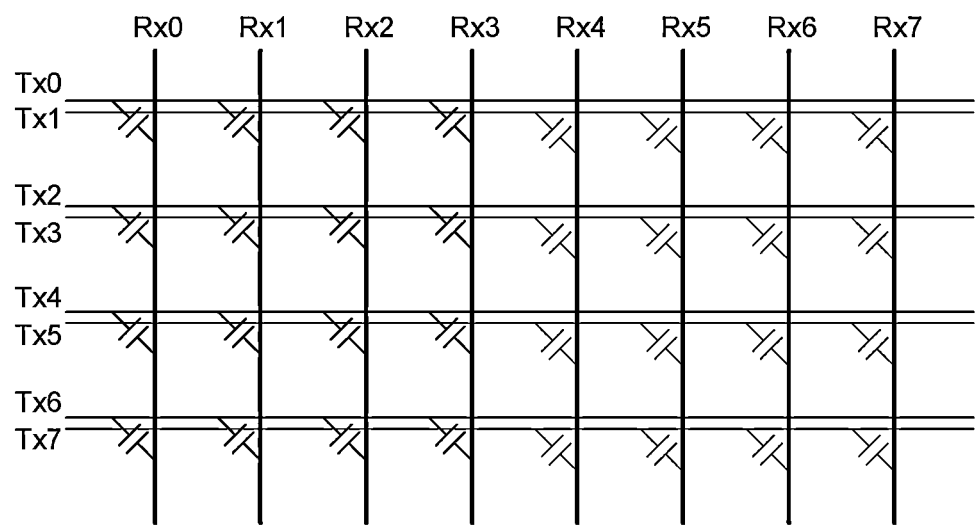
FIG. 18 is a conceptual view illustrating a conceptualized touch sensor according to the exemplary embodiment of the present invention illustrated in FIG. 12.

FIG. 18 is a conceptual view illustrating a conceptualized touch sensor according to the exemplary embodiment of the present invention illustrated in FIG. 12.

Referring to FIG. 18, the touch sensor according to the exemplary embodiment of the present invention includes the plurality of driving electrodes TX0 to TX7 and the plurality of touch signal detection electrodes RX0 to RX7. No mutual capacitance may be detected from at least some of the plurality of touch signal detection electrodes RX0 to RX7.

In this case, which touch signal detection electrodes among the plurality of touch signal detection electrodes RX0 to RX7 are used as the LGM disturbance signal detection electrodes is determined based on the driving electrodes to which the driving signal is applied.

For example, when the driving signal is applied to the 0th driving electrode TX0, the fourth touch signal detection electrode Rx4, the fifth touch signal detection electrode Rx5, the sixth touch signal detection electrode Rx6, and the seventh touch signal detection electrode Rx7, among the plurality of touch signal detection electrodes Rx0 to Rx7, are used as the LGM disturbance signal detection electrodes. In other words, when the driving signal is applied to the 0th driving electrode Tx0, the fourth, fifth, sixth, and seventh touch signal detection electrodes Rx4, Rx5, Rx6, and Rx7 are used as the LGM disturbance signal detection electrodes that do not form the mutual capacitance Cm with the 0th driving electrode Tx0, and the 0th, first, second, and third touch signal detection electrodes Rx0, Rx1, Rx2, and Rx3 are used as the touch signal detection electrodes that form the mutual capacitance Cm with the 0th driving electrode Tx0.

If the driving signal is applied to the first driving electrode Tx1, the fourth, fifth, sixth, and seventh touch signal detection electrodes Rx4, Rx5, Rx6, and Rx7 are used as the touch signal detection electrodes that form the mutual capacitance Cm with the first driving electrode Tx1, and the 0th, first, second, and third touch signal detection electrodes Rx0, Rx1, Rx2, and Rx3 are used as the LGM disturbance signal detection electrodes that do not form the mutual capacitance Cm with the first driving electrode Tx1.

The touch input device according to the exemplary embodiment of the present invention having the touch sensor may remove the information about the amount of change in capacitance made by the noise information, particularly, the LGM disturbance signal by subtracting the detection signal outputted from the other predetermined touch signal detection electrodes of the nodes, which do not form the mutual capacitance Cm, from the detection signal outputted from the predetermined touch signal detection electrodes of the nodes that form the mutual capacitance Cm. In this case, the touch input device according to the exemplary embodiment of the present invention having the touch sensor may subtract a value made by multiplying a predetermined factor and the detection signal outputted from the other predetermined touch signal detection electrodes of the nodes, which do not form the mutual capacitance Cm, from the detection signal outputted from the predetermined touch signal detection electrodes of the nodes that form the mutual capacitance Cm.

Figure 19A:
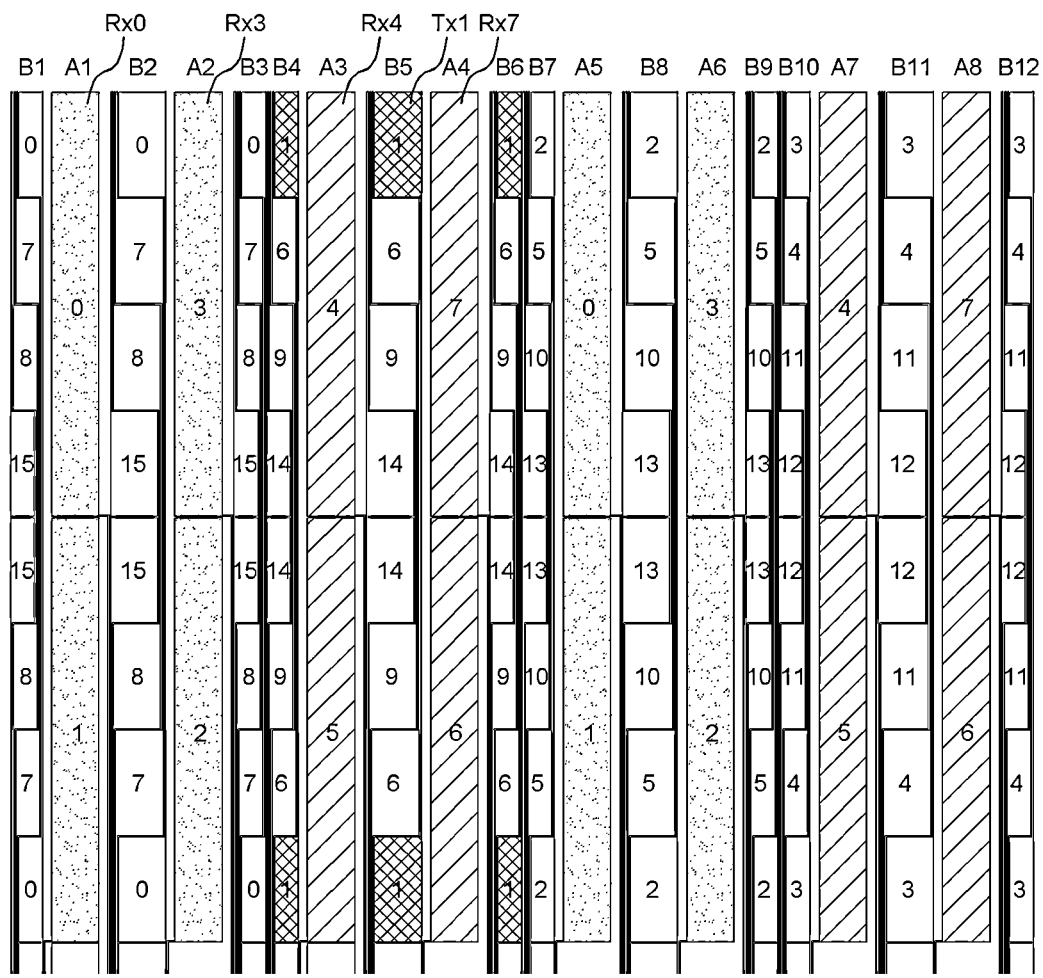
FIG. 19A is a view for explaining an example in which some of a plurality of touch signal detection electrodes of the touch sensor illustrated in FIG. 12 are used as LGM disturbance signal detection electrodes.

FIG. 19A is an illustrative view for explaining a case in which some of the plurality of touch signal detection electrodes of the touch sensor illustrated in FIG. 12 are used as the LGM disturbance signal detection electrodes. In FIG. 19A, the principle described above with reference to FIG. 12 may be equally/similarly applied, and the principle described above with reference to FIG. 17 may be equally/similarly applied.

In particular, referring to FIG. 19A, when the driving signal is applied to the first driving electrode Tx1, the touch signal detection electrodes Rx4, Rx5, Rx6, and Rx7 disposed to be adjacent to the first driving electrode Tx1 may be used as the predetermined touch signal detection electrodes that form the mutual capacitance Cm with the first driving electrode Tx1, and the touch signal detection electrodes Rx0, Rx1, Rx2, and Rx3 disposed to be spaced apart from the first driving electrode Tx1 at a predetermined distance may be defined as the other predetermined touch signal detection electrodes used as the LGM disturbance signal detection electrodes that do not form the mutual capacitance Cm with the first driving electrode Tx1. Specifically, in FIG. 19A, the other predetermined touch signal detection electrodes RX0, RX1, RX2, and Rx3 used as the LGM disturbance signal detection electrodes are spaced apart from the first driving electrode Tx1 at a predetermined distance, thereby satisfying the condition in which the mutual capacitance Cm need not be formed and the other predetermined touch signal detection electrodes RX0, RX1, RX2, and Rx3 are connected to the predetermined touch signal detection electrodes Rx4, Rx5, Rx6, and Rx7 with different channels. In this case, the connection with the different channels means that the channel having an electrode number, which is not coincident with electrode numbers provided to the predetermined touch signal detection electrodes Rx4, Rx5, Rx6, and Rx7, is connected.

The detection signal outputted from the predetermined touch signal detection electrodes Rx4, Rx5, Rx6, and Rx7 includes the noise information as well as the information about the amount of change in capacitance made by the touch of the object. In this case, the noise information includes the information about the amount of change in capacitance made by the LGM disturbance signal generated in the floating state. Therefore, when the detection signal outputted from the touch signal detection electrodes Rx4, Rx5, Rx6, and Rx7 is converted into the predetermined level value by the touch signal detection unit 11a of the touch input device and outputted, the outputted level value made by reflecting the information about the amount of change in mutual capacitance and the noise information.

In contrast, the detection signal outputted from the other predetermined touch signal detection electrodes RX0, RX1, RX2, and Rx3 used as the LGM disturbance signal detection electrodes includes only the noise information while including almost no information about the amount of change in capacitance made by the touch of the object.

Therefore, it is possible to obtain only the value of the amount of change in pure mutual capacitance by subtracting the signal value outputted from the other predetermined touch signal detection electrode used as the LGM disturbance signal detection electrode from the signal value outputted from the predetermined touch signal detection electrode.

In particular, in the case of FIG. 19A, a sum of areas of the other predetermined touch signal detection electrodes used as the LGM disturbance signal detection electrodes may be almost equal to a sum of areas of the predetermined touch signal detection electrodes.

Because a magnitude of the detected signal is proportional to an area of the electrode, the above-mentioned configuration is to allow a magnitude of the LGM disturbance signal detected from the other predetermined touch signal detection electrode used as the LGM disturbance signal detection electrode and a magnitude of the LGM disturbance signal detected from the predetermined touch signal detection electrode to be equal to each other maximally, thereby completely removing the LGM disturbance signal during the process of removing the LGM disturbance signal.

Meanwhile, in the case of FIG. 19A, in order to allow the other predetermined touch signal detection electrodes Rx0, Rx1, Rx2, and Rx3 used as the LGM disturbance signal detection electrodes to include almost no information about the amount of change in capacitance made by the touch of the object, any driving electrode disposed between the predetermined touch signal detection electrodes Rx4, Rx5, Rx6, and Rx7 and the other predetermined touch signal detection electrodes Rx0, Rx1, Rx2, and Rx3 used as the LGM disturbance signal detection electrodes may be set to be grounded GND. Alternatively, the predetermined touch signal detection electrodes RX4, RX5, RX6, and RX7 may be set to be grounded GND.

Figure 19B:
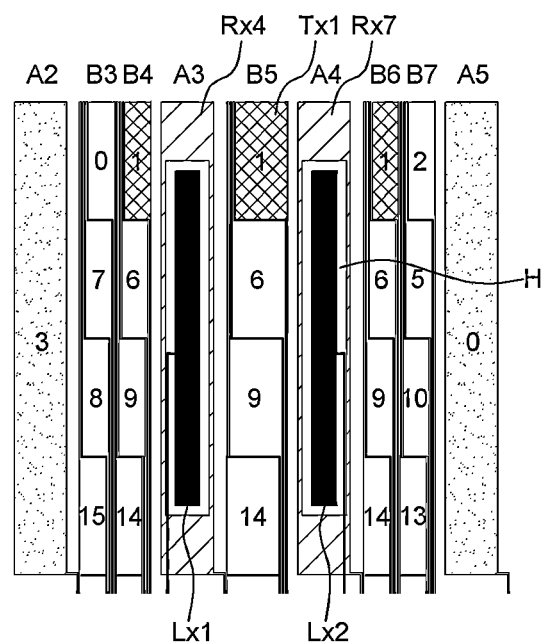
FIG. 19B is a view for explaining an example in which separate LGM disturbance signal detection electrodes are implemented in the plurality of touch signal detection electrodes of the touch sensor in comparison with FIG. 19A.

In FIG. 19B (illustrating a part of FIG. 19A), the principle described above with reference to FIG. 19A may be equally/similarly applied, but FIG. 19B illustrates that the physically separate LGM disturbance signal detection electrodes are individually disposed. In this case, the configuration in which the physically separate LGM disturbance signal detection electrode is disposed means that the LGM disturbance signal detection electrode is disposed in addition to the touch signal detection electrode illustrated in FIG. 19A. Therefore, because the separate trace corresponding to the touch signal detection electrode is added even in the case of the LGM disturbance signal detection electrode, the number of traces is increased in comparison with FIG. 19A.

In particular, referring to FIG. 19B, when the driving signal is applied to the first driving electrode Tx1, the touch signal detection electrodes Rx4 and Rx7 disposed to be adjacent to the first driving electrode Tx1 form the mutual capacitance Cm with the first driving electrode Tx1, and the LGM disturbance signal detection electrodes LX1 and LX2 disposed to be spaced apart from the first driving electrode Tx1 at a predetermined distance do not form the mutual capacitance Cm with the first driving electrode Tx1.

The detection signal outputted from the predetermined touch signal detection electrodes Rx4 and Rx7 includes the noise information as well as the information about the amount of change in capacitance made by the touch of the object. In this case, the noise information includes the information about the amount of change in capacitance made by the LGM disturbance signal generated in the floating state. Therefore, when the detection signal outputted from the touch signal detection electrodes Rx4 and Rx7 is converted into the predetermined level value by the touch signal detection unit 11a of the touch input device and outputted, the outputted level value made by reflecting the information about the amount of change in mutual capacitance and the noise information.

In contrast, the detection signal outputted from the LGM disturbance signal detection electrodes LX1 and LX2 includes only the noise information while including almost no information about the amount of change in capacitance made by the touch of the object.

Therefore, it is possible to obtain only the value of the amount of change in pure mutual capacitance by subtracting the signal value outputted from the LGM disturbance signal detection electrode from the signal value outputted from the predetermined touch signal detection electrode.

In the case of FIG. 19B, the LGM disturbance signal detection electrodes LX1 and LX2 may be disposed in the touch signal detection electrodes Rx4 and Rx7. The LGM disturbance signal detection electrodes LX1 and LX2 may serve to reduce base capacitance of the touch signal detection electrodes Rx4 and Rx7. The LGM disturbance signal detection electrodes LX1 and LX2 may be disposed such that the LGM disturbance signal detection electrodes LX1 and LX2 and the touch signal detection electrodes Rx4 and Rx7 are spaced apart from one another at a predetermined distance by holes H by forming the touch signal detection electrodes Rx4 and Rx7 as a metal mesh and then cutting or removing a part of an inner portion of each of the touch signal detection electrodes Rx4 and Rx7.

In the case of FIG. 19A, the LGM disturbance signal detection electrode and the touch signal detection electrode are disposed at different positions, that is, to configure different touch coordinates. However, in the case of FIG. 19B, a coordinate center point of the LGM disturbance signal detection electrode and a coordinate center point of the touch signal detection electrode are coincident with one another, thereby more effectively removing the LGM disturbance signal in comparison with the arrangement form illustrated in FIG. 19A.

In the case of FIG. 19B, a sum of the areas of the plurality of LGM disturbance signal detection electrodes LX1 and LX2 may be almost equal to a sum of the areas of the plurality of touch signal detection electrodes RX4 and RX7. Because a magnitude of the detected signal is proportional to an area of the electrode, the above-mentioned configuration is to allow a magnitude of the LGM disturbance signal detected from the plurality of LGM disturbance signal detection electrodes LX1 and LX2 and a magnitude of the LGM disturbance signal detected from the plurality of touch signal detection electrodes RX4 and RX7 to be equal to each other maximally, thereby completely removing the LGM disturbance signal during the process of removing the LGM disturbance signal.

Figure 20C:
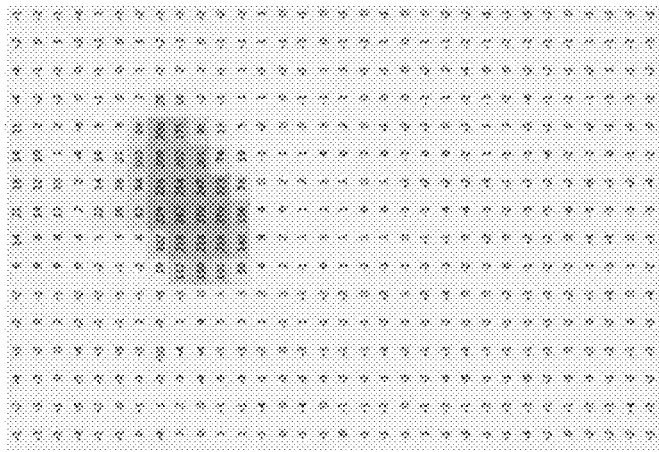
FIGS. 20A-20C are illustrative views illustrating raw data outputted from the touch input device having the touch sensor according to the exemplary embodiment of the present invention illustrated in FIG. 12.
Figure 20B:
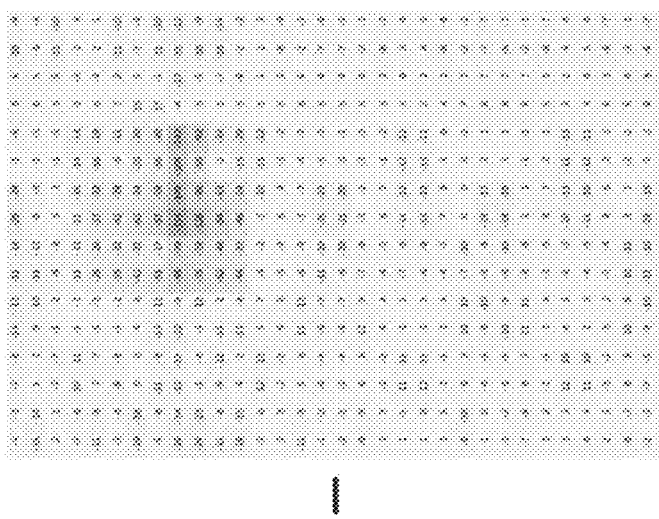
Figure 20A:

FIGS. 20A-20C are illustrative views illustrating raw data outputted from the touch input device having the touch sensor according to the exemplary embodiment of the present invention illustrated in FIG. 12. The raw data illustrated in FIG. 20A are identical to the raw data illustrated in FIG. 13. That is, the raw data illustrated in FIG. 13 are raw data made based on the detection signal outputted from the predetermined touch signal detection electrodes of the nodes that form the mutual capacitance Cm in the touch sensor illustrated in FIG. 12, and the raw data illustrated in FIG. 20B are raw data made based on the detection signal outputted from the other predetermined touch signal detection electrodes of the nodes that do not form the mutual capacitance Cm in the touch sensor illustrated in FIG. 12.

FIG. 20C illustrates raw data made by subtracting the detection signal outputted from the other predetermined touch signal detection electrodes of the nodes, which do not form the mutual capacitance Cm, from the detection signal outputted from the predetermined touch signal detection electrodes of the nodes that form the mutual capacitance Cm.

With the comparison between the raw data illustrated in FIG. 20C and the raw data illustrated in FIG. 20A, it can be ascertained that the digital values (or the level values) of the raw data illustrated in FIG. 20C in the touch region in which the touch is made by the actual object are relatively larger than the digital values (or the level values) of the corresponding part illustrated in FIG. 20A. That is, it can be ascertained that the center part of the touch region has a level value of approximately +250 or more, and the touch input device may obtain the equal or similar level values even in the floating state in comparison with the gripped state.

Although separate raw data are not illustrated, the raw data made by subtracting a value, which is made by multiplying a predetermined factor and the detection signal outputted from the other predetermined touch signal detection electrodes of the nodes which do not form the mutual capacitance Cm, from the detection signal outputted from the predetermined touch signal detection electrodes of the nodes that form the mutual capacitance Cm may be derived similar to FIG. 20C.

Figure 21:
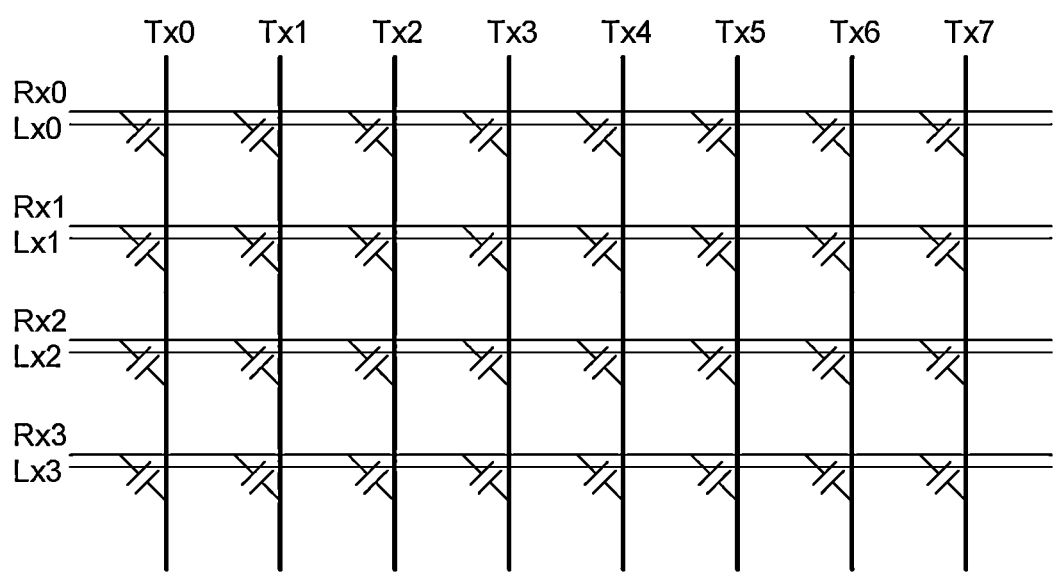
FIG. 21 is a conceptual view illustrating a conceptualized touch sensor according to the exemplary embodiment of the present invention having a bridge structure.

FIG. 21 is a conceptual view illustrating a conceptualized touch sensor according to the exemplary embodiment of the present invention having a bridge structure.

For reference, even in the case of FIG. 21, the feature described above with reference to FIG. 17 may be equally/similarly applied, but it is assumed that any receiving electrode does not function as the touch signal detection electrode or the LGM disturbance signal detection electrode, and the touch signal detection electrode and the LGM disturbance signal detection electrode are physically divided.

Referring to FIG. 21, the touch sensor according to the exemplary embodiment of the present invention includes the plurality of driving electrodes TX0 to TX7 and the plurality of touch signal detection electrodes RX0 to RX3. In addition, the touch sensor according to the exemplary embodiment of the present invention includes the plurality of LGM disturbance signal detection electrodes LX0 to LX3.

The mutual capacitance Cm is formed between the plurality of driving electrodes TX0 to TX7 and the plurality of touch signal detection electrodes RX0 to RX3, but the mutual capacitance Cm is not formed between the plurality of driving electrodes TX0 to TX7 and the plurality of LGM disturbance signal detection electrodes LX0 to LX3. In this case, actually, insignificant mutual capacitance may be formed between the plurality of driving electrodes TX0 to TX7 and the plurality of LGM disturbance signal detection electrodes LX0 to LX3, but the insignificant mutual capacitance may be ignored when whether the touch is made is detected.

The touch input device according to the exemplary embodiment of the present invention having the touch sensor may remove the information about the amount of change in capacitance made by the noise information, particularly, the LGM disturbance signal by subtracting the detection signal outputted from the LGM disturbance signal detection electrodes of the nodes, which do not form the mutual capacitance Cm, from the detection signal outputted from the touch signal detection electrodes of the nodes that form the mutual capacitance Cm. In this case, the touch input device according to the exemplary embodiment of the present invention having the touch sensor may subtract a value made by multiplying a predetermined factor and the detection signal outputted from the LGM disturbance signal detection electrodes of the nodes, which do not form the mutual capacitance Cm, from the detection signal outputted from the touch signal detection electrodes of the nodes that form the mutual capacitance Cm.

Figure 22:
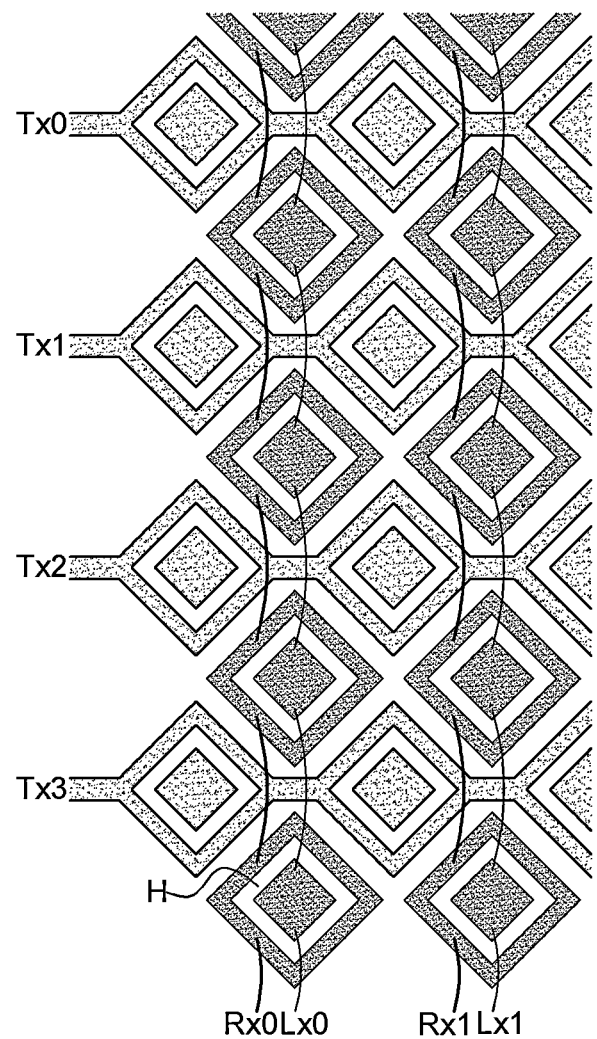
FIG. 22 is a configuration view of the touch sensor according to an example in which a conceptual view of the touch sensor illustrated in FIG. 21 may be applied.

FIG. 22 is a configuration view of the touch sensor according to an example in which a conceptual view of the touch sensor illustrated in FIG. 21 may be applied.

Referring to FIG. 22, the plurality of driving electrodes Tx0, Tx1, Tx2, and Tx3 is arranged in parallel in a horizontal direction, and the plurality of touch signal detection electrodes Rx0 and Rx1 is arranged in parallel in a vertical direction.

The plurality of driving electrodes Tx0, Tx1, Tx2, and Tx3 and the plurality of touch signal detection electrodes Rx0 and Rx1 each have a diamond shape, and the two adjacent driving electrodes and the two adjacent touch signal detection electrodes are electrically connected to one another through conductive connecting parts.

The plurality of driving electrodes Tx0, Tx1, Tx2, and Tx3 and the plurality of touch signal detection electrodes Rx0 and Rx1 may be implemented as a metal mesh. In this case, the conductive connecting part for connecting the plurality of driving electrodes Tx0, Tx1, Tx2, and Tx3 may also be implemented as a metal mesh. The conductive connecting part for connecting the plurality of driving electrodes Tx0, Tx1, Tx2, and Tx3 may be implemented as a metal mesh or a conductive trace.

The plurality of driving electrodes Tx0, Tx1, Tx2, and Tx3 and the plurality of touch signal detection electrodes Rx0 and Rx1 each have therein a predetermined electrically insulated pattern. The predetermined pattern may be formed to reduce base capacitance of each of the touch signal detection electrodes and the driving electrodes. The predetermined pattern may be formed by forming each of the driving electrodes and each of the touch signal detection electrodes as a metal mesh, and then cutting or removing a part of the metal mesh in each of the driving electrodes and each of the touch signal detection electrodes. In this case, each of the driving electrodes, each of the touch signal detection electrodes, and the predetermined pattern may be spaced apart from one another at a predetermined distance by holes H. The plurality of LGM disturbance signal detection electrodes LX0 and LX1 may be made by electrically connecting the predetermined patterns in the plurality of touch signal detection electrodes Rx0 and Rx1. The mutual capacitance Cm is formed because the plurality of touch signal detection electrodes Rx0 and Rx1 is very adjacent to the plurality of driving electrodes Tx0, Tx1, Tx2, and Tx3. However, because the plurality of LGM disturbance signal detection electrodes LX0 and LX1 is positioned to be relatively distant from the plurality of driving electrodes Tx0, Tx1, Tx2, and Tx3, the mutual capacitance Cm is formed to be negligibly small.

In particular, in the case of FIG. 22, a sum of the areas of the plurality of LGM disturbance signal detection electrodes LX0 and LX1 may be almost equal to a sum of the areas of the plurality of touch signal detection electrodes RX0 and RX1. Because a magnitude of the detected signal is proportional to an area of the electrode, the above-mentioned configuration is to allow a magnitude of the LGM disturbance signal detected from the plurality of LGM disturbance signal detection electrodes LX0 and LX1 and a magnitude of the LGM disturbance signal detected from the plurality of touch signal detection electrodes RX0 and RX1 to be equal to each other maximally, thereby completely removing the LGM disturbance signal during the process of removing the LGM disturbance signal.

In the case of FIG. 19A, the LGM disturbance signal detection electrode and the touch signal detection electrode have an equal area, but are disposed at different positions, that is, to configure different touch coordinates. However, in the case of FIG. 22, the LGM disturbance signal detection electrode and the touch signal detection electrode have the equal area, and the coordinate center points of the electrodes are coincident with one another, thereby more effectively removing the LGM disturbance signal in comparison with the arrangement form illustrated in FIG. 19.

Meanwhile, in the case of FIG. 22, any touch signal detection electrode (e.g., RX0 and RX1) disposed between any driving electrode (e.g., TX3) and any LGM disturbance signal detection electrode (e.g., LX0 and LX1) may be set to be grounded (GND) so that any LGM disturbance signal detection electrode (e.g., LX0 and LX1) has almost no information about the amount of change in capacitance made by the touch of the object.

Figure 23:
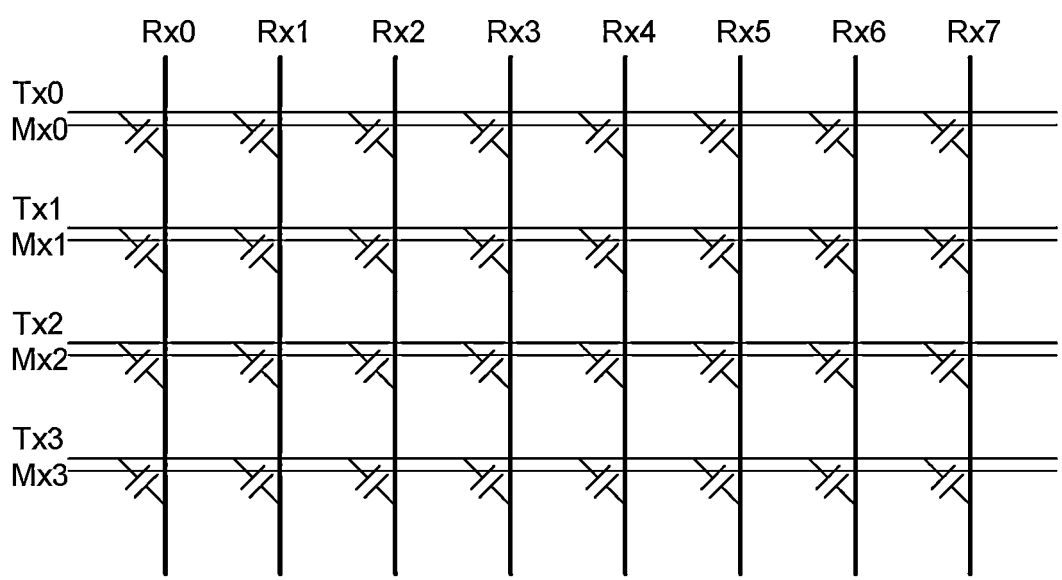
FIG. 23 is another conceptual view illustrating a conceptualized touch sensor according to the exemplary embodiment of the present invention having a bridge structure.

FIG. 23 is another conceptual view illustrating a conceptualized touch sensor according to the exemplary embodiment of the present invention having a bridge structure. Referring to FIG. 23, the touch sensor according to the exemplary embodiment of the present invention includes the plurality of first driving electrodes TX0 to TX3 and the plurality of touch signal detection electrodes RX0 to RX7. In addition, the touch sensor according to the exemplary embodiment of the present invention includes a plurality of second driving electrodes Mx0 to Mx3.

The mutual capacitance Cm is formed between the plurality of first driving electrodes TX0 to TX3 and the plurality of touch signal detection electrodes RX0 to RX7, and the mutual capacitance Cm is not formed between the plurality of second driving electrodes Mx0 to Mx3 and the plurality of touch signal detection electrodes Rx0 to Rx7. In this case, actually, insignificant mutual capacitance may be formed between the plurality of second driving electrodes Mx0 to Mx3 and the plurality of touch signal detection electrodes Rx0 to Rx7, but the insignificant mutual capacitance may be ignored when whether the touch is made is detected.

The touch input device according to the exemplary embodiment of the present invention having the touch sensor may remove the information about the amount of change in capacitance made by the noise information, particularly, the LGM disturbance signal by subtracting the detection signal outputted from the touch signal detection electrodes Rx of the nodes, which do not form the mutual capacitance Cm, from the detection signal outputted from the touch signal detection electrodes Rx of the nodes that form the mutual capacitance Cm. In this case, it is possible to subtract a value made by multiplying a predetermined factor and the detection signal outputted from the touch signal detection electrodes Rx of the nodes, which do not form the mutual capacitance Cm, from the detection signal outputted from the touch signal detection electrodes Rx of the nodes that form the mutual capacitance Cm.

Figure 24:
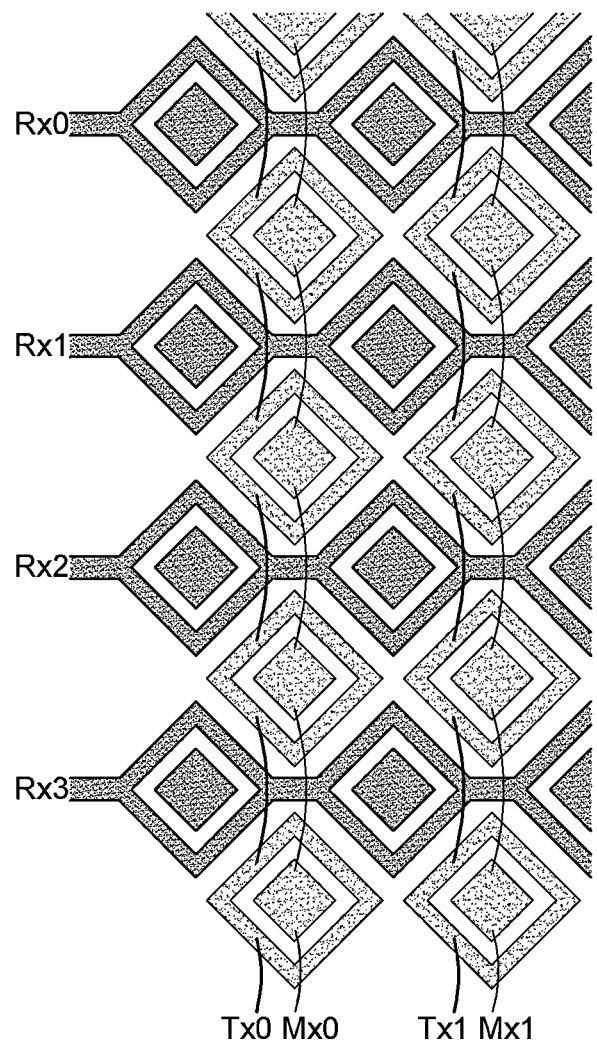
FIG. 24 is a configuration view of the touch sensor according to an example in which a conceptual view of the touch sensor illustrated in FIG. 23 may be applied.

FIG. 24 is a configuration view of the touch sensor according to an example in which a conceptual view of the touch sensor illustrated in FIG. 23 may be applied.

Referring to FIG. 24, the plurality of touch signal detection electrodes Rx0 and Rx1, Rx2, and Rx3 is arranged in parallel in the horizontal direction, and the plurality of driving electrodes Tx0 and Tx1 is arranged in parallel in the vertical direction.

Each of the plurality of touch signal detection electrodes Rx0 and Rx1, Rx2, and Rx3 and the plurality of first driving electrodes Tx0 and Tx1 has a diamond shape, and the two adjacent first driving electrodes and the two adjacent touch signal detection electrodes are electrically connected to one another through the conductive connecting parts.

The plurality of touch signal detection electrodes Rx0, Rx1, Rx2, and Rx3 and the plurality of first driving electrodes Tx0 and Tx1 may be implemented as a metal mesh. In this case, the conductive connecting part for connecting the plurality of touch signal detection electrodes Rx0, Rx1, Rx2, and Rx3 may also be implemented as a metal mesh. The conductive connecting part for connecting the plurality of touch signal detection electrodes Rx0, Rx1, Rx2, and Rx3 may also be implemented as a metal mesh or a conductive trace.

Each of the plurality of touch signal detection electrodes Rx0, Rx1, Rx2, and Rx3 and the plurality of first driving electrodes Tx0 and Tx1 has therein a predetermined electrically insulated pattern. The predetermined pattern may be formed to reduce base capacitance of each of the touch signal detection electrodes and the first driving electrodes. The predetermined pattern may be formed by forming each of the first driving electrodes and each of the touch signal detection electrodes as a metal mesh, and then cutting or removing a part of the metal mesh in each of the first driving electrodes Tx0 and Tx1 and each of the touch signal detection electrodes Rx0, Rx1, Rx2, and Rx3. In this case, each of the first driving electrodes Tx0 and Tx1, each of the touch signal detection electrodes Rx0, Rx1, Rx2, and Rx3, and the predetermined pattern may be spaced apart from one another at a predetermined distance by the holes H.

The plurality of second driving electrodes Mx0 and Mx1 may be made by electrically connecting the predetermined patterns in the plurality of first driving electrodes Tx0 and Tx1. The mutual capacitance Cm is formed because the plurality of first driving electrodes Tx0 and Tx1 is very adjacent to the plurality of touch signal detection electrodes Rx0, Rx1, Rx2, and Rx3. However, because the plurality of second driving electrodes Mx0 and Mx1 is positioned to be relatively distant from the plurality of touch signal detection electrodes Rx0, Rx1, Rx2, and Rx3, the mutual capacitance Cm is formed to be negligibly small.

In particular, in the case of FIG. 24, a sum of areas of the plurality of second driving electrodes Mx0 and Mx1 may be almost equal to a sum of areas of the plurality of first driving electrodes Tx0 and Tx1. Because a magnitude of the detected signal is proportional to an area of the electrode, the above-mentioned configuration is to allow a magnitude of the LGM disturbance signal detected from the plurality of second driving electrodes Mx0 and Mx1 and a magnitude of the LGM disturbance signal detected from the plurality of first driving electrodes Tx0 and Tx1 to be equal to each other maximally, thereby completely removing the LGM disturbance signal during the process of removing the LGM disturbance signal.

In the case of FIG. 24, the plurality of second driving electrodes and the plurality of first driving electrodes have an equal area, and the coordinate center points of the electrodes are coincident with one another, thereby more effectively removing the LGM disturbance signal in comparison with the arrangement form illustrated in FIG. 19.

Meanwhile, in the case of FIG. 24, any first driving electrode (e.g., Tx0 and Tx1) disposed between any touch signal detection electrode (e.g., RX3) and any second driving electrode (e.g., MX0 and MX1) may be set to be grounded (GND) so that any second driving electrode (e.g., MX0 and MX1) has almost no information about the amount of change in capacitance made by the touch of the object.

Figure 25A:
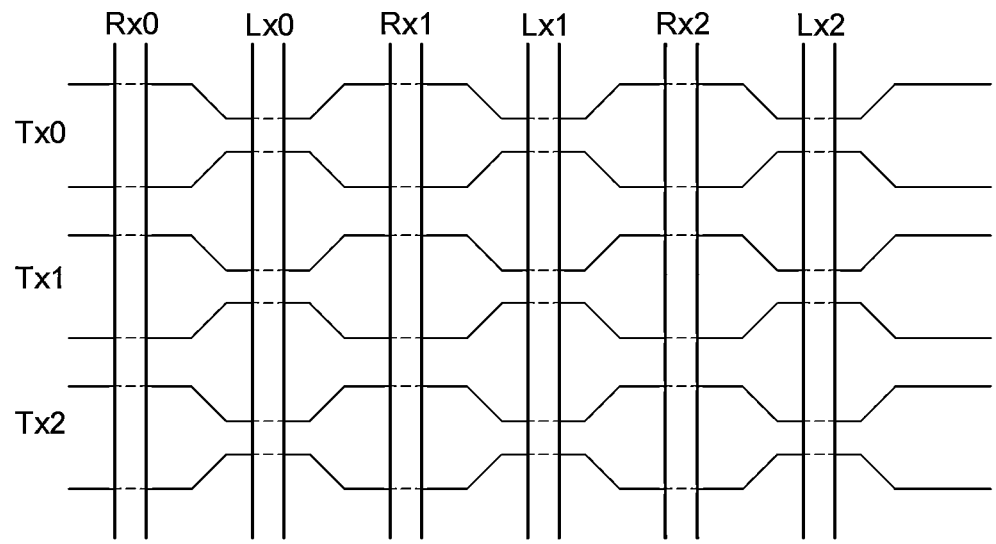
FIG. 25A is a configuration view of the touch sensor according to another example in which a conceptual view of the touch sensor illustrated in FIG. 21 may be applied.

FIG. 25A is a configuration view of the touch sensor according to another example in which a conceptual view of the touch sensor illustrated in FIG. 21 may be applied.

Referring to FIG. 25A, the plurality of touch signal detection electrodes Rx0, Rx1, and Rx2 is arranged in parallel in the horizontal direction, and the plurality of driving electrodes Tx0, Tx1, and TX2 is arranged in parallel in the vertical direction. In this case, the vertical direction and the horizontal direction may be changed.

The plurality of touch signal detection electrodes Rx0, Rx1, and Rx2 and the plurality of driving electrodes Tx0, Tx1, and TX2 each have a bar shape.

The plurality of touch signal detection electrodes Rx0, Rx1, and Rx2 is formed on the first layer, and the plurality of driving electrodes Tx0, Tx1, and TX2 is formed on the second layer. The first layer and the second layer are not disposed on the same plane. For example, the first layer may be disposed above the second layer. An insulating layer may be disposed between the first layer and the second layer.

The plurality of touch signal detection electrodes Rx0, Rx1, and Rx2 and the plurality of driving electrodes Tx0, Tx1, and TX2 may be implemented as a metal mesh or conductive metal.

The touch sensor illustrated in FIG. 25A includes the plurality of LGM disturbance signal detection electrodes LX0, LX1, and LX2. The plurality of LGM disturbance signal detection electrodes LX0, LX1, and LX2 is formed together on the layer on which the plurality of touch signal detection electrodes Rx0, Rx1, and Rx2 is formed, and the LGM disturbance signal detection electrodes LX0, LX1, and LX2 may be disposed between the plurality of touch signal detection electrodes Rx0, Rx1, and Rx2.

The respective driving electrodes Tx0 and Tx1, and Tx2 include a first region in which each of the driving electrodes Tx0 and Tx1, and Tx2 overlaps each of the touch signal detection electrodes Rx0, Rx1, and Rx2, and a second region in which each of the driving electrodes Tx0 and Tx1, and Tx2 overlaps each of the LGM disturbance signal detection electrodes LX0, LX1, and LX2. In this case, a size of the first region is larger than a size of the second region. In particular, the size of the second region may be as small as possible. This is for maximally reducing the mutual capacitance between the LGM disturbance signal detection electrode and the driving electrode. Alternatively, under a condition in which the touch signal detection electrode and the LGM disturbance signal detection electrode have the same shape, a width of the first region in which the driving electrode overlaps the touch signal detection electrode may be designed to be larger than a width of the second region in which the driving electrode overlaps the LGM disturbance signal detection electrode.

Since the region in which the plurality of driving electrodes Tx0, Tx1, and TX2 overlaps the plurality of touch signal detection electrodes Rx0, Rx1, and Rx2 is relatively large, relatively large mutual capacitance Cm is formed. However, since the plurality of driving electrodes Tx0, Tx1, and TX2 overlaps the plurality of LGM disturbance signal detection electrodes LX0, LX1, and LX2 to the relatively small extent, the mutual capacitance Cm is formed to be negligibly small between the plurality of driving electrodes Tx0, Tx1, and TX2 and the plurality of LGM disturbance signal detection electrodes LX0, LX1, and LX2.

In particular, in the case of FIG. 25A, a sum of the areas of the plurality of LGM disturbance signal detection electrodes LX0, LX1, and LX2 may be almost equal to a sum of the areas of the plurality of touch signal detection electrodes RX0, RX1, and RX2. Because a magnitude of the detected signal is proportional to an area of the electrode, the above-mentioned configuration is to allow a magnitude of the LGM disturbance signal detected from the plurality of LGM disturbance signal detection electrodes LX0, LX1, and LX2 and a magnitude of the LGM disturbance signal detected from the plurality of touch signal detection electrodes RX0, RX1, and RX2 to be equal to each other maximally, thereby completely removing the LGM disturbance signal during the process of removing the LGM disturbance signal.

Meanwhile, in the case of FIG. 25A, any touch signal detection electrode (e.g., RX0, RX1, and RX2) disposed between any driving electrode (e.g., TX0) and any LGM disturbance signal detection electrode (e.g., LX0, LX1, and LX2) may be set to be grounded (GND) so that any LGM disturbance signal detection electrode (e.g., LX0, LX1, and LX2) has almost no information about the amount of change in capacitance made by the touch of the object.

Figure 25B:
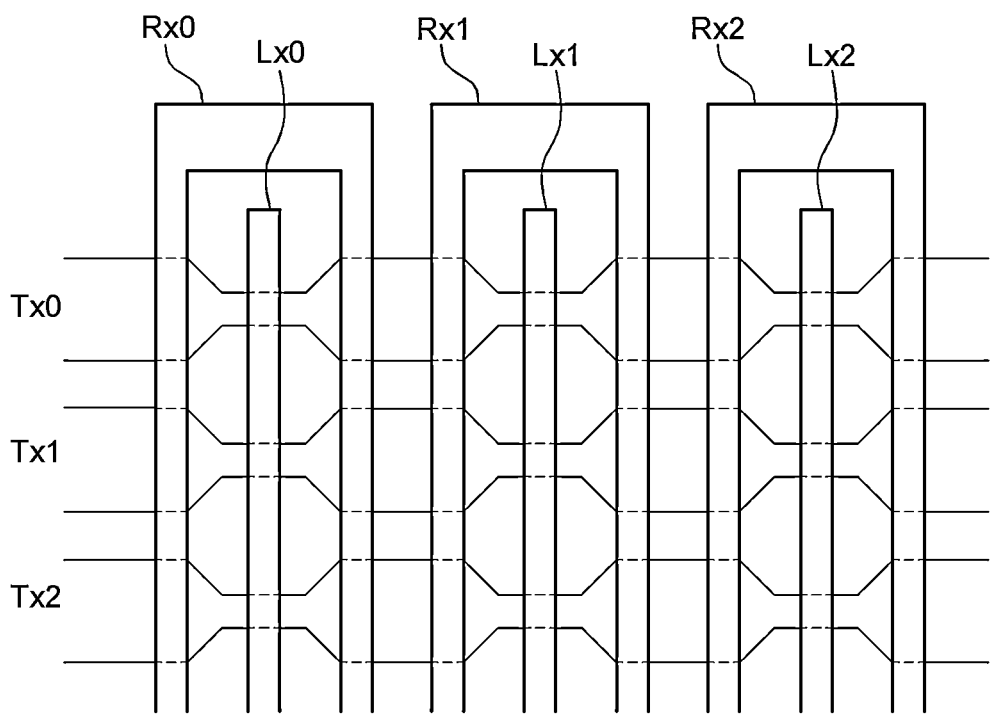
FIG. 25B is a view illustrating for explaining an example in which separate LGM disturbance signal detection electrodes are implemented in the plurality of touch signal detection electrodes in comparison with FIG. 25A.

The principle described above with reference to FIG. 25A may be equally/similarly applied to FIG. 25B, but FIG. 25B illustrates an exemplary embodiment implemented such that the LGM disturbance signal detection electrode is disposed in the touch signal detection electrode.

In the case of FIG. 25B, the LGM disturbance signal detection electrodes LX0, LX1, and LX2 may be disposed in the touch signal detection electrodes RX0, RX1, and RX2. The LGM disturbance signal detection electrodes LX0, LX1, and LX2 may serve to reduce base capacitance of the touch signal detection electrodes RX0, RX1, and RX2. The LGM disturbance signal detection electrodes LX0, LX1, and LX2 may be disposed such that the LGM disturbance signal detection electrodes LX0, LX1, and LX2 and the touch signal detection electrodes RX0, RX1, and RX2 are spaced apart from one another at a predetermined distance by forming the touch signal detection electrodes RX0, RX1, and RX2 as a metal mesh and then cutting or removing a part of an inner portion of each of the touch signal detection electrodes RX0, RX1, and RX2.

In the case of FIG. 25B, the respective driving electrodes Tx0, Tx1, and Tx2 include the first region in which each of the driving electrodes Tx0, Tx1, and Tx2 overlaps each of the touch signal detection electrodes Rx0, Rx1, and Rx2, and the second region in which each of the driving electrodes Tx0, Tx1, and Tx2 overlaps each of the LGM disturbance signal detection electrodes LX0, LX1, and LX2. In this case, a size of the first region is larger than a size of the second region. In particular, the size of the second region may be as small as possible. This is for maximally reducing the mutual capacitance between the LGM disturbance signal detection electrode and the driving electrode. Alternatively, under a condition in which the touch signal detection electrode and the LGM disturbance signal detection electrode have the same shape, a width of the first region in which the driving electrode overlaps the touch signal detection electrode may be designed to be larger than a width of the second region in which the driving electrode overlaps the LGM disturbance signal detection electrode.

Since the region in which the plurality of driving electrodes Tx0, Tx1, and TX2 overlaps the plurality of touch signal detection electrodes Rx0, Rx1, and Rx2 is relatively large, relatively large mutual capacitance Cm is formed. However, since the plurality of driving electrodes Tx0, Tx1, and TX2 overlaps the plurality of LGM disturbance signal detection electrodes LX0, LX1, and LX2 to the relatively small extent, the mutual capacitance Cm is formed to be negligibly small between the plurality of driving electrodes Tx0, Tx1, and TX2 and the plurality of LGM disturbance signal detection electrodes LX0, LX1, and LX2.

Figure 26:
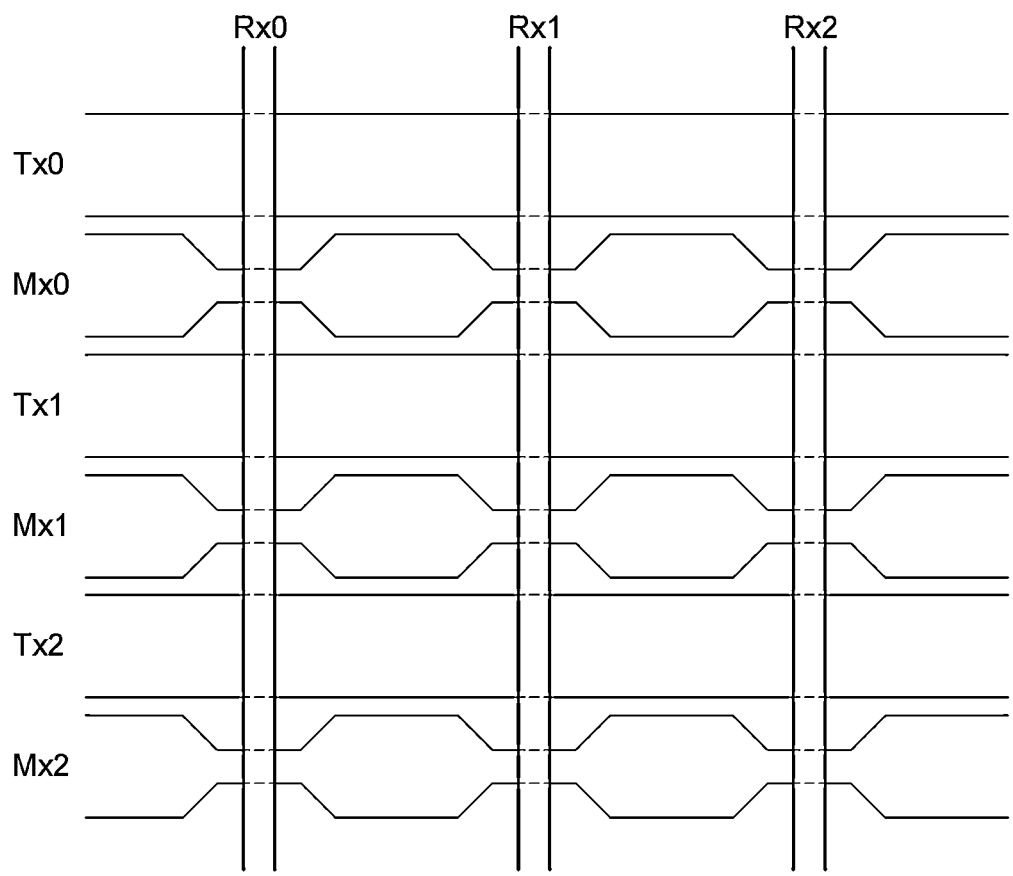
FIG. 26 is a configuration view of the touch sensor according to another example in which a conceptual view of the touch sensor illustrated in FIG. 23 may be applied.

FIG. 26 is a configuration view of the touch sensor according to another example in which a conceptual view of the touch sensor illustrated in FIG. 23 may be applied.

Referring to FIG. 26, the plurality of touch signal detection electrodes Rx0, Rx1, and Rx2 is arranged in parallel in the vertical direction, and the plurality of first driving electrodes Tx0, Tx1, and Tx2 is arranged in parallel in the horizontal direction. In this case, the vertical direction and the horizontal direction may be changed.

The plurality of touch signal detection electrodes Rx0, Rx1, and Rx2 and the plurality of first driving electrodes Tx0, Tx1, and Tx2 each have a bar shape.

The plurality of touch signal detection electrodes Rx0, Rx1, and Rx2 is formed on the first layer, and the plurality of first driving electrodes Tx0, Tx1, and Tx2 is formed on the second layer. The first layer and the second layer are not disposed on the same plane. For example, the first layer may be disposed above the second layer. An insulating layer may be disposed between the first layer and the second layer.

The plurality of touch signal detection electrodes Rx0, Rx1, and Rx2 and the plurality of first driving electrodes Tx0, Tx1, and Tx2 may be implemented as a metal mesh or conductive metal.

The touch sensor illustrated in FIG. 26 includes the plurality of second driving electrodes Mx0, Mx1, and MX2. The plurality of second driving electrodes Mx0, Mx1, and MX2 is formed together on the layer on which the plurality of first driving electrodes Tx0, Tx1, and Tx2 is formed, and the second driving electrodes MX0, MX1, and MX2 may be disposed between the plurality of first driving electrodes Tx0, Tx1, and Tx2.

The respective touch signal detection electrodes Rx0, Rx1, and Rx2 includes the first region in which each of the touch signal detection electrodes Rx0, Rx1, and Rx2 overlaps each of the first driving electrodes Tx0, Tx1, and Tx2, and the second region in which each of the touch signal detection electrodes Rx0, Rx1, and Rx2 overlaps each of the second driving electrodes MX0, MX1, and MX2. In this case, an area of the first region is larger than an area of the second region. In particular, the area of the second region may be as small as possible. This is for maximally reducing the mutual capacitance between the second driving electrode and the touch signal detection electrode. Alternatively, under a condition in which the touch signal detection electrodes have the same shape, a width of the first region in which the first driving electrode overlaps the touch signal detection electrode may be designed to be larger than a width of the second region in which the second driving electrode overlaps the touch signal detection electrode.

Since the region in which each of the first driving electrodes Tx0, Tx1, and Tx2 overlaps each of the touch signal detection electrodes Rx0, Rx1, and Rx2 is relatively large, relatively large mutual capacitance Cm is formed. However, since each of the second driving electrodes MX0, MX1, and MX2 overlaps each of the touch signal detection electrodes Rx0, Rx1, and Rx2 to the relatively small extent, the mutual capacitance Cm is formed to be negligibly small between the second driving electrodes MX0, MX1, and MX2 and the touch signal detection electrodes Rx0, Rx1, and Rx2.

Figure 27:
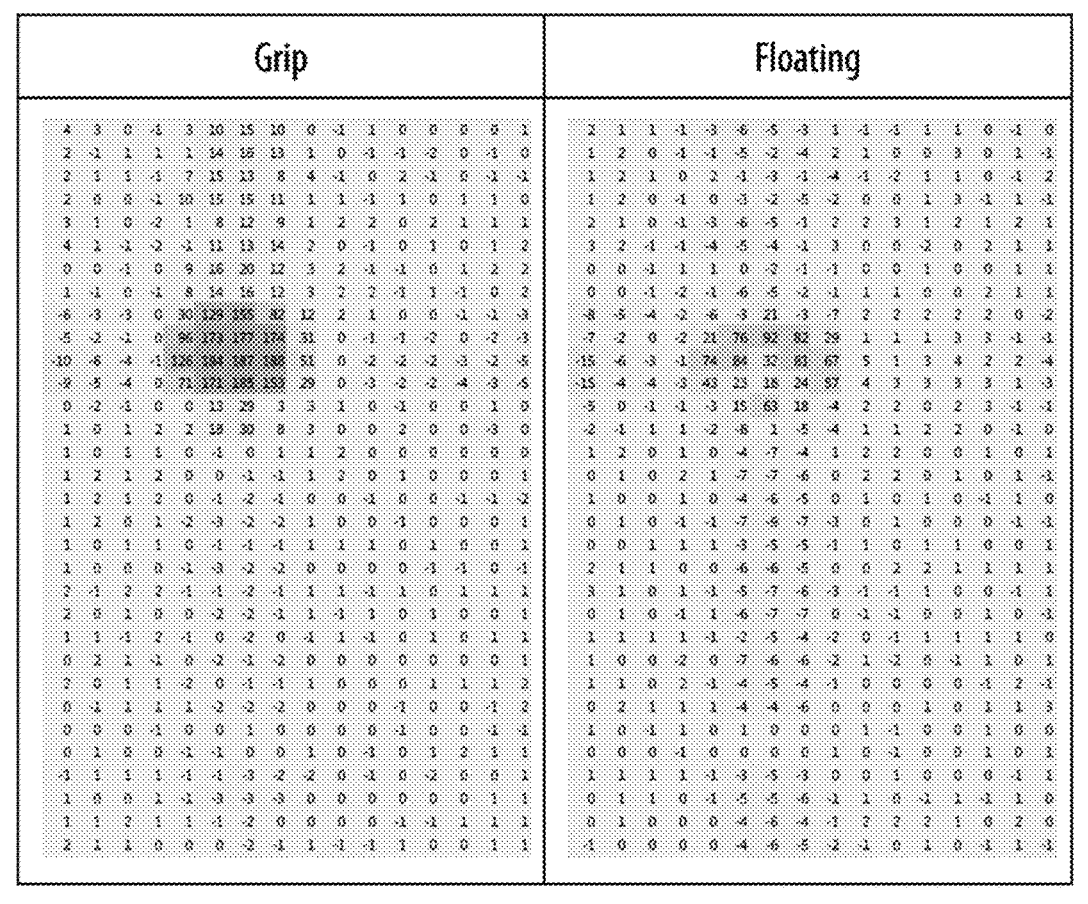

The present applicant could obtain raw data for each state by performing tests on the touch input device having the touch sensor illustrated in FIG. 10 in the gripped state and the floating state by using a conductive rod having a diameter of 15 φ. FIG. 27 illustrates the obtained raw data, the raw data at the left of FIG. 27 are raw data obtained in the gripped state, and the raw data at the right of FIG. 27 are raw data obtained in the floating state. With the comparison between the raw data at the left and right of FIG. 27, it can be ascertained that the level values in the touch region are significantly decreased by the LGM disturbance signal generated in the floating state.

Figure 28:
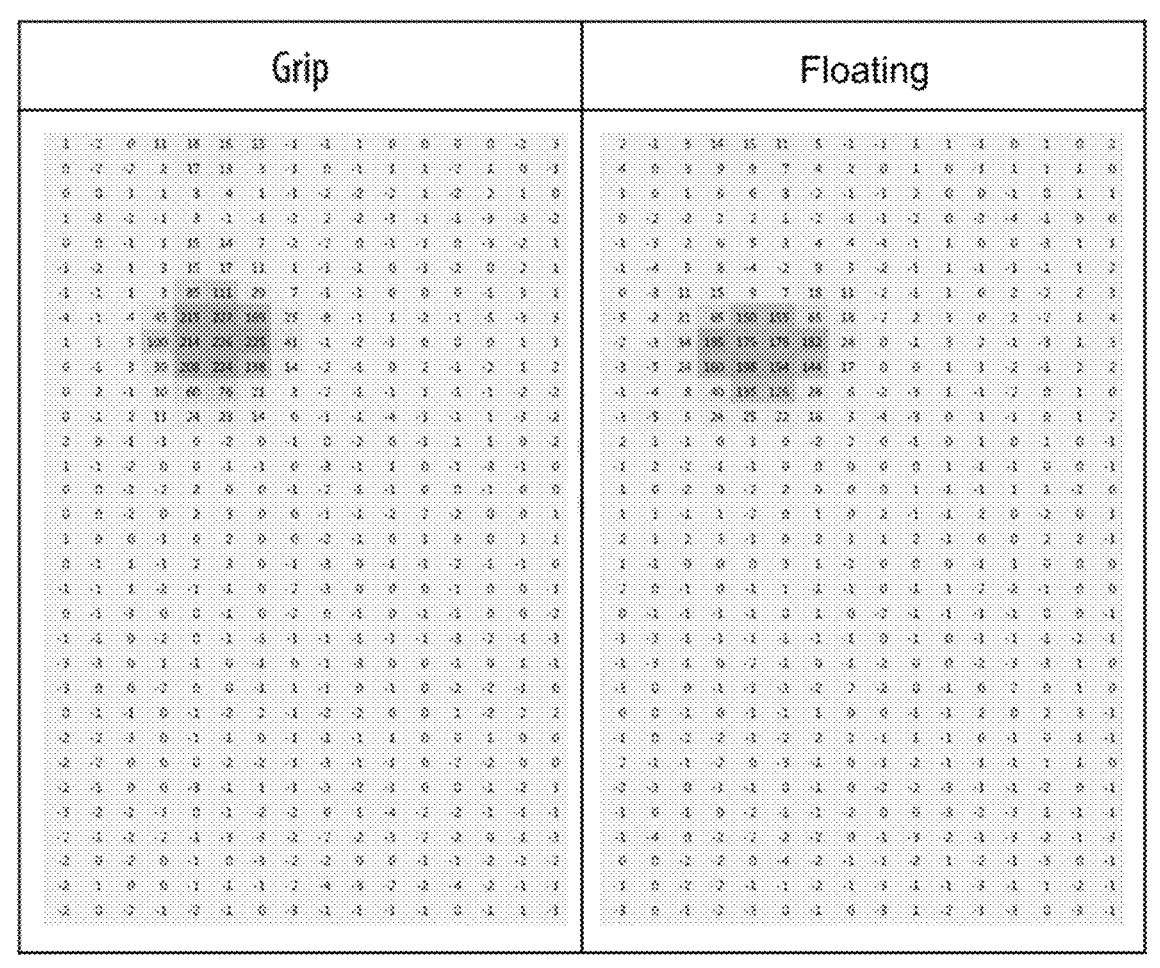

The present applicant performed tests on the touch input device having the touch sensor illustrated in FIG. 12 in the gripped state and the floating state by using a conductive rod having a diameter of 15 φ. As described with reference to FIGS. 20A to 20C, the mutual capacitance was not formed by the driving electrode from the detection signal outputted from the predetermined touch signal detection electrode that forms the mutual capacitance with the driving electrode. As a result, the present applicant could obtain raw data for each state by subtracting the detection signal outputted from another predetermined touch signal detection electrode used as the LGM disturbance signal detection electrode. FIG. 28 illustrates the obtained raw data, the raw data at the left of FIG. 28 are raw data obtained in the gripped state, and the raw data at the right of FIG. 28 are raw data obtained in the floating state. With the comparison between the raw data at the left and right of FIG. 28, it can be ascertained that a deviation of the level values in the touch region in the gripped state and floating state is significantly low in comparison with FIG. 27.

Figure 29:
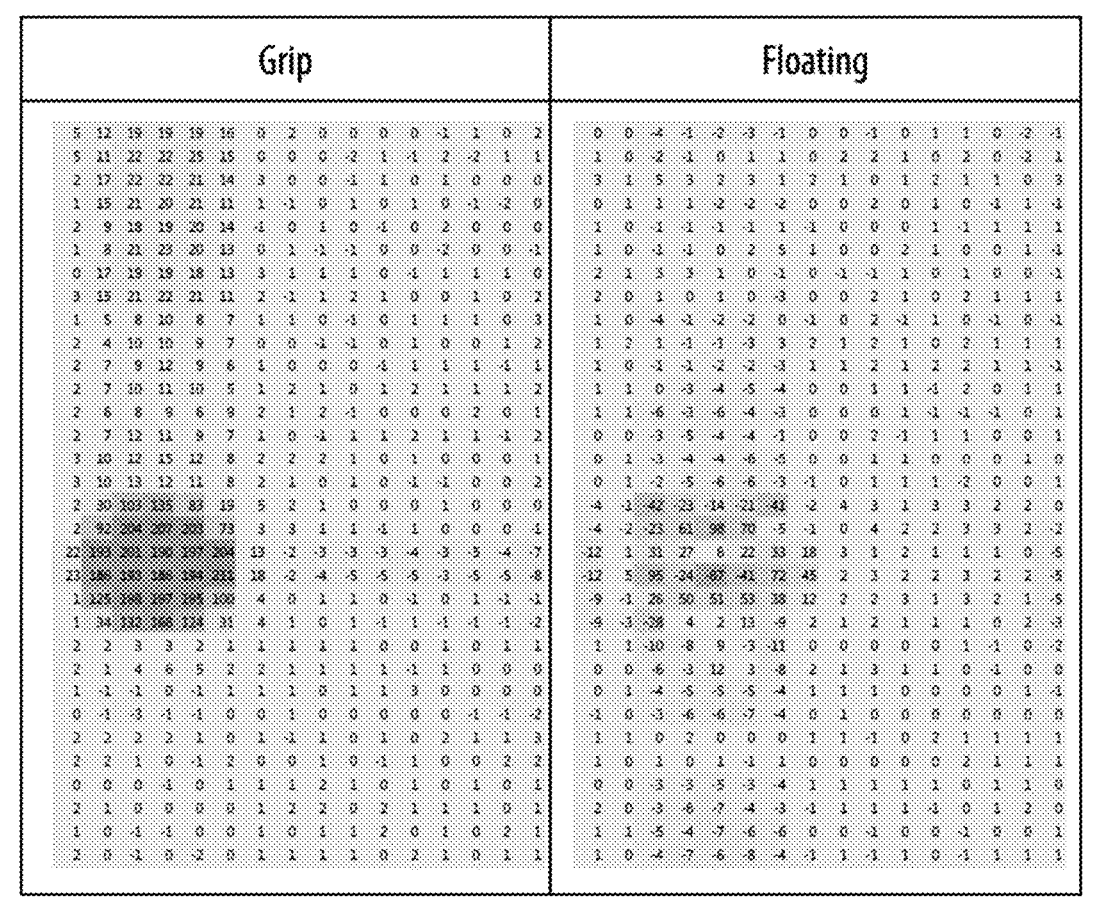

The present applicant could obtain raw data for each state by performing tests on the touch input device having the touch sensor illustrated in FIG. 10 in the gripped state and the floating state by using a conductive rod having a diameter of 20 φ. FIG. 29 illustrates the obtained raw data, the raw data at the left of FIG. 29 are raw data obtained in the gripped state, and the raw data at the right of FIG. 29 are raw data obtained in the floating state. With the comparison between the raw data at the left and right of FIG. 29, it can be ascertained that the level values in the touch region are significantly decreased by the LGM disturbance signal generated in the floating state.

Figure 30:
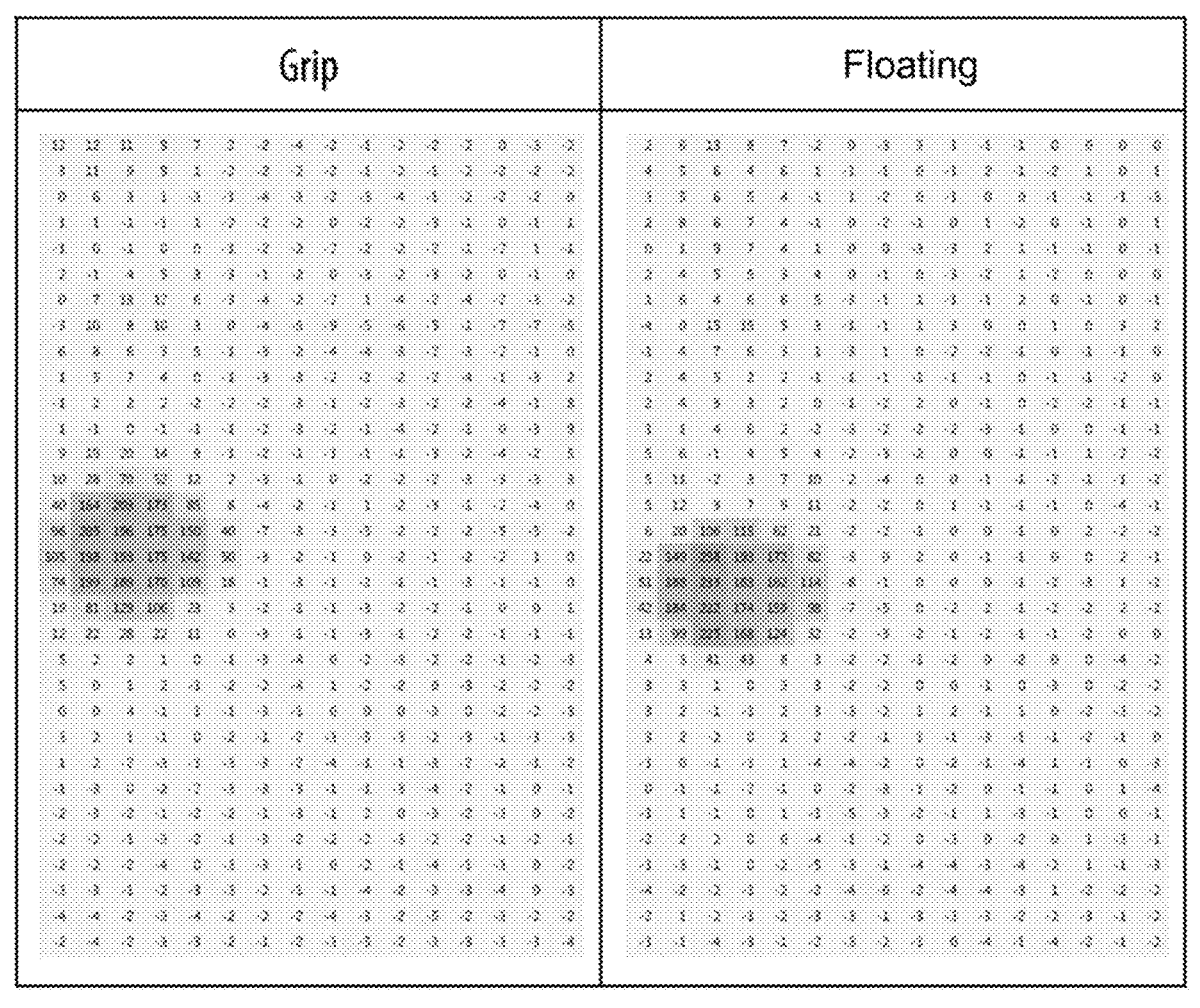

The present applicant performed tests on the touch input device having the touch sensor illustrated in FIG. 12 in the gripped state and the floating state by using a conductive rod having a diameter of 15 φ. As described with reference to FIGS. 20A to 20C, the mutual capacitance was not formed by the driving electrode from the detection signal outputted from the touch signal detection electrode that forms the mutual capacitance with the driving electrode. As a result, the present applicant could obtain raw data for each state by subtracting the detection signal outputted from another predetermined touch signal detection electrode used as the LGM disturbance signal detection electrode. FIG. 30 illustrates the obtained raw data, the raw data at the left of FIG. 30 are raw data obtained in the gripped state, and the raw data at the right of FIG. 30 are raw data obtained in the floating state. With the comparison between the raw data at the left and right of FIG. 30, it can be ascertained that a deviation of the level values in the touch region in the gripped state and the floating state is low, and there is a part where the level value is great even in the floating state.

Figure 31:
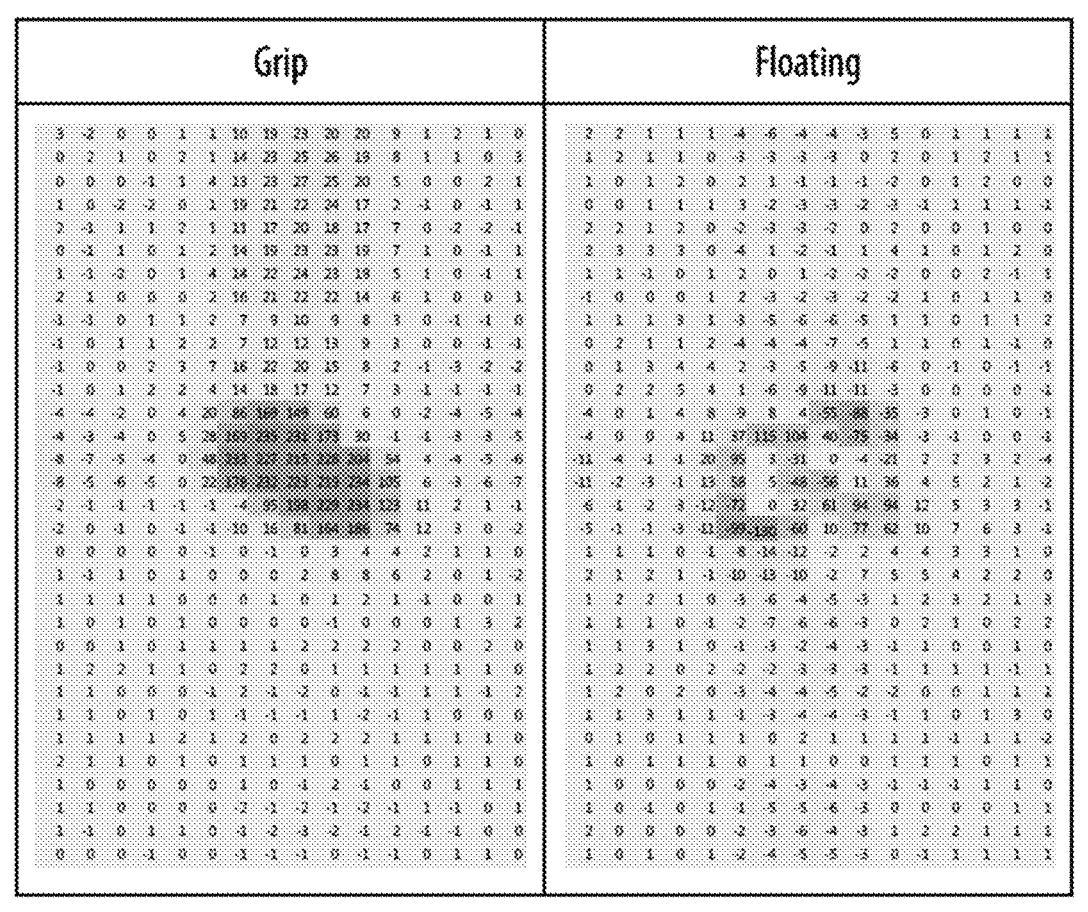

The present applicant could obtain raw data for each state by performing tests on the touch input device having the touch sensor illustrated in FIG. 10 in the gripped state and the floating state by using an actual person's thumb. FIG. 31 illustrates the obtained raw data, the raw data at the left of FIG. 31 are raw data obtained in the gripped state, and the raw data at the right of FIG. 31 are raw data obtained in the floating state. With the comparison between the raw data at the left and right of FIG. 31, it can be ascertained that the level values in the touch region are significantly decreased by the LGM disturbance signal generated in the floating state.

Figure 32:
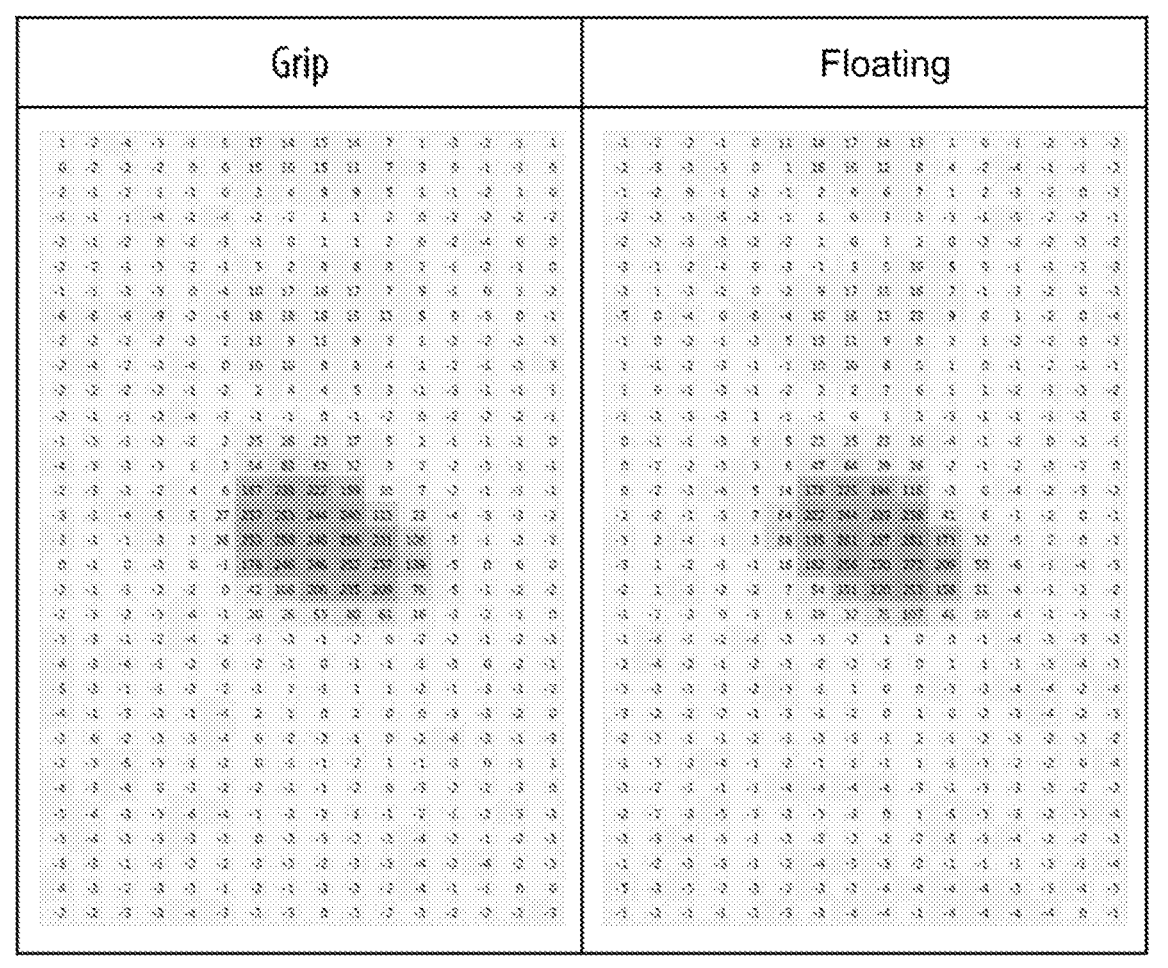

The present applicant performed tests on the touch input device having the touch sensor illustrated in FIG. 12 in the gripped state and the floating state by using a conductive rod having a diameter of 15 φ. As described with reference to FIGS. 20A to 20C, the mutual capacitance was not formed by the driving electrode from the detection signal outputted from the touch signal detection electrode that forms the mutual capacitance with the driving electrode. As a result, the present applicant could obtain raw data for each state by subtracting the detection signal outputted from another predetermined touch signal detection electrode used as the LGM disturbance signal detection electrode. FIG. 32 illustrates the obtained raw data, the raw data at the left of FIG. 32 are raw data obtained in the gripped state, and the raw data at the right of FIG. 32 are raw data obtained in the floating state. With the comparison between the raw data at the left and right of FIG. 32, it can be ascertained that there is almost no deviation of the level values in the touch region in the gripped state and the floating state.

The touch input device having the touch sensor according to the exemplary embodiment of the present invention described above has a unique advantage capable of identifying two or more multiple touches even in the floating state.

Figure 33:
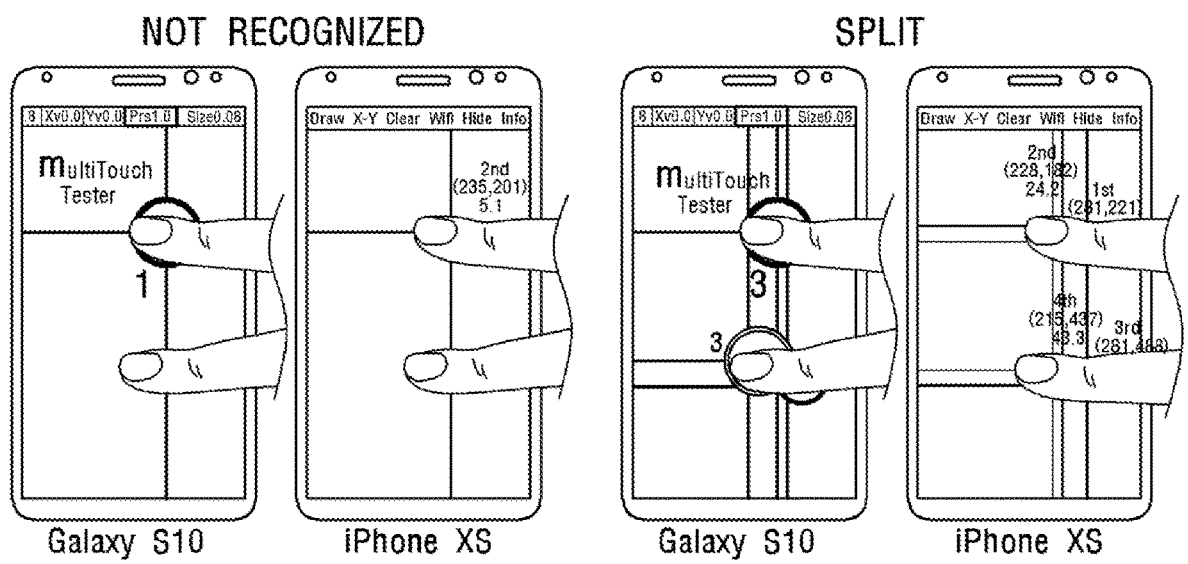
FIG. 33 is a view illustrating a state in which multiple touches made by multiple objects cannot be recognized when touch input devices in the related art are in the floating state.

FIG. 33 is a view illustrating a state in which multiple touches made by multiple objects cannot be recognized when touch input devices in the related art are in the floating state.

The situation illustrated in FIG. 33 may be exemplarily considered as a case in which a user touches the touch surface of the touch input device with two fingers in a state in which the touch input device in the related art is mounted on a mount in a vehicle.

As illustrated in the left view in FIG. 33, the touch input devices in the related art cannot recognize one of two (multiple) touches, or as illustrated in in the right view in FIG. 33, the user made two touches, but the touch input device recognizes three or four (multiple) touches.

Figure 34:
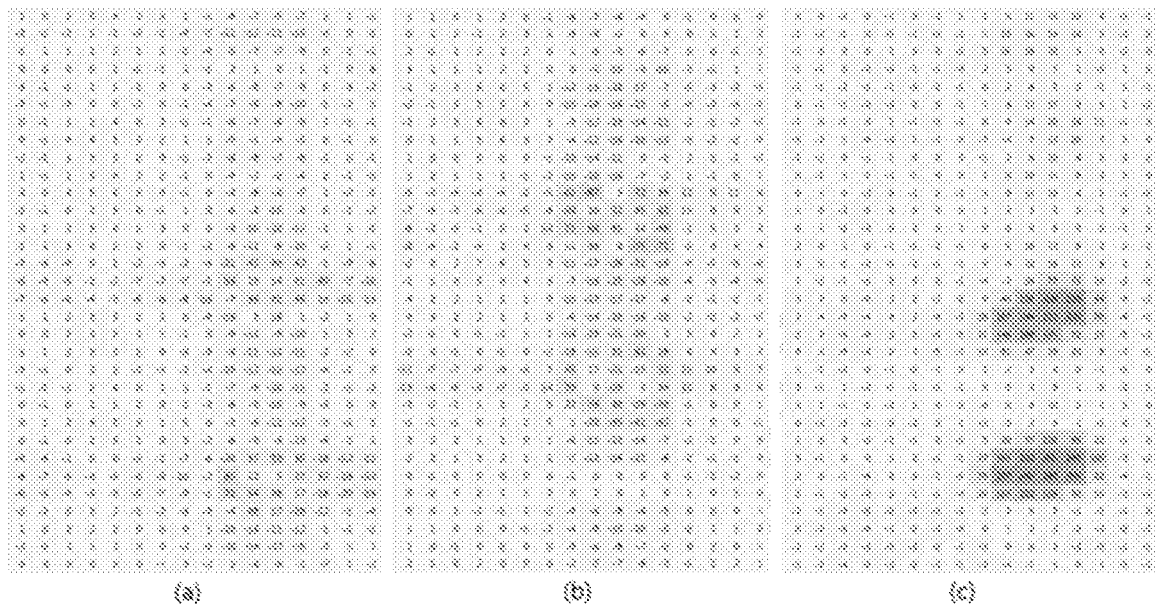
FIGS. 34A to 34C are views illustrating raw data for explaining a state in which the touch input device according to the exemplary embodiment of the present invention recognizes multiple touches.

FIG. 34A illustrates raw data obtained when the multiple touches are made after the touch input device having the touch sensor having the double layer illustrated in FIG. 3 is placed in the floating state. Referring to FIG. 34A, the level values in the regions in which the multiple touches are made are relatively low because of the LGM disturbance signal generated in the floating state. If a reference level value for identifying whether the touch is made is set to 65, the touch, which is made relatively high, cannot be recognized as a touch, but only the touch, which is made relatively low, is recognized as a touch, and as a result, one of the two touches cannot be recognized.

FIG. 34B illustrates raw data obtained when the multiple touches are made after the touch input device having the touch sensor illustrated in FIG. 10 is placed in the floating state. Referring to FIG. 34B, there is a portion where the level values in the regions in which the multiple touches are made are relatively low because of the LGM disturbance signal generated in the floating state. If the reference level value for identifying whether the touch is made is set to 65, it is recognized that there are three or more touches.

FIG. 34C illustrates raw data obtained when multiple touches are made after the touch input device is placed in the floating state when the method of subtracting the detection signal outputted from another predetermined touch signal detection electrode used as the LGM disturbance signal detection electrode is applied to the touch input device having the touch sensor illustrated in FIG. 12 because the mutual capacitance is not formed by the driving electrode from the detection signal outputted from the touch signal detection electrode that forms the mutual capacitance with the driving electrode, as described with reference to FIGS. 20A to 20C. Referring to FIG. 34C, because relatively large positive (+) level values are outputted from two portions where the multiple touches is made, the touch input device may accurately recognize the user's multiple touches as the multiple touches.

The touch input device having the touch sensor according to the exemplary embodiment of the present invention described above has a unique advantage capable of identifying a third touch ($3^{rd}$ Touch) which is made together with cross touches.

Figure 35:
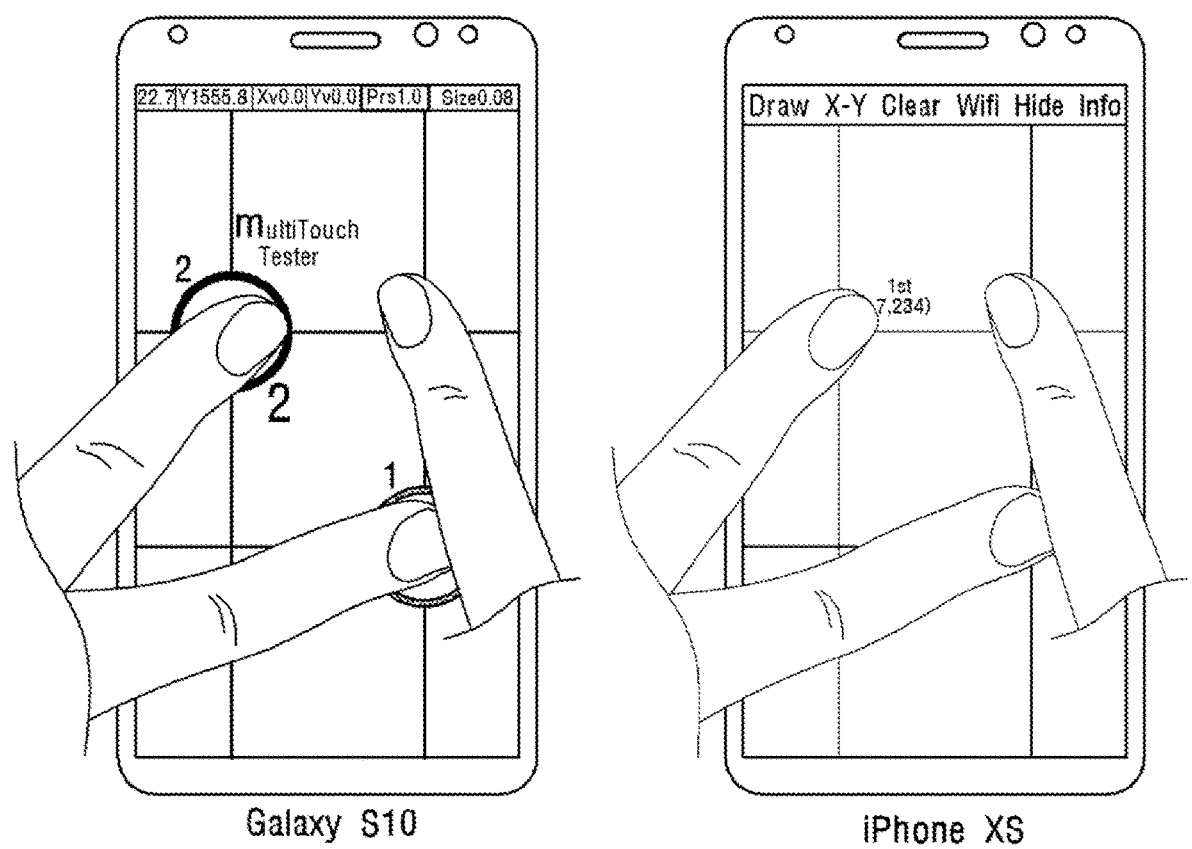
FIG. 35 is a view illustrating a state in which a third touch cannot be recognized when cross touches and the third touch are made together on the touch surface of the touch input devices in the related art.

FIG. 35 is a view illustrating a state in which a third touch cannot be recognized when cross touches and the third touch are made together on the touch surface of the touch input devices in the related art.

As illustrated in the left and right views in FIG. 35, the touch input devices in the related art cannot recognize a third touch among two cross touches made by two fingers of a left hand and the third touch made by one finger of a right hand.

Figure 36A:
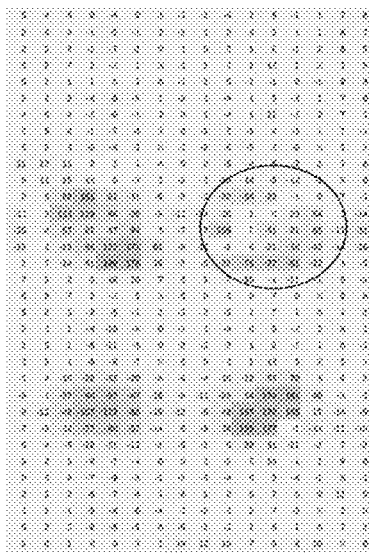
FIGS. 36A to 36C are views illustrating raw data for explaining a state in which the touch input device according to the exemplary embodiment of the present invention recognizes cross touches and a third touch.

FIG. 36A illustrates raw data obtained when the cross touches and the third touch are made on the touch input device having the touch sensor having the double layer illustrated in FIG. 3. Referring to FIG. 36A, the level values in the circular region corresponding to the third touch are relatively low in comparison with the portions where the cross touches are made. Therefore, the touch input device cannot recognize the third touch.

Figure 36B:
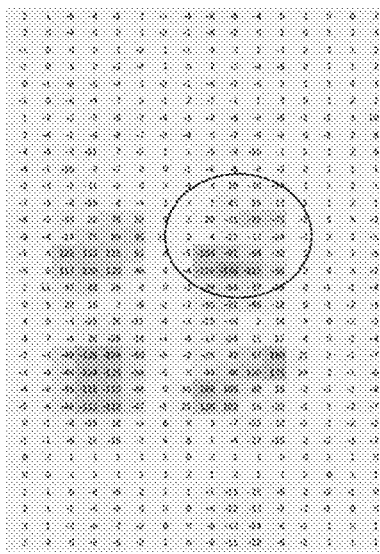

FIG. 36B illustrates raw data obtained when the cross touches and the third touch are made on the touch input device having the touch sensor illustrated in FIG. 10. Referring to FIG. 36B, the level values in the circular region corresponding to the third touch are relatively low in comparison with the portions where the cross touches are made. Therefore, the touch input device cannot recognize the third touch.

Figure 36C:
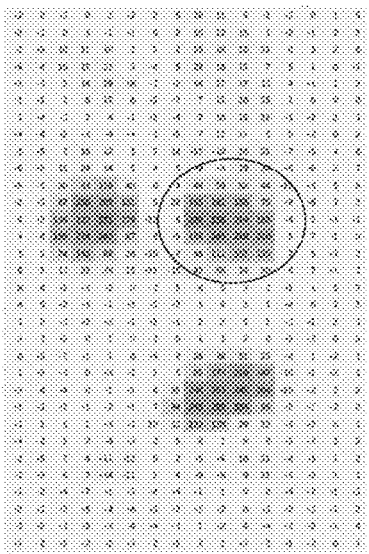

FIG. 36C illustrates raw data obtained when the cross touches and the third touch are made on the touch input device when the method of subtracting the detection signal outputted from another predetermined touch signal detection electrode used as the LGM disturbance signal detection electrode is applied to the touch input device having the touch sensor illustrated in FIG. 12 because the mutual capacitance is not formed by the driving electrode from the detection signal outputted from the touch signal detection electrode that forms the mutual capacitance with the driving electrode, as described with reference to FIGS. 20A to 20C. Referring to FIG. 36C, it can be ascertained that relatively large positive (+) level values are outputted from the two portions where the cross touches are made, and relatively large positive (+) level values are also outputted from the circular region corresponding to the third touch. That is, the touch input device may recognize both the cross touches and the third touch.

Figure 37A:
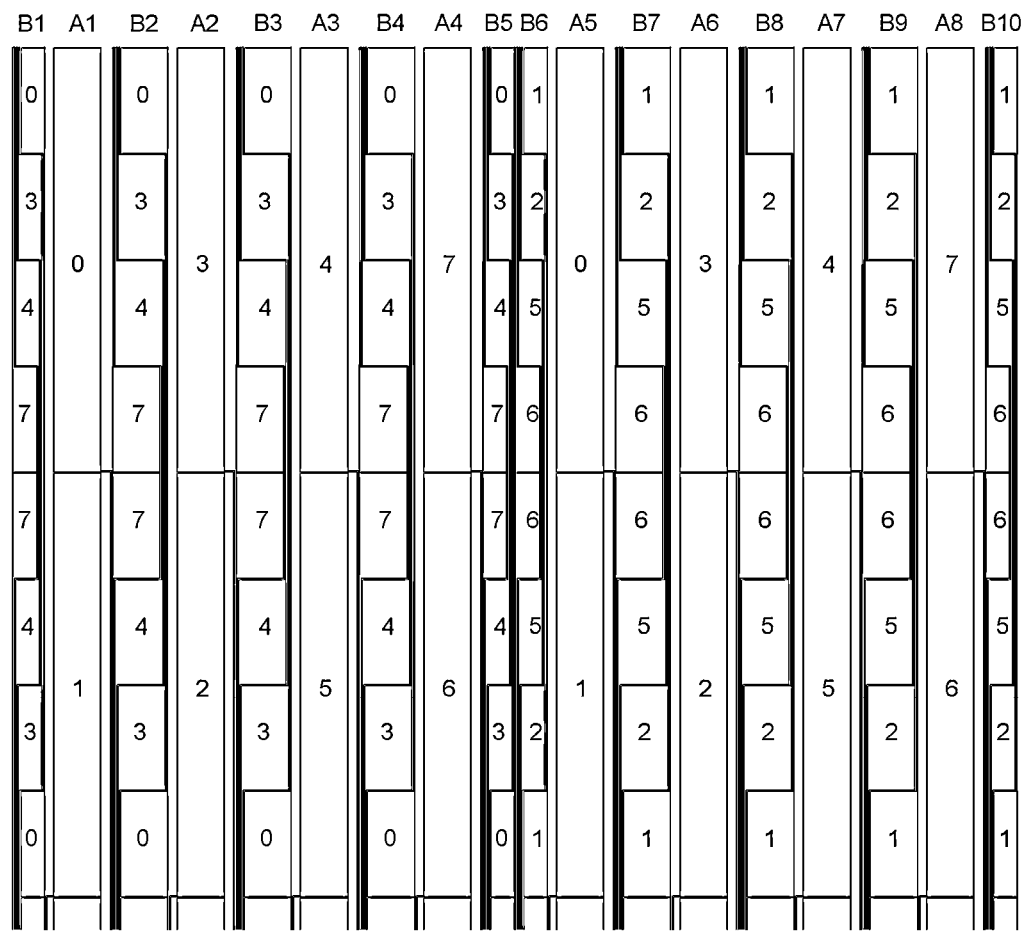
FIGS. 37A to 37E is a view for explaining an arrangement form of electrodes, which constitute the touch sensor 10, for reducing an LGM disturbance signal according to another exemplary embodiment of the present invention.
Figure 37B:
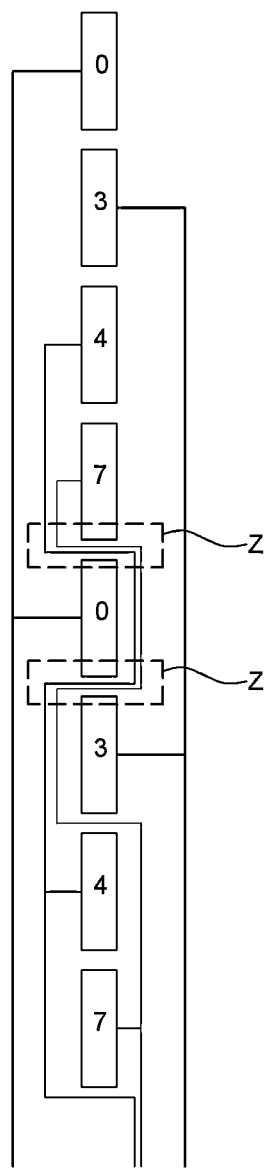
Figure 37C:
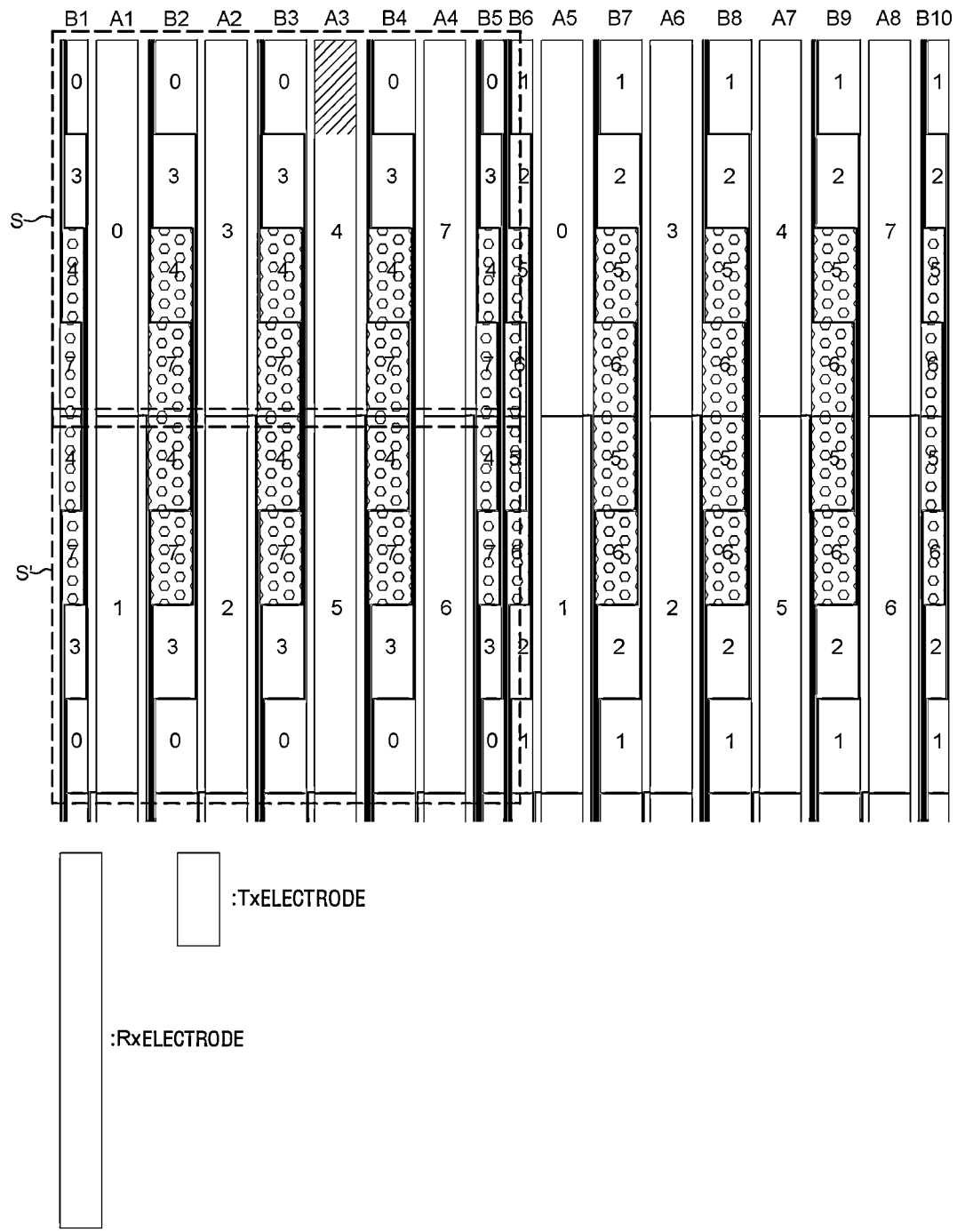

FIGS. 37A to 37C are a view for explaining an arrangement form of electrodes, which constitute the touch sensor 10, for reducing an LGM disturbance signal according to another exemplary embodiment of the present invention.

A touch sensor panel (not illustrated) according to the exemplary embodiment may include the touch sensor 10.

Figure 37D:
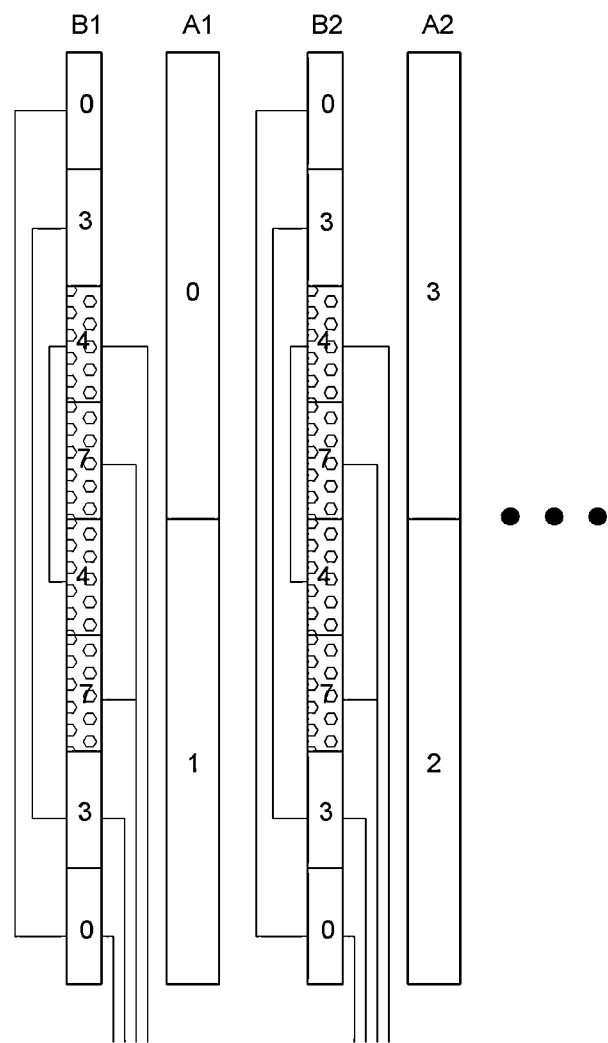
Figure 37E:
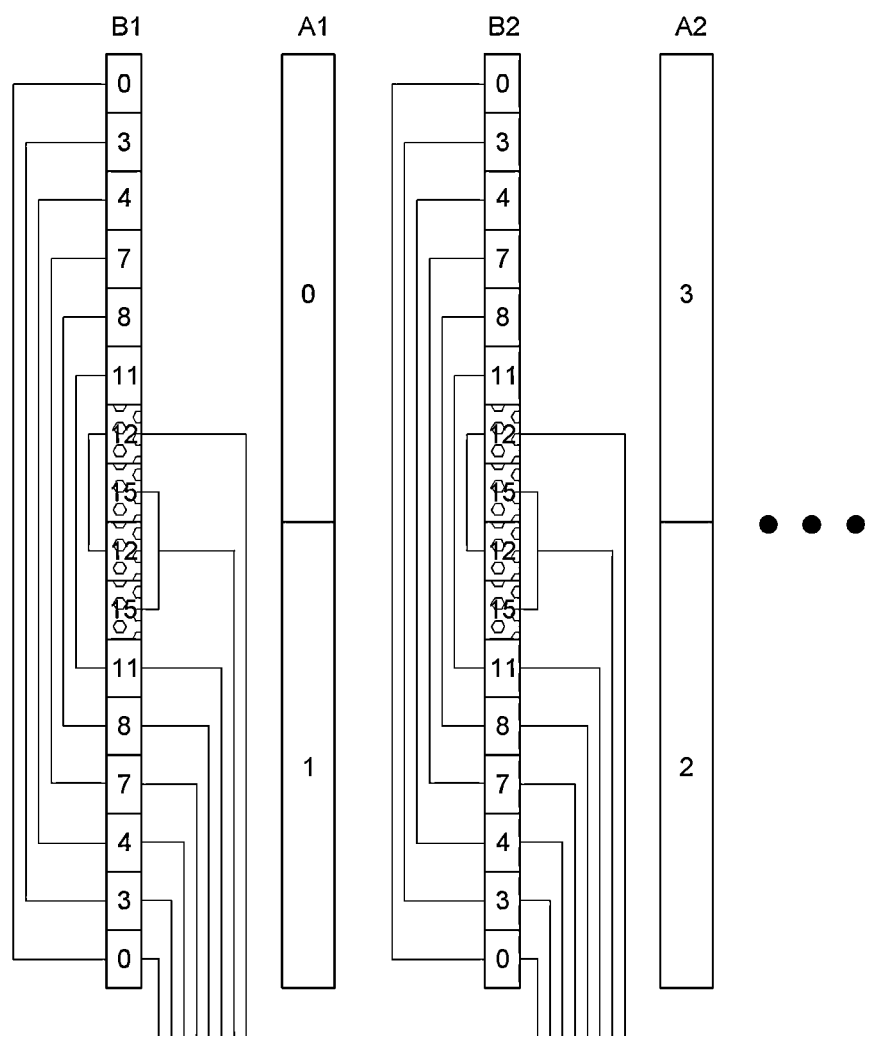

Specifically, FIGS. 37A and 37B are views provided to be compared with FIG. 37C according to the exemplary embodiment of the present invention, FIG. 37D is a view illustrating even traces with an enlarged part in FIG. 37C, and FIG. 37E illustrates a case in which a channel is extended by applying FIG. 37C.

In the case of the touch sensor panel illustrated in FIG. 37A, it can be seen that the second electrodes corresponding to the first electrodes RX0 included in the column A1 are disposed in the form of TX0-TX3-TX4-TX7, and the second electrodes corresponding to the first electrodes RX1 are disposed in the form of TX7-TX4-TX3-TX0.

According to this arrangement structure, the same electrodes TX7 are disposed to be adjacent to one another, and as a result, there is a problem in that a relatively large amount of LGM disturbance signals are detected or the resolution deteriorates.

Therefore, in order to solve the problem, the repeated electrodes may be eliminated by disposing the electrodes in the form of TX0-TX3-TX4-TX7-TX0-TX3-TX4-TX7 as illustrated in FIG. 37B. In this case, as indicated in parts Z, the trace is inevitably recessed between electrodes TX, which causes a visual problem because the trace in parts Z is visible from the outside.

Therefore, the exemplary embodiment of the present invention is for solving the above-mentioned problems. According to the following exemplary embodiment illustrated in FIG. 37C, as the number of traces is decreased in comparison with the touch sensor panel illustrated in FIG. 9, an effect of reducing the LGM disturbance signal may also be obtained, and the visual problem may be solved. This will be described in detail.

As illustrated in FIG. 37C, the touch sensor panel according to the exemplary embodiment of the present invention may include the plurality of first electrode columns A1 to A8 and the plurality of second electrode columns B1 to B10 which extend in the row direction. Further, the first electrode columns A1 to A8 and the plurality of second electrode columns B1 to B10 may be generally and alternately disposed. However, some of the second electrode columns B5 and B6 may be continuously disposed between the first electrode columns A4 and A5.

The plurality of first electrode columns A1 to A8 may include the plurality of first electrodes RX0 to RX7, and the plurality of second electrode columns B1 to B10 may include the plurality of second electrodes TX0 to TX7. FIG. 37C illustrates that the plurality of first electrodes RX0 to RX7 is sequentially disposed preferentially in the row direction, and the plurality of second electrodes TX0 to TX7 is sequentially disposed preferentially in the column direction, but the scope of the present invention is not limited thereto.

However, FIG. 37C illustrates only a part of the entire touch sensor panel, but the remaining first electrodes and the remaining second electrodes may be further disposed in the column direction and the row direction. Further, in FIG. 37C, it is assumed that the first electrode having a relatively large size is the touch signal detection electrode and the second electrode having a relatively small size is the driving electrode, but the scope of the present invention is not limited thereto. The configuration in which the first electrode is defined as the driving electrode and the second electrode is defined as the touch signal detection electrode may be equally/similarly applied to the present invention.

FIG. 37C illustrates that the electrode and the trace are separated and formed as separate components, but the electrode and the trace may be integrally formed in the form of a metal mesh in accordance with the exemplary embodiments. In this case, a dead zone, in which the touch position cannot be detected, such as a zone between the electrode and the trace and/or between the electrode and another electrode, is reduced, thereby further improving sensitivity in detecting the touch position.

At least two of the second electrodes TX0, TX3, TX4, and TX7 included in the second electrode column B2, which is any one of the plurality of second electrode columns B1 to B10 may be disposed to adjacently correspond to any one RX0 of the first electrodes RX0 and RX1 included in the first electrode column A1 which is any one of the plurality of first electrode columns A1 to A8. However, this is not only applied to the first electrode column A1, but also applied equally/similarly to the remaining first electrode columns A2 to A8. In addition, this is not only applied to the first electrode RX0, but also applied equally/similarly to the remaining first electrode RX1.

Any one RX0 of the first electrodes RX0 and RX1 included in the first electrode column A1 may be connected, by using one first trace, to the some of the remaining first electrodes (the first electrode RX0 included in the first electrode column A5) except for any one first electrode (the first electrode RX0 included in the first electrode column A1) among the plurality of first electrodes RX0 to RX7 included in the touch sensor panel. That is, this means the connection to the identical detection terminal.

Any one TX0 of the second electrodes TX0, TX3, TX4, and TX7 included in the second electrode column B2 may be connected, by using one second trace, to at least some of the remaining second electrodes (the second electrode TX0 included in the second electrode columns B1, and B3 to B5) except for any one second electrode (the second electrode TX0 included in the second electrode column B2) among the plurality of second electrodes TX0 to TX7 included in the touch sensor panel. That is, this means the connection to the identical driving terminal.

For reference, the identical first electrodes mean electrodes connected with one first trace, and the identical second electrodes mean electrodes connected with one second trace.

According to the structure of the touch sensor panel illustrated in FIG. 37C, the plurality of driving electrodes is connected to the identical driving terminal, and the plurality of touch signal detection electrodes is connected to the identical detection terminal, such that the number of traces may be reduced.

At least two of the second electrodes TX0, TX3, TX4, and TX7 are disposed to adjacently correspond to the first electrode RX0, at least two of the other second electrodes TX4, TX7, TX3, and TX0 are disposed to adjacently correspond to another first electrode RX1, and the electrodes, which have the same number among the second electrodes TX0, TX3, TX4, and TX7 and the other second electrodes TX4, TX7, TX3, and TX0, are connected by using one second trace, such that the number of traces may be reduced in comparison with the structure in which all of the plurality of driving electrodes corresponding to one touch signal detection electrode are connected by using different traces, as illustrated in FIG. 9.

Meanwhile, some first electrodes RX0, RX3, RX4, and RX7, which are included in a touch window region S among the plurality of first electrodes RX0 to RX7 of the touch sensor panel, may be connected to one another with the different first traces.

All of the first electrodes RX0, RX3, RX4, and RX7 included in the touch window region S are separated from one another and connected by using the different first traces, such that the LGM disturbance signal may be reduced, thereby improving touch sensitivity.

Meanwhile, the touch window region S in the present invention may be defined as an area, like a touch area of a thumb, larger than a touch area of each of the remaining fingers. Specifically, the area of the touch window region S may be implemented as about 15 mm*15 mm or more or about 20 mm*20 mm or less, but particularly, the area of the touch window region S may be implemented as about 16 mm*16 mm In particular, FIG. 37C illustrates that the area of the touch window region S is implemented as about 16 mm*16 mm.

Specifically, an area of a unit cell (the hatched portion in FIG. 37C) may be implemented as approximately 4 mm (vertical)*2 mm (horizontal). As such, in the case of FIG. 37C, one RX electrode (having a size corresponding to four unit cells) has a vertical length of approximately 16 mm and a horizontal length of approximately 2 mm. Further, one TX electrode (having a size corresponding to one unit cell) has a vertical length of approximately 4 mm and a horizontal length of approximately 2 mm Therefore, FIG. 37C illustrates that the area of the touch window region S is implemented as about 16 mm*16 mm. For reference, TX0 in the column B1 has a vertical length of approximately 4 mm and a horizontal length of approximately 1 mm, and TX0 in column B5 has a vertical length of approximately 4 mm and a horizontal length of approximately 1 mm, such that a sum of the areas of the two electrodes is the area of one unit cell.

As an example, as illustrated in FIG. 37C, the touch window region S may include some RX0, RX3, RX4, and RX7 of the plurality of first electrodes RX0 to RX7 and some TX0, TX3, TX4, and TX7 of the plurality of second electrodes TX0 to TX7. Specifically, the touch window region S may include the four first electrodes RX0, RX3, RX4, and RX7, which are continuously disposed in the column direction among the plurality of first electrodes RX0 to RX7, and the four second electrodes TX0, TX3, TX4, and TX7 which are continuously disposed and adjacently correspond, in the row direction, to the four first electrodes RX0, RX3, RX4, and RX7.

In the touch sensor panel illustrated in FIG. 37C, based on any one of the first electrodes RX0 and RX1 included in the first electrode column A1, the second electrode column B2 may be disposed at one side, and another second electrode column B1 may be disposed at the other side. Further, any one of the second electrodes TX0, TX3, TX4, and TX7 included in the second electrode column B2 and any one of the second electrodes TX0, TX3, TX4, and TX7 included in another second electrode column B1 may be disposed in the same column based on any one RX0 of the first electrodes RX0 and RX1. In this case, any one of the second electrodes TX0, TX3, TX4, and TX7 included in the second electrode column B2 and any one of the second electrodes TX0, TX3, TX4, and TX7 included in another second electrode column B1, which are disposed in the same row, mean electrodes connected by using the same one second trace.

That is, based on the first electrode having a relatively large size, the two identical second electrodes having a relatively small size may be disposed to be adjacent to the left and right sides. The two identical second electrodes may be disposed on the same line.

However, FIG. 37C illustrates that the identical second electrodes having a relatively small size are disposed based on the first electrode having a relatively large size, but according to another exemplary embodiment, a configuration may be implemented such that the identical first electrodes having a relatively large size are disposed based on the second electrode having a relatively small size.

FIG. 37C illustrates that the second electrodes are disposed to be adjacent to the left and right sides based on the first electrode, but according to another exemplary embodiment, a configuration may be implemented such that the second electrodes are disposed to be adjacent to upper and lower sides based on the first electrode.

FIG. 37C illustrates that the second electrode (e.g., TX0) of the second electrode column B2 and the second electrode (e.g., TX0) of another second electrode column B1, which are disposed based on the first electrode (e.g., RX0) of the first electrode column A1, have different sizes. However, according to another exemplary embodiment, a configuration may be implemented such that the second electrode (e.g., TX0) of the second electrode column B2 and the second electrode (e.g., TX0) of another second electrode column B1 have the same size.

Meanwhile, as illustrated in FIGS. 37C and 37D, the touch sensor panel may include the touch window region S, and an adjacent touch region S' disposed to be adjacent, in the row direction, to the touch window region S among the remaining touch regions. Further, the adjacent touch region S' is defined as a region having the same size as the touch window region S.

In this case, among the second electrodes TX0-TX3-TX4-TX7-TX4-TX7-TX3-TX0 included in the second electrode column B1, the first-disposed electrode TX4, which is disposed first among the second electrodes TX4-TX7-TX3-TX0 included in the adjacent touch region S', and the electrode TX4, which is disposed immediately before the electrode TX7 which is disposed lastly among the second electrodes TX0-TX3-TX4-TX7 included in the touch window region S, may be connected with the same trace, and the second-disposed electrode TX7, which is disposed immediately sequentially to the electrode which is disposed first, and the electrode TX7, which is disposed lastly, may be connected with the same trace.

The remaining second electrodes TX3-TX0, except for the first-disposed electrode and the second-disposed electrode, and the second electrodes TX3-TX0, which are disposed to face one another based on the first-disposed electrode, the second-disposed electrode, the electrode disposed lastly, and the electrode disposed immediately before the electrode disposed lastly, may be connected with the same trace.

FIG. 37E illustrates an example in which the number of channels is further increased. Among the second electrodes TX0-TX3-TX4-TX7-TX8-TX11-TX12-TX15-TX12-TX15-TX11-TX8-TX7-TX4-TX3-TX0 included in the second electrode column B1, the first-disposed electrode TX12, which is disposed first among the second electrodes TX12-TX15-TX11-TX8-TX7-TX4-TX3-TX0 included in the adjacent touch region S', and the electrode TX12, which is disposed immediately before the electrode TX15 which is disposed lastly among the second electrodes TX0-TX3-TX4-TX7-TX8-TX11-TX12-TX15 included in the touch window region S, may be connected with the same trace, and the second-disposed electrode TX15, which is disposed immediately sequentially to the electrode which is disposed first, and the electrode TX15, which is disposed lastly, may be connected with the same trace.

The remaining second electrodes TX11-TX8-TX7-TX4-TX3-TX0, except for the first-disposed electrode and the second-disposed electrode, and the second electrodes TX11-TX8-TX7-TX4-TX3-TX0, which are disposed to face one another based on the first-disposed electrode, the second-disposed electrode, the electrode disposed lastly, and the electrode disposed immediately before the electrode disposed lastly, may be connected with the same trace.

With this arrangement form, the separate trace is not recessed between the electrodes TX, and as a result, it is possible to solve the visual problem in that the trace is visible from the outside.

Consequently, according to the arrangement form of the electrodes illustrated in FIG. 37C, it is possible to reduce the number of traces, reduce the LGM disturbance signal, and solve the visual problem in that the trace is visible from the outside.

Figure 19C:
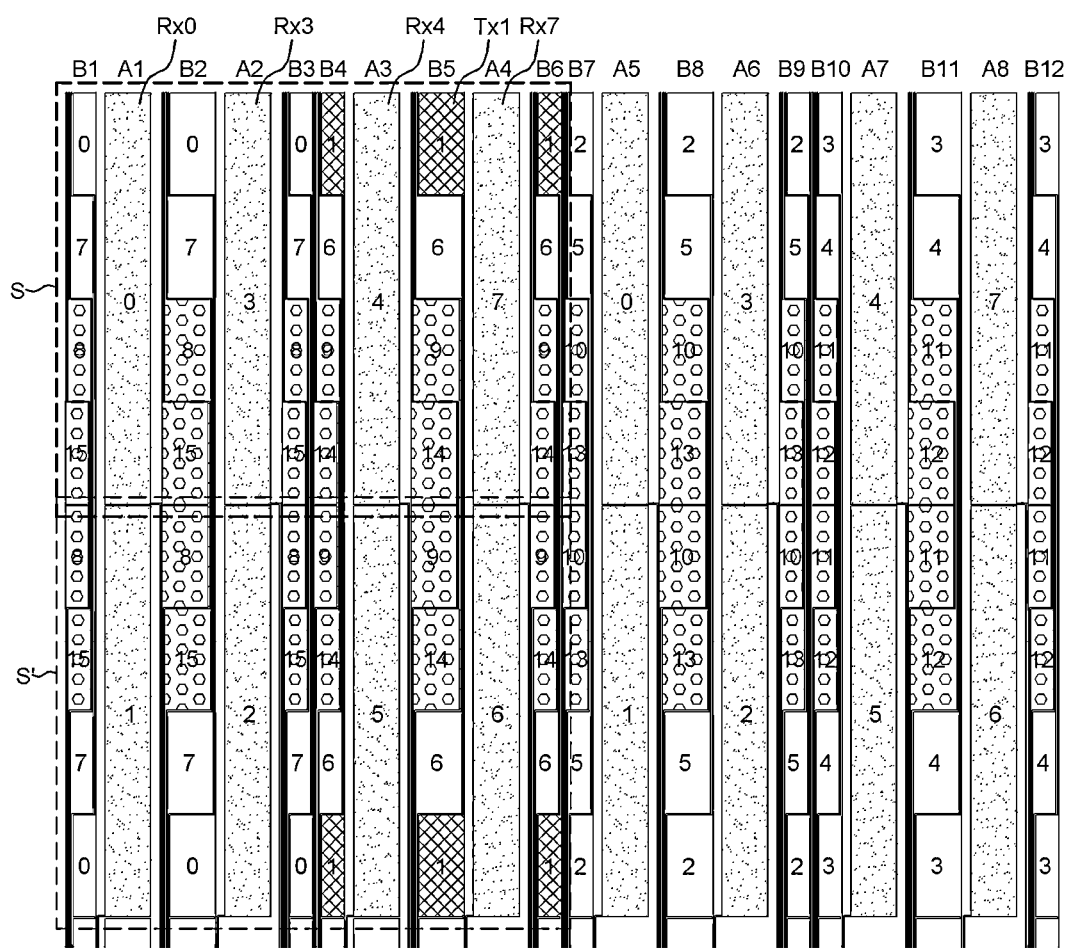
FIGS. 19C to 19E illustrate a method of connecting the trace and the electrode pattern manufactured by applying the principle illustrated in FIGS. 37C to 37E which is described above with reference to FIG. 19A.
Figure 19D:
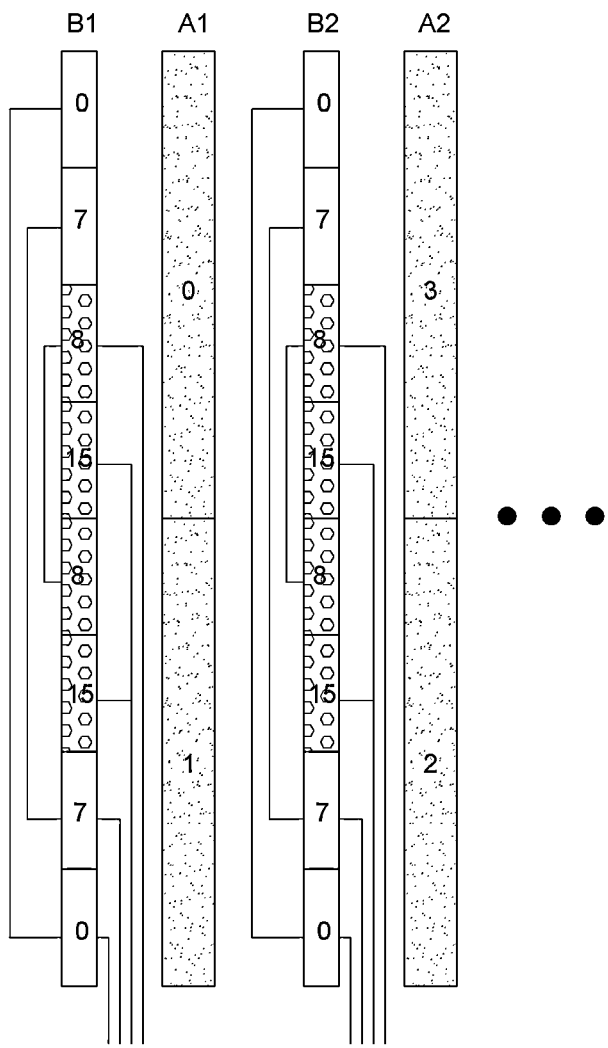
Figure 19E:
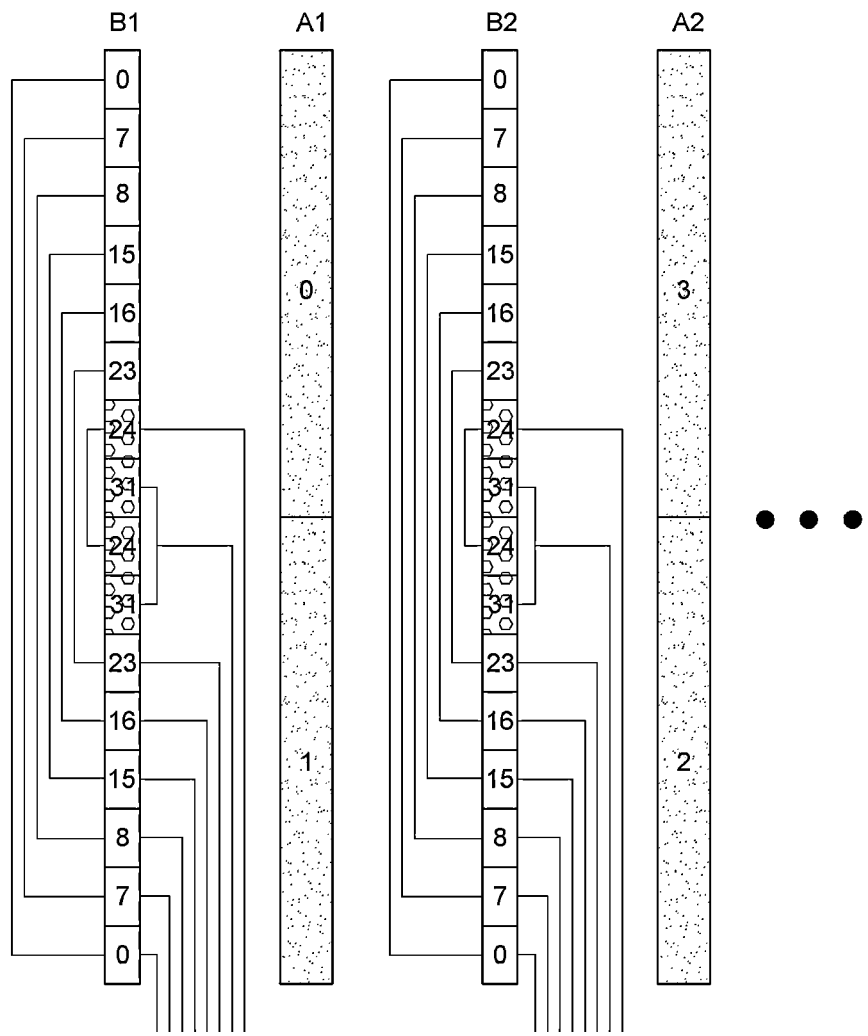

FIGS. 19C to 19E illustrate a method of connecting the trace and the electrode pattern manufactured by applying the principle illustrated in FIGS. 37C to 37E which is described above with reference to FIG. 19A.

The principle described above with reference to FIG. 19A may be equally/similarly applied to FIGS. 19C to 19E.

FIG. 19D is a view illustrating the trace together with some electrodes illustrated in FIG. 19C.

Referring to FIGS. 19C and 19D together, the touch window region S may include some RX0, RX3, RX4, and RX7 of the plurality of first electrodes RX0 to RX7 and some Tx0, Tx1, TX6, TX7, TX8, TX9, TX14, and TX15 of the plurality of second electrodes TX0 to TX15. Specifically, the touch window region S may include the four first electrodes RX0, RX3, RX4, and RX7, which are continuously disposed in the column direction among the plurality of first electrodes RX0 to RX7, and the four second electrodes TX0, TX7, TX8, TX15 or TX1, TX6, TX9, and TX14 which are continuously disposed and adjacently correspond, in the row direction, to the four first electrodes RX0, RX3, RX4, and RX7.

For reference, in the present invention, the configuration in which the second electrode is disposed to adjacently correspond to the first electrode or the first electrode is disposed to adjacently correspond to the second electrode may mean that the mutual capacitance may be generated between the adjacent first and second electrodes.

In the touch sensor panel illustrated in FIG. 19C, based on any one of the first electrodes RX0 and RX1 included in the first electrode column A1, the second electrode column B2 may be disposed at one side, and another second electrode column B1 may be disposed at the other side. Further, any one of the second electrodes TX0, TX7, TX8, and TX15 included in the second electrode column B2 and any one of the second electrodes TX0, TX7, TX8, and TX15 included in another second electrode column B1 may be disposed in the same row based on any one RX0 of the first electrodes RX0 and RX1. In this case, any one of the second electrodes TX0, TX7, TX8, and TX15 included in the second electrode column B2 and any one of the second electrodes TX0, TX7, TX8, and TX15 included in another second electrode column B1, which are disposed in the same row, may constitute the same channel.

That is, based on the first electrode having a relatively large size, the two identical second electrodes having a relatively small size may be disposed to be adjacent to the left and right sides. The two identical second electrodes may be disposed on the same line. As a result, it is possible to improve the split effect of the result value of the capacitance signal caused by the LGM disturbance signal as described above with reference to FIG. 5. In general, the split of the result value of the capacitance signal is mainly caused when the configuration in which the identical second electrodes are disposed based on the first electrode and the configuration in which the different second electrodes are disposed based on the first electrode are mixed. Therefore, the case in which the two identical second electrodes are disposed on the same line based on all of the first electrodes may relatively further improve the split effect of the result value of the capacitance signal caused by the LGM disturbance signal.

However, FIG. 19C illustrates that the identical second electrodes having a relatively small size are disposed based on the first electrode having a relatively large size, but according to another exemplary embodiment, a configuration may be implemented such that the identical first electrodes having a relatively large size are disposed based on the second electrode having a relatively small size.

FIG. 19C illustrates that the second electrodes are disposed to be adjacent to the left and right sides based on the first electrode, but according to another exemplary embodiment, a configuration may be implemented such that the second electrodes are disposed to be adjacent to upper and lower sides based on the first electrode.

Meanwhile, as illustrated in FIG. 19C, the touch sensor panel may include the touch window region S, and the adjacent touch region S' disposed to be adjacent, in the row direction, to the touch window region S among the remaining touch regions. Further, the adjacent touch region S' is defined as a region having the same size as the touch window region S.

In this case, among the second electrodes TX0-TX7-TX8-TX15-TX8-TX15-TX7-TX0 included in the second electrode column B1, the first-disposed electrode TX8, which is disposed first among the second electrodes TX8-TX15-TX7-TX0 included in the adjacent touch region S', and the electrode TX8, which is disposed immediately before the electrode TX7 which is disposed lastly among the second electrodes TX0-TX7-TX8-TX15 included in the touch window region S, may be connected with the same trace, and the second-disposed electrode TX15, which is disposed immediately sequentially to the electrode which is disposed first in the adjacent touch region S', and the electrode TX15, which is disposed lastly in the touch window region S, may be connected with the same trace.

The remaining second electrodes TX7-TX0, except for the first-disposed electrode and the second-disposed electrode in the adjacent touch region S', and the second electrodes TX7-TX0 in the touch window region S, which are disposed to face one another based on the first-disposed electrode in the adjacent touch region S', the second-disposed electrode, the electrode disposed lastly in the touch window region S, and the electrode disposed immediately before the electrode disposed lastly, may be connected with the same trace.

FIG. 19E illustrates an example in which the number of channels is further increased. Among the second electrodes TX0-TX7-TX8-TX15-TX16-TX23-TX24-TX31-TX24-TX31-TX23-TX16-TX15-TX8-TX7-TX0 included in the second electrode column B1, the first-disposed electrode TX24, which is disposed first among the second electrodes TX24-TX31-TX23-TX16-TX15-TX8-TX7-TX0 included in the adjacent touch region S', and the electrode TX24, which is disposed immediately before the electrode TX31 which is disposed lastly among the second electrodes TX0-TX7-TX8-TX15-TX16-TX23-TX24-TX31 included in the touch window region S, may be connected with the same trace, and the second-disposed electrode TX31, which is disposed immediately sequentially to the electrode which is disposed first in the adjacent touch region S', and the electrode TX31, which is disposed lastly in the touch window region S, may be connected with the same trace.

The remaining second electrodes TX23-TX16-TX15-TX8-TX7-TX0, except for the first-disposed electrode and the second-disposed electrode in the adjacent touch region S', and the second electrodes TX23-TX16-TX15-TX8-TX7-TX0, which are disposed to be symmetrical based on the first-disposed electrode in the adjacent touch region S', the second-disposed electrode, the electrode disposed lastly in the touch window region S, and the electrode disposed immediately before the electrode disposed lastly, may be connected with the same trace.

With this arrangement form, the separate trace is not recessed between the electrodes TX, and as a result, it is possible to solve the visual problem in that the trace is visible from the outside.

Consequently, according to the arrangement form of the electrodes illustrated in FIGS. 19C to 19E, it is possible to reduce the number of traces, reduce the LGM disturbance signal, and solve the visual problem in that the trace is visible from the outside.

Figure 19F:
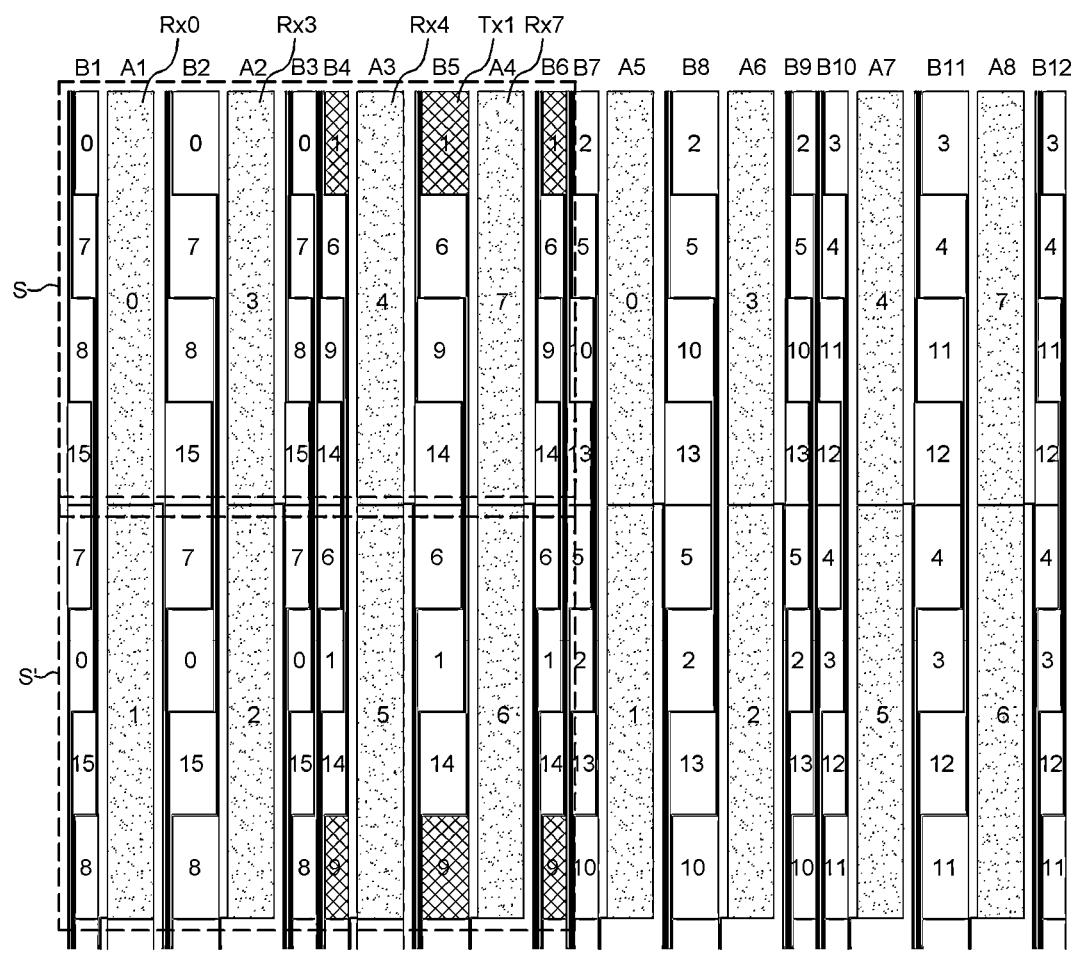
FIGS. 19F and 19G illustrate other electrode arrangement forms according to the exemplary embodiment.
Figure 19G:
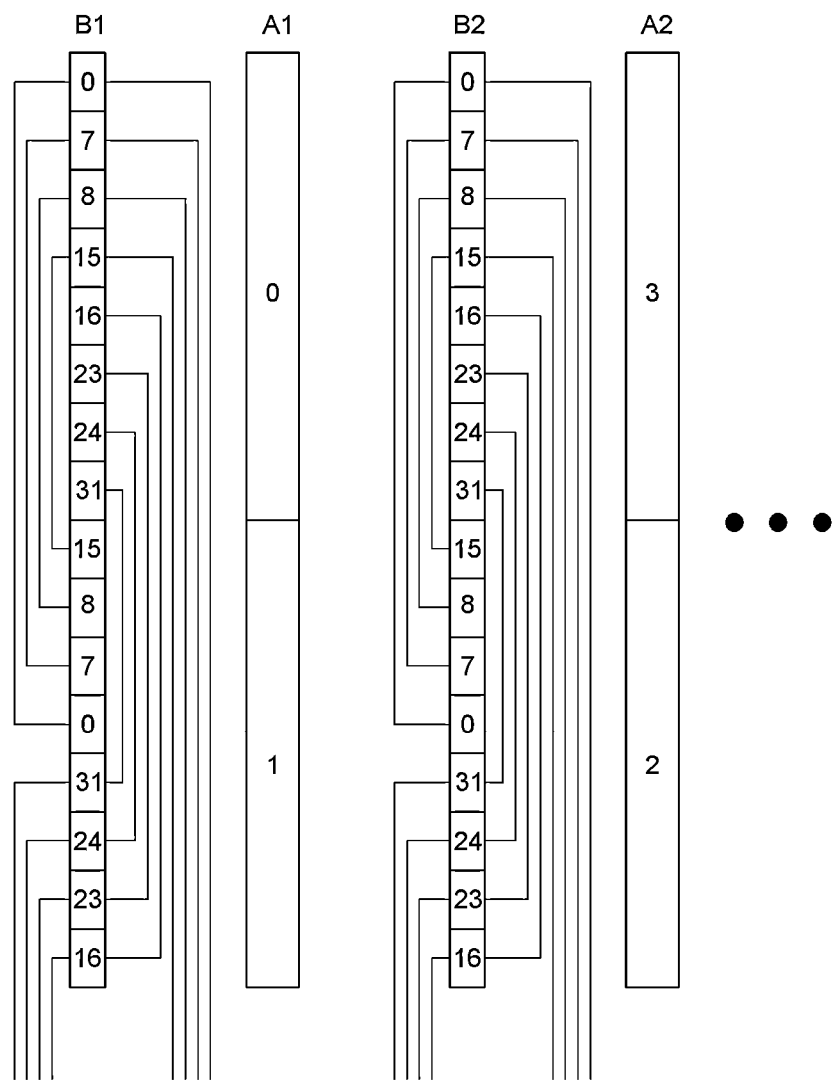

FIGS. 19F and 19G illustrate other electrode arrangement forms according to the exemplary embodiment.

The principle described above with reference to FIG. 19A may be equally/similarly applied to FIGS. 19F and 19G.

According to the trace connection method according to the arrangement of the electrodes illustrated in FIGS. 19C to 19E, a width of a bezel in which the trace is disposed in the touch input device may be increased, such that the trace may occupy a large space. Therefore, in the case of FIGS. 19F and 19G, the trace connection method, which relatively decreases the space occupied by the trace, is provided.

For example, in the case of FIG. 19E, based on the column B1, seven trace arrangement spaces are required at the left side, and eight trace arrangement spaces are required at the right side. In contrast, in the case of FIG. 19G, it can be seen that based on the column B1, the four trace arrangement spaces are required at the left side, and the eight trace arrangement spaces are required at the right side. That is, in the case of FIG. 19G, a narrow space is required to dispose the trace in comparison with FIG. 19E.

In the touch sensor panel illustrated in FIG. 19F, based on any one of the first electrodes RX0 and RX1 included in the first electrode column A1, the second electrode column B2 may be disposed at one side, and another second electrode column B1 may be disposed at the other side. Further, any one of the second electrodes TX0, TX7, TX8, and TX15 included in the second electrode column B2 and any one of the second electrodes TX0, TX7, TX8, and TX15 included in another second electrode column B1 may be disposed in the same row based on any one RX0 of the first electrodes RX0 and RX1. In this case, any one of the second electrodes TX0, TX7, TX8, and TX15 included in the second electrode column B2 and any one of the second electrodes TX0, TX7, TX8, and TX15 included in another second electrode column B1, which are disposed in the same row, mean electrodes connected by using the same one second trace.

The touch window region S illustrated in FIG. 19F may include some RX0, RX3, RX4, and RX7 of the plurality of first electrodes RX0 to RX7 and some Tx0, Tx1, TX6, TX7, TX8, TX9, TX14, and TX15 of the plurality of second electrodes TX0 to TX15. Specifically, the touch window region S may include the four first electrodes RX0, RX3, RX4, and RX7, which are continuously disposed in the column direction among the plurality of first electrodes RX0 to RX7, and the four second electrodes TX0, TX7, TX8, TX15 or TX1, TX6, TX9, and TX14 which are continuously disposed and adjacently correspond, in the row direction, to the four first electrodes RX0, RX3, RX4, and RX7.

Meanwhile, as illustrated in FIG. 19F, the touch sensor panel may include the touch window region S, and the adjacent touch region S' disposed to be adjacent, in the row direction, to the touch window region S among the remaining touch regions. Further, the adjacent touch region S' is defined as a region having the same size as the touch window region S'.

In this case, the second electrodes TX0-TX7-TX8-TX15-TX7-TX0-TX15-TX8 included in the second electrode column B1 includes, in the touch window region S, a first electrode set including the second electrodes TX0 and TX7 and a second electrode set including the second electrodes TX8 and TX15, and includes, in the adjacent touch region S', a third electrode set including the second electrodes TX7 and TX0 and a fourth electrode set including the second electrodes TX15 and TX8.

The second electrodes TX7 and TX0, which constitute the third electrode set in the adjacent touch region S', and the second electrodes TX7 and TX0, which constitute the first electrode set in the touch window region S, are connected with the same trace. Further, the second electrodes TX7 and TX0, which are connected with the same trace, may be disposed to be symmetrical in the third electrode set and the first electrode set. That is, the second electrode TX7, which is disposed second in the first electrode set, and the second electrode TX7, which is disposed first in the third electrode set, may be connected with the same trace, and the second electrode TX0, which is disposed first in the first electrode set, and the second electrode TX0, which is disposed second in the third electrode set, may be connected with the same trace.

This feature may also be equally applied to the second electrode set and the fourth electrode set.

The second electrodes TX15 and TX8, which constitute the fourth electrode set in the adjacent touch region S', and the second electrodes TX15 and TX8, which constitute the second electrode set in the touch window region S, are connected with the same trace. Further, the second electrodes TX15 and TX8, which are connected with the same trace, may be disposed to be symmetrical in the fourth electrode set and the second electrode set. That is, the second electrode TX15, which is disposed second in the second electrode set, and the second electrode TX15, which is disposed first in the fourth electrode set, may be connected with the same trace, and the second electrode TX8, which is disposed first in the second electrode set, and the second electrode TX8, which is disposed second in the fourth electrode set, may be connected with the same trace.

FIG. 19F illustrates that the number of electrodes included in one electrode set is 2, but FIG. 19G illustrates that the number of electrodes included in one electrode set is 4. In addition, the scope of the present invention may be equally/similarly applied to a configuration in which the number of electrodes included in one electrode set is n.

In FIG. 19G, the second electrodes TX0-TX7-TX8-TX15-TX16-TX23-TX24-TX31-TX15-TX8-TX7-TX0-TX31-TX24-TX23-TX16 included in the second electrode column B1 includes, in the touch window region S, the first electrode set including the second electrodes TX0, TX7, TX8, and TX15 and the second electrode set including the second electrodes TX16-TX23-TX24-TX31, and includes, in the adjacent touch region S', the third electrode set including the second electrodes TX15-TX8-TX7-TX0 and the fourth electrode set including the second electrodes TX31-TX24-TX23-TX16.

The second electrodes TX15-TX8-TX7-TX0, which constitute the third electrode set in the adjacent touch region S', and the second electrodes TX15-TX8-TX7-TX0, which constitute the first electrode set in the touch window region S, are connected with the same trace. Further, the second electrodes TX15-TX8-TX7-TX0, which are connected with the same trace, may be disposed to face one another in the third electrode set and the first electrode set. That is, the second electrode TX0, which is disposed first in the first electrode set, and the second electrode TX0, which is disposed fourth in the third electrode set, may be connected with the same trace, the second electrode TX7, which is disposed second in the first electrode set, and the second electrode TX7, which is disposed third in the third electrode set, may be connected with the same trace, the second electrode TX8, which is disposed third in the first electrode set, and the second electrode TX8, which is disposed second in the third electrode set, may be connected with the same trace, and the second electrode TX15, which is disposed fourth in the first electrode set, and the second electrode TX15, which is disposed first in the third electrode set, may be connected with the same trace.

This feature may also be equally applied to the second electrode set and the fourth electrode set.

The second electrodes TX31-TX24-TX23-TX16, which constitute the fourth electrode set in the adjacent touch region S', and the second electrodes TX31-TX24-TX23-TX16, which constitute the second electrode set in the touch window region S, are connected with the same trace. Further, the second electrodes TX31-TX24-TX23-TX16, which are connected with the same trace, may be disposed to face one another in the fourth electrode set and the second electrode set. That is, the second electrode TX16, which is disposed first in the second electrode set, and the second electrode TX15, which is disposed fourth in the fourth electrode set, may be connected with the same trace, the second electrode TX23, which is disposed second in the second electrode set, and the second electrode TX23, which is disposed third in the fourth electrode set, may be connected with the same trace, the second electrode TX24, which is disposed third in the second electrode set, and the second electrode TX24, which is disposed second in the fourth electrode set, may be connected with the same trace, and the second electrode TX31, which is disposed fourth in the second electrode set, and the second electrode TX31, which is disposed first in the fourth electrode set, may be connected with the same trace.

This arrangement form may decrease the width of the bezel of the touch input device.

FIG. 19 illustrates an example in which the electrode having a relatively large size is the touch signal detection electrode and the electrode having a relatively small size is the driving electrode. In contrast, the present invention may be equally/similarly applied even in the case in which the electrode having a relatively large size is the driving electrode and the electrode having a relatively small size is the touch signal detection electrode.

The examples described above with reference to FIG. 19 may be not only applied to the electrode or the electrode column, but also applied equally/similarly to all of the electrodes and all of the electrode columns in the touch sensor panel.

FIGS. 38 to 48 are views illustrating various types of electrode arrangement forms and trace connection forms according to another exemplary embodiment of the present invention and explain a case in which inhibition of LGM is applied to each of the exemplary embodiments.

The principle described above with reference to FIG. 19A may also be equally/similarly applied to FIGS. 38 to 48. That is, some of the touch signal detection electrodes may be used as the LGM disturbance signal detection electrodes without separately providing the physically separate LGM disturbance signal detection electrode.

FIGS. 38 to 44 illustrate only one touch window region S of the touch sensor, the touch sensor may further include a plurality of electrodes in the column and row directions, and the following principle may be equally/similarly applied to the remaining touch window region of the touch sensor.

FIGS. 45 to 48 illustrate only a part of the touch sensor, and a plurality of first and second electrodes may further include in the row direction and the column direction.

Figure 41:
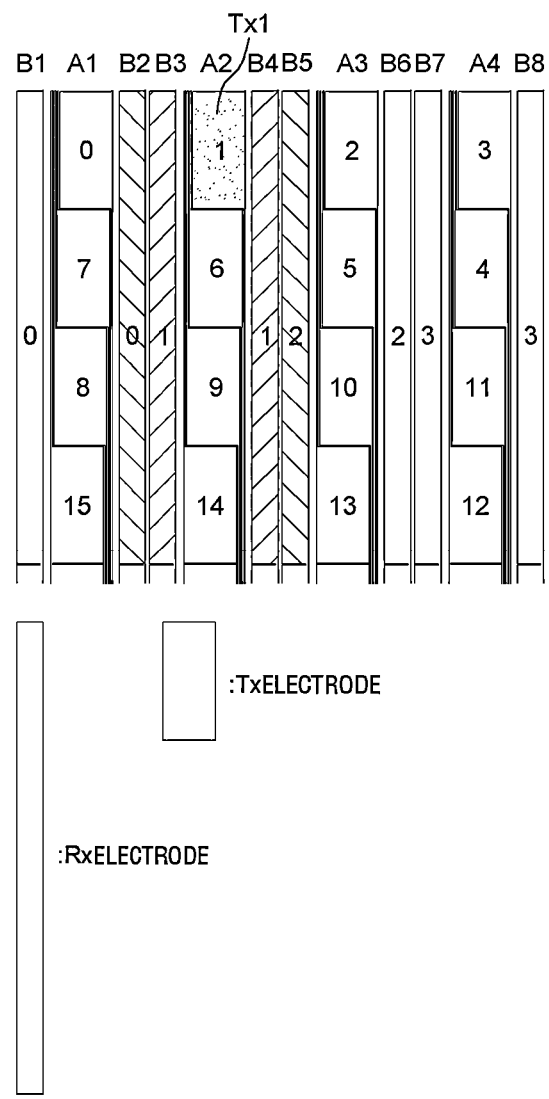
Figure 42:
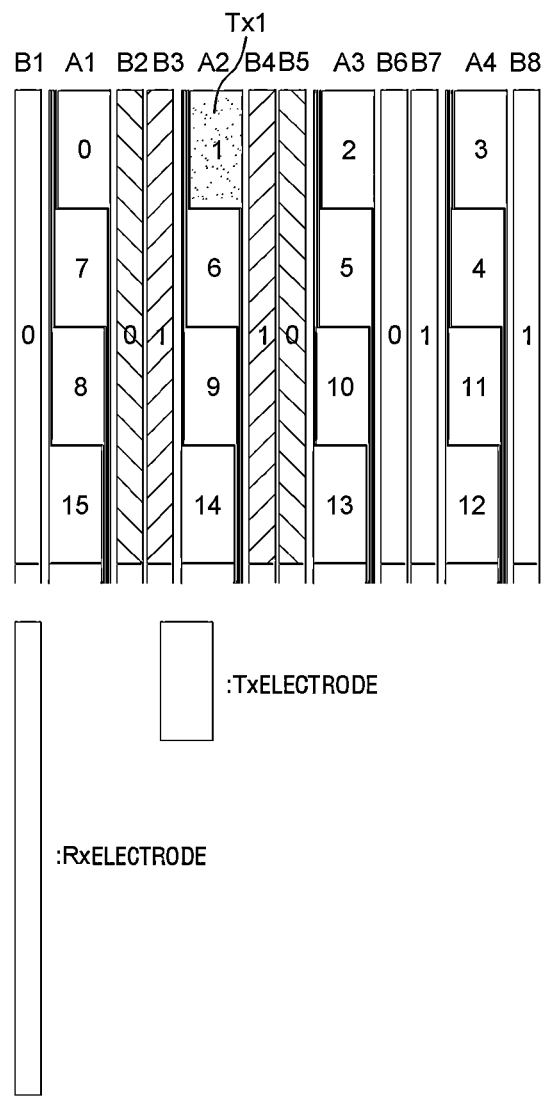

In FIGS. 38 to 40 and 43 to 48, the first electrode having a relatively large area and/or length is defined as the driving electrode, and the second electrode having a relatively small area and/or length is defined as the touch signal detection electrode. In FIGS. 41 and 42, the first electrode having a relatively large area and/or length is defined as the touch signal detection electrode, and the second electrode having a relatively small area and/or length is defined as the driving electrode. However, the following principle may also be equally/similarly applied to the case in which the above-mentioned configuration is implemented in the opposite manner.

FIGS. 38 to 40, 43, and 44 illustrate that a length of one touch signal detection electrode is ½ of a length of one driving electrode, and an area of one touch signal detection electrode is ¼ of an area of one driving electrode. FIGS. 41 and 42 illustrate that a length of one driving electrode is ¼ of a length of one touch signal detection electrode, and an area of one driving electrode is ½ of an area of one touch signal detection electrode. However, the present invention may be equally/similarly applied to a configuration in which the above-mentioned numerical values are changed to other numerical values.

FIGS. 45 to 48 illustrate that an area of one touch signal detection electrode is ½ of an area of one driving electrode, but the scope of the present invention is not limited thereto.

Figure 38:
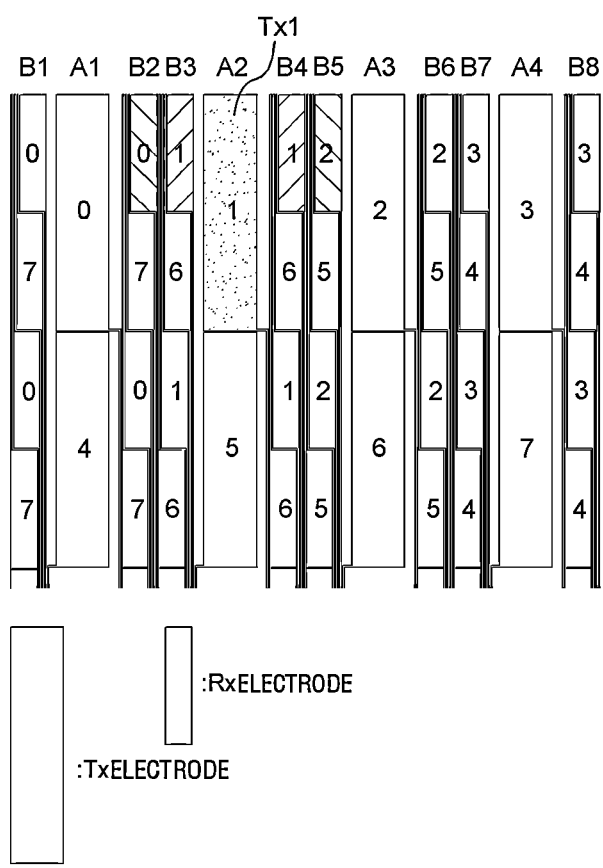

As illustrated in FIG. 38, the touch sensor according to the exemplary embodiment of the present invention may include the plurality of first electrode columns A1 to A4 and the plurality of second electrode columns B1 to B8 that extend in the column direction. Further, the first electrode columns A1 to A4 and the plurality of second electrode columns B1 to B8 may be generally and alternately disposed. However, some of the second electrode columns (e.g., B2 and B3) may be continuously disposed between the first electrode columns A1 and A2.

The plurality of first electrode columns A1 to A4 may include the plurality of first electrodes TX0 to TX7, and the plurality of second electrode columns B1 to B8 may include the plurality of second electrodes RX0 to RX7. FIG. 38 illustrates that the plurality of first electrodes TX0 to TX7 is sequentially disposed preferentially in the column direction, and the plurality of second electrodes RX0 to RX7 is sequentially disposed preferentially in the column direction, but the scope of the present invention is not limited thereto.

However, FIG. 38 illustrates only a part of the entire touch sensor, but the remaining first electrodes and the remaining second electrodes may be further disposed in the column direction and the row direction.

FIG. 38 illustrates that the electrode and the trace are separated and formed as separate components, but the electrode and the trace may be integrally formed in the form of a metal mesh in accordance with the exemplary embodiments. In this case, a dead zone, in which the touch position cannot be detected, such as a zone between the electrode and the trace and/or between the electrode and another electrode, is reduced, thereby further improving sensitivity in detecting the touch position.

For example, in FIG. 38, at least two of the touch signal detection electrodes RX1 and RX6 in the column B4 may be disposed to adjacently correspond to the driving electrode TX1 in the column A2, at least two of the other touch signal detection electrodes RX1 and RX6 may be disposed to adjacently correspond to another driving electrode TX5 in the adjusted next row, and then the electrodes, which have the same number among at least two electrodes and at least two of the other electrodes, may be connected by using one trace. Therefore, the number of traces may be reduced in comparison with the structure in which all of the plurality of touch signal detection electrodes corresponding to one driving electrode are connected by using different traces. However, this feature may be equally/similarly applied between the column A2 and the column B3 as well as between the column A2 and the column B4, and this feature may be equally/similarly applied between all columns A and all columns B included in the touch sensor as well as between the column A1 and the column B1 and between the column A1 and the column B2.

For reference, in the present invention, the configuration in which the touch signal detection electrode is disposed to adjacently correspond to the driving electrode or the driving electrode is disposed to adjacently correspond to the touch signal detection electrode may mean that the mutual capacitance may be generated between the adjacent driving electrode and the adjacent touch signal detection electrode.

In FIG. 38, the touch signal detection electrodes may be disposed on two lines based on the driving electrode in one row. On the respective two lines, the touch signal detection electrodes having the same number may be disposed at the left and right sides based on the driving electrode in one row. The touch signal detection electrodes disposed at the left and right sides based on the driving electrode in one row may constitute one channel. As a result, it is possible to solve the split effect of the result value of the capacitance signal caused by the LGM disturbance signal as described above with reference to FIG. 5. In general, the split of the result value of the capacitance signal is mainly caused when the configuration in which the identical touch signal detection electrodes are disposed based on the driving electrode and the configuration in which the different touch signal detection electrodes are disposed based on the driving electrode are mixed. Therefore, the case in which the two identical touch signal detection electrodes are disposed on the same line based on all of the driving electrodes may relatively further improve the split effect of the result value of the capacitance signal caused by the LGM disturbance signal.

In FIG. 38, the touch signal detection electrode (RX1 in the column B4), which is disposed on the first line so as to correspond to the driving electrode (TX1 in the column A2) in the first row, and the touch signal detection electrode (RX1 in the column B4), which is disposed on the first line so as to correspond to the driving electrode (TX5 in the column A2) in the second row, may be connected with one trace.

Likewise, the touch signal detection electrode (RX6 in the column B4), which is disposed on the second line so as to correspond to the driving electrode (TX1 in the column A2) in the first row, and the touch signal detection electrode (RX6 in the column B4), which is disposed on the second line so as to correspond to the driving electrode (TX5 in the column A2) in the second row, may be connected with one trace.

The driving electrodes included in the plurality of first electrode columns A1 to A4 may be connected with the different first traces. Therefore, it is possible to reduce the LGM disturbance signal and thus to improve touch sensitivity.

However, this is not only applied to the first electrode column A2, but also applied equally/similarly to the remaining first electrode column.

Referring to FIG. 38, when the driving signal is applied to the first driving electrode Tx1, Rx1 (hatched) disposed to be adjacent to the first driving electrode Tx1 may be used as the predetermined touch signal detection electrode that forms the mutual capacitance Cm with the first driving electrode Tx1, and Rx0 and Rx2 (reversely hatched) disposed to be spaced apart from the first driving electrode Tx1 at a predetermined distance may be defined as the other predetermined touch signal detection electrode used as the LGM disturbance signal detection electrode that does not form the mutual capacitance Cm with the first driving electrode Tx1.

Specifically, in FIG. 38, the other predetermined touch signal detection electrodes Rx0 and Rx2 used as the LGM disturbance signal detection electrodes are spaced apart from the first driving electrode Tx1 at a predetermined distance, thereby satisfying the condition in which the mutual capacitance Cm need not be formed and the other predetermined touch signal detection electrodes Rx0 and Rx2 are connected to the predetermined touch signal detection electrode Rx1 with the different channels. In this case, the connection with the different channels means that the channel having an electrode number, which is not coincident with an electrode number provided to the predetermined touch signal detection electrode Rx1, is connected.

The detection signal outputted from the predetermined touch signal detection electrodes Rx1 and Rx6 includes the noise information as well as the information about the amount of change in capacitance made by the touch of the object.

In contrast, the detection signal outputted from the other predetermined touch signal detection electrodes RX0 and RX2 used as the LGM disturbance signal detection electrodes includes only the noise information while including almost no information about the amount of change in capacitance made by the touch of the object.

Therefore, it is possible to obtain only the value of the amount of change in pure mutual capacitance by subtracting the signal value outputted from the other predetermined touch signal detection electrode used as the LGM disturbance signal detection electrode from the signal value outputted from the predetermined touch signal detection electrode.

In particular, in the case of FIG. 38, a sum of areas of the other predetermined touch signal detection electrodes used as the LGM disturbance signal detection electrodes may be almost equal to a sum of areas of the predetermined touch signal detection electrodes.

Because a magnitude of the detected signal is proportional to an area of the electrode, the above-mentioned configuration is to allow a magnitude of the LGM disturbance signal detected from the other predetermined touch signal detection electrode used as the LGM disturbance signal detection electrode and a magnitude of the LGM disturbance signal detected from the predetermined touch signal detection electrode to be equal to each other maximally, thereby completely removing the LGM disturbance signal during the process of removing the LGM disturbance signal.

Meanwhile, in the case of FIG. 38, in order to allow the other predetermined touch signal detection electrodes Rx0 and Rx2 used as the LGM disturbance signal detection electrodes to include almost no information about the amount of change in capacitance made by the touch of the object, any driving electrode or the predetermined touch signal detection electrode (e.g., RX1) disposed between the first driving electrode Tx1 and the other predetermined touch signal detection electrodes Rx0 and Rx2 used as the LGM disturbance signal detection electrodes may be set to be grounded (GND).

Figure 39:
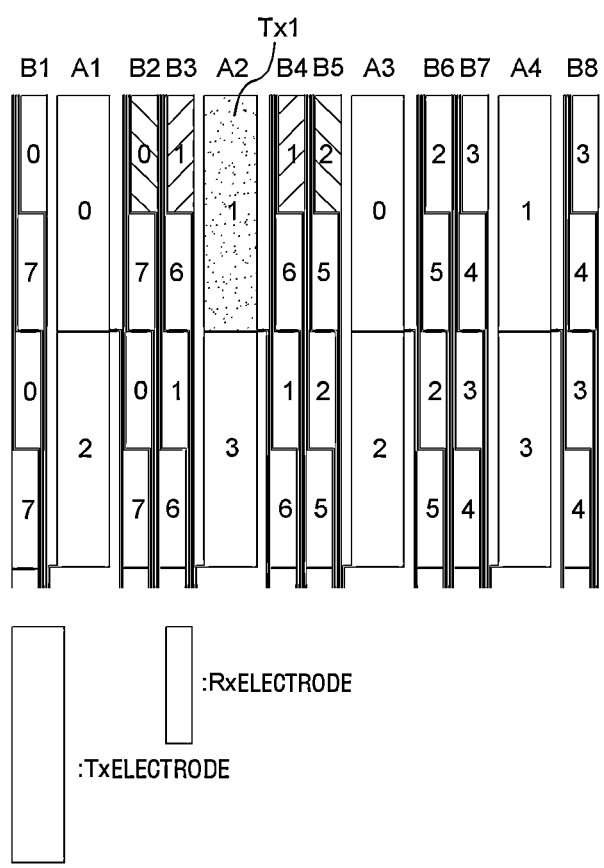

In comparison with the pattern in FIG. 38, FIG. 39 illustrates that the driving electrodes, which have the same number among the driving electrodes disposed in the same row, are repeatedly disposed. That is, any one of the driving electrodes disposed on the same row may constitute the same channel with another driving electrode. Like TX0-TX1-TX0-TX1, one driving electrode having a different number may be disposed between the driving electrodes having the same number. The driving electrodes having the same number may be electrically connected to each other to constitute one channel. Based on one row, the number of driving electrodes having the same number, which constitute one channel, may be ½ of the number of all driving electrodes that constitute one row. However, the scope of the present invention is not limited to the corresponding number.

The feature described above with reference to FIG. 38 may be equally/similarly applied to FIG. 39. However, in FIG. 39, the number of channels of the driving electrodes is decreased in comparison with FIG. 38.

Figure 40:
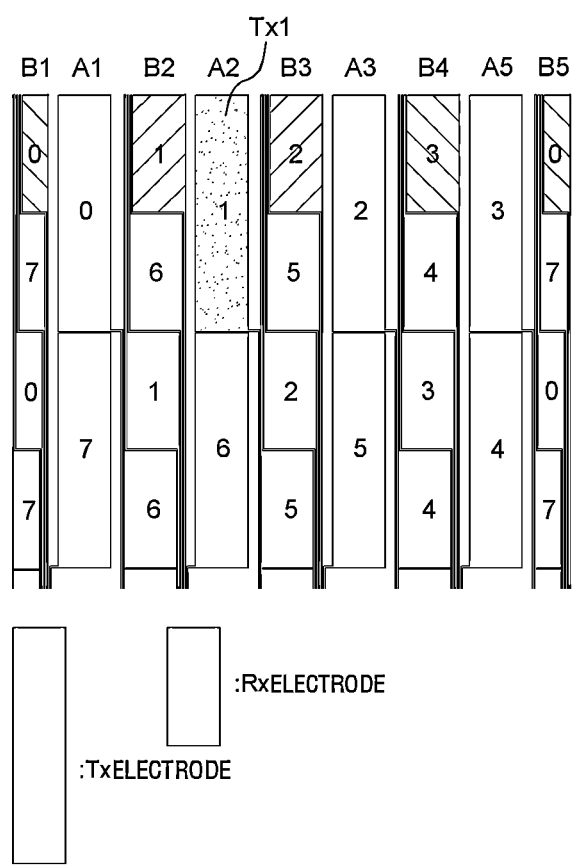

For example, in FIG. 40, at least two of the touch signal detection electrodes RX2 and RX5 in the column B3 are disposed to adjacently correspond to the driving electrode TX1 in the column A2, at least two of the other touch signal detection electrodes RX2 and RX5 are disposed to adjacently correspond to another driving electrode TX6, and then the electrodes, which have the same number among at least two electrodes and at least two of the other electrodes, are connected with one trace, such that the number of traces may be reduced in comparison with the structure in which all of the plurality of touch signal detection electrodes corresponding to one driving electrode are connected with the different traces.

In FIG. 40, the different touch signal detection electrodes may be disposed at the left and right sides in the same row based on each driving electrode.

Referring to FIG. 40, when the driving signal is applied to the first driving electrode Tx1, Rx1 and Rx2 (hatched) disposed to be adjacent to the first driving electrode Tx1 may be used as the predetermined touch signal detection electrode that forms the mutual capacitance Cm with the first driving electrode Tx1, and Rx0 and Rx3 (reversely hatched) disposed to be spaced apart from the first driving electrode Tx1 at a predetermined distance may be defined as the other predetermined touch signal detection electrode used as the LGM disturbance signal detection electrode that does not form the mutual capacitance Cm with the first driving electrode Tx1.

Specifically, in FIG. 40, the other predetermined touch signal detection electrodes Rx0 and Rx3 used as the LGM disturbance signal detection electrodes are spaced apart from the first driving electrode Tx1 at a predetermined distance, thereby satisfying the condition in which the mutual capacitance Cm need not be formed and the other predetermined touch signal detection electrodes Rx0 and Rx3 are connected to the predetermined touch signal detection electrodes Rx1 and Rx2 with the different channels. In this case, the connection with the different channels means that the channel having an electrode number, which is not coincident with electrode numbers provided to the predetermined touch signal detection electrodes Rx1 and Rx2, is connected.

The detection signal outputted from the predetermined touch signal detection electrodes Rx1 and Rx2 includes the noise information as well as the information about the amount of change in capacitance made by the touch of the object.

In contrast, the detection signal outputted from the other predetermined touch signal detection electrodes Rx0 and Rx3 used as the LGM disturbance signal detection electrodes includes only the noise information while including almost no information about the amount of change in capacitance made by the touch of the object.

Therefore, it is possible to obtain only the value of the amount of change in pure mutual capacitance by subtracting the signal value outputted from the other predetermined touch signal detection electrode used as the LGM disturbance signal detection electrode from the signal value outputted from the predetermined touch signal detection electrode.

In particular, in the case of FIG. 40, a sum of areas of the other predetermined touch signal detection electrodes used as the LGM disturbance signal detection electrodes may be almost equal to a sum of areas of the predetermined touch signal detection electrodes.

Because a magnitude of the detected signal is proportional to an area of the electrode, the above-mentioned configuration is to allow a magnitude of the LGM disturbance signal detected from the other predetermined touch signal detection electrode used as the LGM disturbance signal detection electrode and a magnitude of the LGM disturbance signal detected from the predetermined touch signal detection electrode to be equal to each other maximally, thereby completely removing the LGM disturbance signal during the process of removing the LGM disturbance signal.

Meanwhile, in the case of FIG. 40, in order to allow the other predetermined touch signal detection electrodes Rx0 and Rx3 used as the LGM disturbance signal detection electrodes to include almost no information about the amount of change in capacitance made by the touch of the object, any driving electrode or any touch signal detection electrode (e.g., RX1 and RX2) disposed between the first driving electrode Tx1 and the other predetermined touch signal detection electrodes Rx0 and Rx3 used as the LGM disturbance signal detection electrodes may be set to be grounded (GND).

In FIGS. 41 and 42, the electrode having a relatively large area and/or length is defined as the touch signal detection electrode, and the electrode having a relatively small area and/or length is defined as the driving electrode. However, the following principle may also be equally/similarly applied to the case in which the above-mentioned configuration is implemented in the opposite manner.

In FIG. 41, the plurality of driving electrodes may be disposed preferentially in the column direction, and the identical touch signal detection electrodes may be disposed at the left and right sides based on the driving electrode. Further, the touch signal detection electrodes, which are disposed at the left and right sides based on the first driving electrode, and the touch signal detection electrodes, which are disposed at the left and right sides based on the second driving electrode, may be disposed to be different from one another.

Referring to FIG. 41, when the driving signal is applied to the first driving electrode Tx1, Rx1 (hatched) disposed to be adjacent to the first driving electrode Tx1 may be used as the predetermined touch signal detection electrode that forms the mutual capacitance Cm with the first driving electrode Tx1, and Rx0 and Rx2 (reversely hatched) disposed to be spaced apart from the first driving electrode Tx1 at a predetermined distance may be defined as the other predetermined touch signal detection electrode used as the LGM disturbance signal detection electrode that does not form the mutual capacitance Cm with the first driving electrode Tx1.

Specifically, in FIG. 41, the other predetermined touch signal detection electrodes Rx0 and Rx2 used as the LGM disturbance signal detection electrodes are spaced apart from the first driving electrode Tx1 at a predetermined distance, thereby satisfying the condition in which the mutual capacitance Cm need not be formed and the other predetermined touch signal detection electrodes Rx0 and Rx2 are connected to the predetermined touch signal detection electrode Rx1 with the different channels. In this case, the connection with the different channels means that the channel having an electrode number, which is not coincident with an electrode number provided to the predetermined touch signal detection electrode Rx1, is connected.

The detection signal outputted from the predetermined touch signal detection electrodes Rx1 and Rx6 includes the noise information as well as the information about the amount of change in capacitance made by the touch of the object.

In contrast, the detection signal outputted from the other predetermined touch signal detection electrodes RX0 and RX2 used as the LGM disturbance signal detection electrodes includes only the noise information while including almost no information about the amount of change in capacitance made by the touch of the object.

Therefore, it is possible to obtain only the value of the amount of change in pure mutual capacitance by subtracting the signal value outputted from the other predetermined touch signal detection electrode used as the LGM disturbance signal detection electrode from the signal value outputted from the predetermined touch signal detection electrode.

In particular, in the case of FIG. 41, a sum of areas of the other predetermined touch signal detection electrodes used as the LGM disturbance signal detection electrodes may be almost equal to a sum of areas of the predetermined touch signal detection electrodes.

Because a magnitude of the detected signal is proportional to an area of the electrode, the above-mentioned configuration is to allow a magnitude of the LGM disturbance signal detected from the other predetermined touch signal detection electrode used as the LGM disturbance signal detection electrode and a magnitude of the LGM disturbance signal detected from the predetermined touch signal detection electrode to be equal to each other maximally, thereby completely removing the LGM disturbance signal during the process of removing the LGM disturbance signal.

Meanwhile, in the case of FIG. 41, in order to allow the other predetermined touch signal detection electrodes Rx0 and Rx2 used as the LGM disturbance signal detection electrodes to include almost no information about the amount of change in capacitance made by the touch of the object, any driving electrode or any touch signal detection electrode (e.g., RX1) disposed between the first driving electrode Tx1 and the other predetermined touch signal detection electrodes Rx0 and Rx2 used as the LGM disturbance signal detection electrodes may be set to be grounded (GND).

The principle described above with reference to FIG. 41 may be equally/similarly applied to FIG. 42. However, the touch signal detection electrodes RX0, which are disposed at the left and right sides based on the first driving electrode TX0 in the first region, and the touch signal detection electrodes RX1, which are disposed at the left and right sides based on the second driving electrode TX1, may be disposed to be different from one another. The touch signal detection electrodes RX0 and RX1, which are identical to the touch signal detection electrodes RX0 and RX1 disposed in the first region, may be disposed in the second region adjacent to the first region in the column direction. That is, the touch signal detection electrodes RX0, which are disposed at the left and right sides based on the first driving electrode TX2 in the second region, and the touch signal detection electrodes RX0, which are disposed at the left and right sides based on the first driving electrode TX0 in the first region, may be connected with one trace. The touch signal detection electrodes RX1, which are disposed at the left and right sides based on the second driving electrode TX3 in the second region, and the touch signal detection electrodes RX1, which are disposed at the left and right sides based on the second driving electrode TX1 in the first region, may be connected with one trace.

Referring to FIG. 42, when the driving signal is applied to the first driving electrode Tx1, Rx1 (hatched) disposed to be adjacent to the first driving electrode Tx1 may be used as the predetermined touch signal detection electrode that forms the mutual capacitance Cm with the first driving electrode Tx1, and Rx0 (reversely hatched) disposed to be spaced apart from the first driving electrode Tx1 at a predetermined distance may be defined as the other predetermined touch signal detection electrode used as the LGM disturbance signal detection electrode that does not form the mutual capacitance Cm with the first driving electrode Tx1.

Specifically, in FIG. 42, the other predetermined touch signal detection electrode Rx0 used as the LGM disturbance signal detection electrode is spaced apart from the first driving electrode Tx1 at a predetermined distance, thereby satisfying the condition in which the mutual capacitance Cm need not be formed and the other predetermined touch signal detection electrode Rx0 is connected to the predetermined touch signal detection electrode Rx1 with the different channels. In this case, the connection with the different channels means that the channel having an electrode number, which is not coincident with an electrode number provided to the predetermined touch signal detection electrode Rx1, is connected.

The detection signal outputted from the predetermined touch signal detection electrode Rx1 includes the noise information as well as the information about the amount of change in capacitance made by the touch of the object.

In contrast, the detection signal outputted from the other predetermined touch signal detection electrode RX0 used as the LGM disturbance signal detection electrode includes only the noise information while including almost no information about the amount of change in capacitance made by the touch of the object.

Therefore, it is possible to obtain only the value of the amount of change in pure mutual capacitance by subtracting the signal value outputted from the other predetermined touch signal detection electrode used as the LGM disturbance signal detection electrode from the signal value outputted from the predetermined touch signal detection electrode.

In particular, in the case of FIG. 42, a sum of areas of the other predetermined touch signal detection electrodes used as the LGM disturbance signal detection electrodes may be almost equal to a sum of areas of the predetermined touch signal detection electrodes.

Because a magnitude of the detected signal is proportional to an area of the electrode, the above-mentioned configuration is to allow a magnitude of the LGM disturbance signal detected from the other predetermined touch signal detection electrode used as the LGM disturbance signal detection electrode and a magnitude of the LGM disturbance signal detected from the predetermined touch signal detection electrode to be equal to each other maximally, thereby completely removing the LGM disturbance signal during the process of removing the LGM disturbance signal.

Meanwhile, in the case of FIG. 42, in order to allow the other predetermined touch signal detection electrode Rx0 used as the LGM disturbance signal detection electrode to include almost no information about the amount of change in capacitance made by the touch of the object, any driving electrode or any touch signal detection electrode (e.g., RX1) disposed between the first driving electrode Tx1 and the other predetermined touch signal detection electrode Rx0 used as the LGM disturbance signal detection electrode may be set to be grounded (GND).

Figure 43:
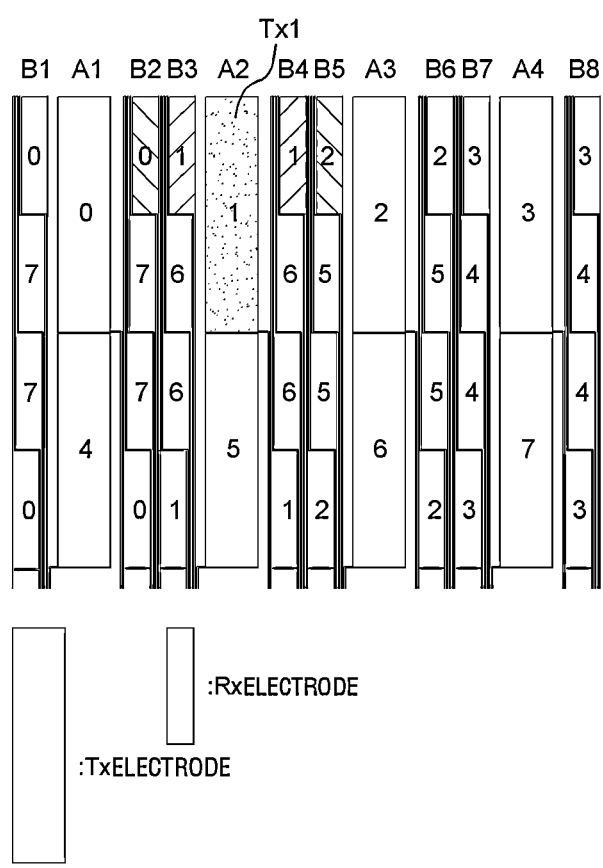

The principle described above with reference to FIG. 38 may be equally/similarly applied to FIG. 43. However, in FIG. 38, the electrodes, which have the same number as the RX electrodes RX1 and RX6 disposed in the column B3 and the column B4 based on any driving electrode TX1, are disposed in the same order (RX1, RX6) in the column B3 and the column B4 based on the driving electrode TX5 in the next row. However, in FIG. 43, the electrodes, which have the same number as the RX electrodes RX1 and RX6 disposed in the first order in the column B3 and the column B4 based on any driving electrode TX1, may be disposed in the order (RX6, RX1) opposite to the first order based on the driving electrode TX5 in the next row. That is, the arrangement is made like RX1-RX6-RX1-RX6 in FIG. 38, but the arrangement is made like RX1-RX6-RX6-RX1 in FIG. 43.

In other words, the touch signal detection electrode (RX1 in the column B4), which is disposed on the first line so as to correspond to the driving electrode (TX1 in the column A2) in the first row, and the touch signal detection electrode (RX1 in the column B4), which is disposed on the second line so as to correspond to the driving electrode (TX3 in the column A2) in the second row, may be connected with one trace.

Likewise, the touch signal detection electrode (RX6 in the column B4), which is disposed on the second line so as to correspond to the driving electrode (TX1 in the column A2) in the first row, and the touch signal detection electrode (RX6 in the column B4), which is disposed on the first line so as to correspond to the driving electrode (TX3 in the column A2) in the second row, may be connected with one trace.

That is, the second electrodes disposed to be symmetrical based on the row direction may be connected with one trace.

Figure 44:
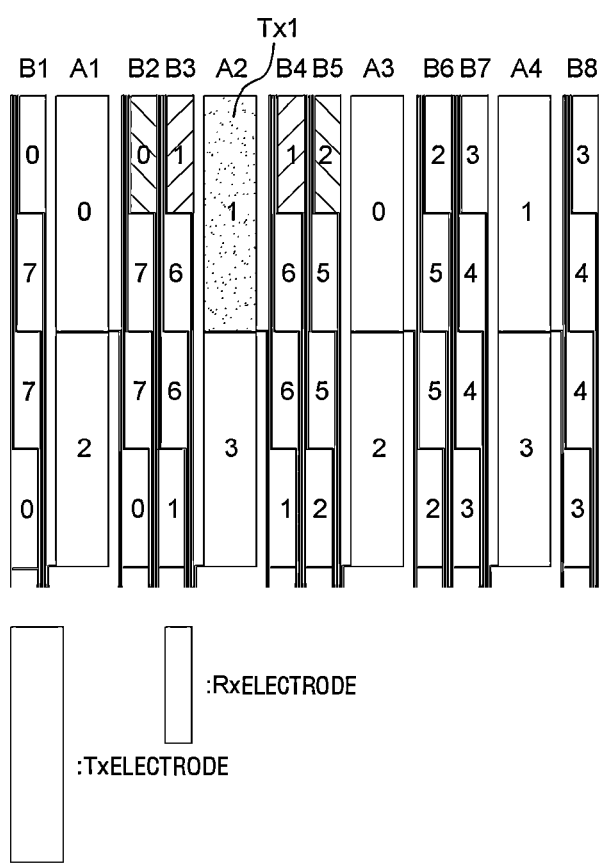

The principle described above with reference to FIG. 39 may be equally/similarly applied to FIG. 44. However, in FIG. 39, the electrodes, which have the same number as the RX electrodes RX1 and RX6 disposed in the column B3 and the column B4 based on any driving electrode TX1, are disposed in the same order (RX1, RX6) in the column B3 and the column B4 based on the driving electrode TX3 in the next row. However, in FIG. 44, the electrodes, which have the same number as the RX electrodes RX1 and RX6 disposed in the first order in the column B3 and the column B4 based on any driving electrode TX1, may be disposed in the order (RX6, RX1) opposite to the first order based on the driving electrode TX3 in the next row. That is, the arrangement is made like RX1-RX6-RX1-RX6 in FIG. 39, but the arrangement is made like RX1-RX6-RX6-RX1 in FIG. 44.

In other words, the touch signal detection electrode (RX1 in the column B4), which is disposed on the first line so as to correspond to the driving electrode (TX1 in the column A2) in the first row, and the touch signal detection electrode (RX1 in the column B4), which is disposed on the second line so as to correspond to the driving electrode (TX3 in the column A2) in the second row, may be connected with one trace.

Likewise, the touch signal detection electrode (RX6 in the column B4), which is disposed on the second line so as to correspond to the driving electrode (TX1 in the column A2) in the first row, and the touch signal detection electrode (RX6 in the column B4), which is disposed on the first line so as to correspond to the driving electrode (TX3 in the column A2) in the second row, may be connected with one trace.

That is, the second electrodes disposed to be symmetrical based on the row direction may be connected with one trace.

Figure 45A:
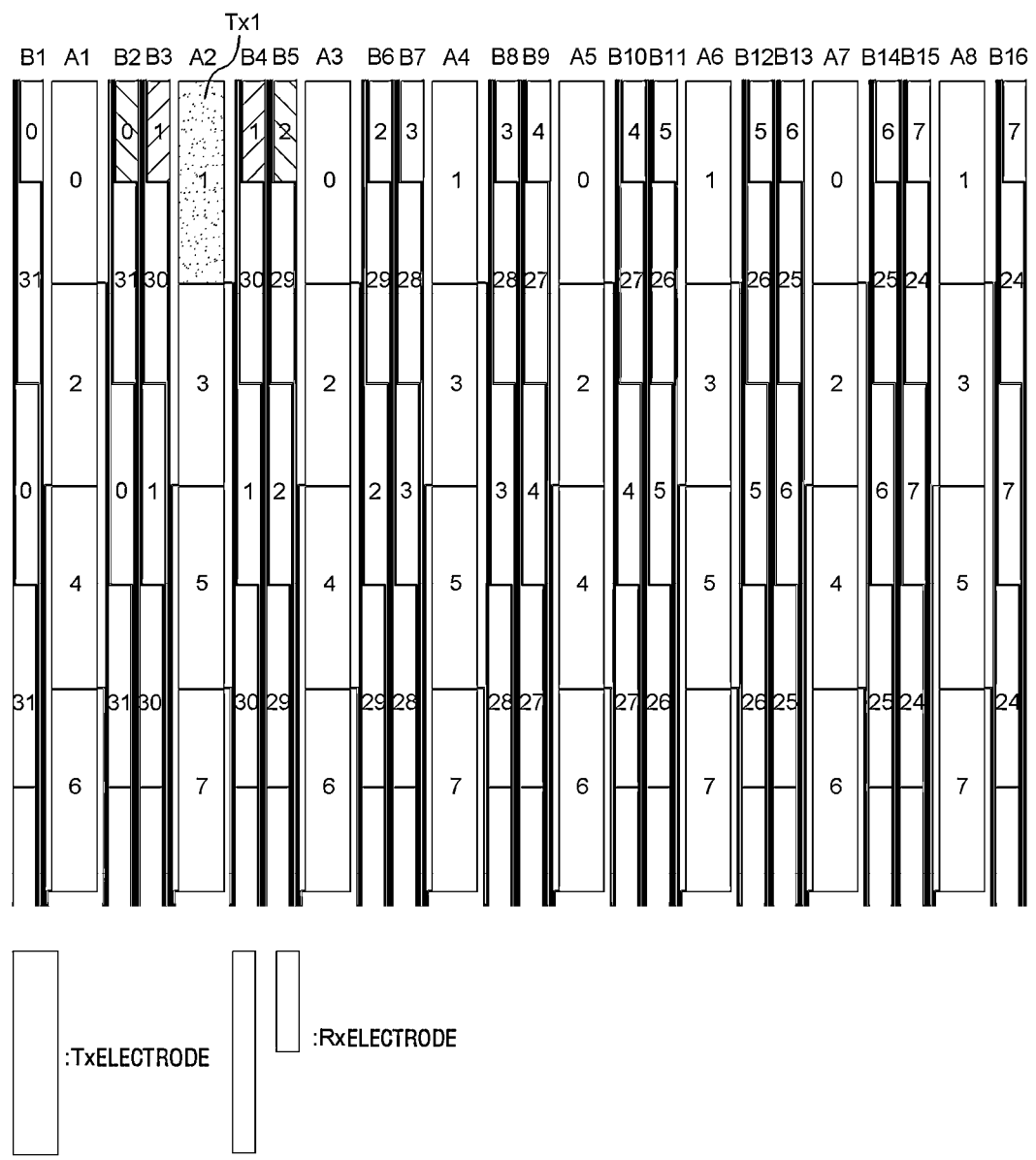
Figure 45B:
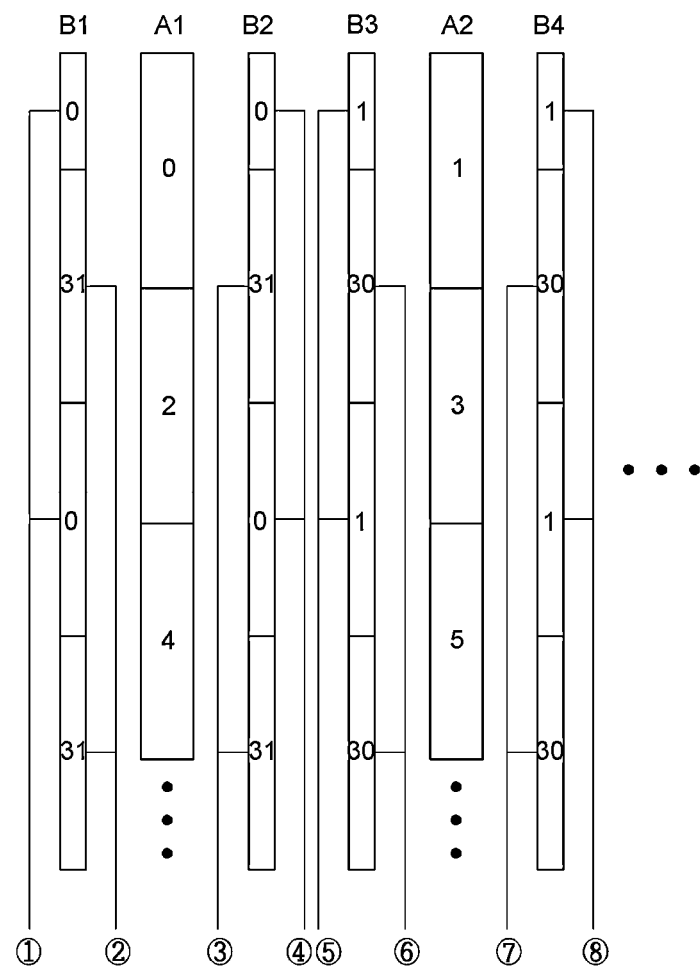

FIG. 45A is a view illustrating an exemplary embodiment in which a size of the RX electrode illustrated in FIG. 44 is modified, and FIG. 45B is a view illustrating the trace for connecting some of the electrodes and the corresponding electrodes in FIG. 45A.

The principle described above with reference to FIG. 44 may be equally/similarly applied to FIGS. 45A to 45B. However, in comparison with FIG. 44 in which the column B1 is disposed like RX0-RX7-RX7-RX0, the column B1 may be disposed like RX0-RX31-RX0 in FIGS. 45A to 45B. That is, one RX31, which corresponds to two RX7 in FIG. 44, is disposed in FIGS. 45A to 45B. In this case, RX0 and RX31 are disposed at one side based on the driving electrode TX0 in the column A1, and RX31 and RX0 are disposed at one side based on the driving electrode TX2 in the next row with respect to the column A1.

FIGS. 45A to 45B illustrates that a length of the touch signal detection electrode is equal to a length of the driving electrode, and an area of the touch signal detection electrode is half an area of the driving electrode, but the scope of the present invention is not limited thereto.

FIGS. 45A to 45B illustrates that the touch signal detection electrode and the driving electrode are disposed so as not to be parallel to each other. That is, a center point of the touch signal detection electrode and a center point of the driving electrode are not positioned on the same line and misaligned.

That is, referring to FIG. 45B, the touch signal detection electrodes (RX1 and RX30 in the column B4) may be disposed to be adjacent so as to correspond to the driving electrode (TX1 in the column A2) in the first row, and the touch signal detection electrodes (RX30 and RX1 in the column B4) may be disposed to be adjacent so as to correspond to the driving electrode (TX3 in the column A2) in the second row. Further, likewise, the touch signal detection electrodes (RX30 and RX1 in the column B4) may be disposed to be adjacent so as to correspond to the driving electrode (TX3 in the column A2) in the second row, and the touch signal detection electrodes (RX1 and RX30 in the column B4) may be disposed to be adjacent so as to correspond to the driving electrode (TX5 in the column A2) in the third row. That is, the respective driving electrodes and the respective touch signal detection electrodes disposed adjacent to the respective driving electrodes may form the mutual capacitance. Further, RX1 in the column B4 corresponding to TX1 in the column A2 and RX1 in the column B4 corresponding to TX3 in the column A2 may be connected with one trace, and RX30 in the column B4 corresponding to TX3 in the column A2 and RX30 in the column B4 corresponding to TX5 in the column A2 may be connected with one trace.

However, this feature may be equally/similarly applied between the column A2 and the column B3 as well as between the column A2 and the column B4, and this feature may be equally/similarly applied between all columns A and all columns B included in the touch sensor as well as between the column A1 and the column B1 and between the column A1 and the column B2.

Figure 46:
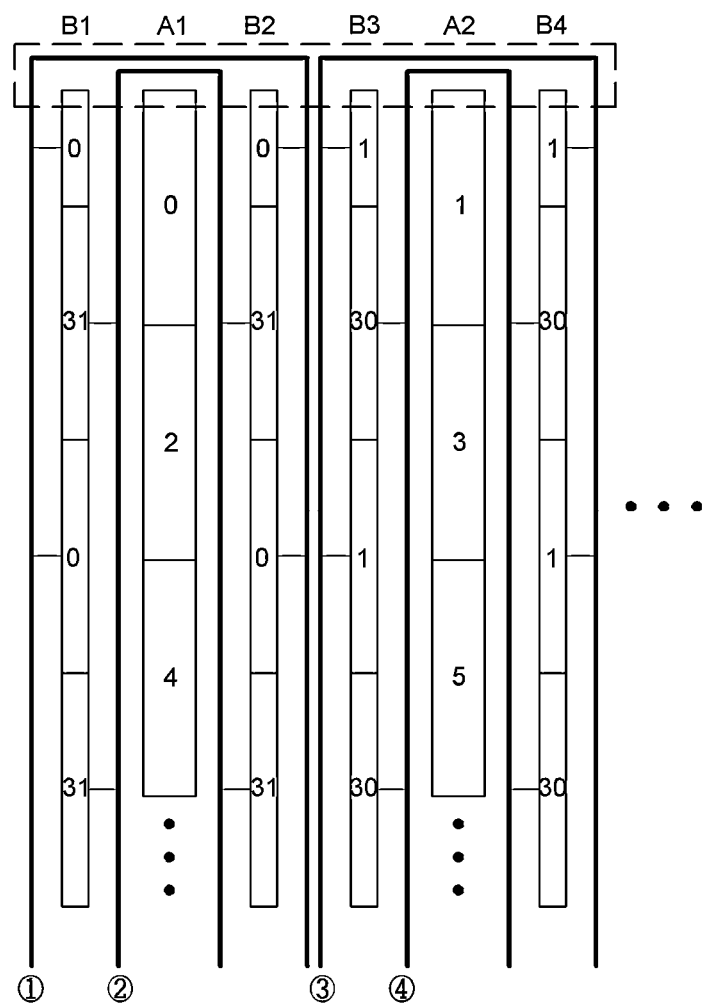

FIG. 46 illustrates an exemplary embodiment in which the electrode connection method is partially modified based on FIGS. 45A to 45B.

The principle described above with reference to FIGS. 45A to 45B may be equally/similarly applied to FIG. 46.

In the case of FIG. 46, the touch signal detection electrodes (RX1 and RX30 in the column B4) may be disposed to be adjacent so as to correspond to the driving electrode (TX1 in the column A2) in the first row, and the touch signal detection electrodes (RX30 and RX1 in the column B4) may be disposed to be adjacent so as to correspond to the driving electrode (TX3 in the column A2) in the second row. Further, likewise, the touch signal detection electrodes (RX30 and RX1 in the column B4) may be disposed to be adjacent so as to correspond to the driving electrode (TX3 in the column A2) in the second row, and the touch signal detection electrodes (RX1 and RX30 in the column B4) may be disposed to be adjacent so as to correspond to the driving electrode (TX5 in the column A2) in the third row.

The touch signal detection electrodes (RX1 and RX30 in the column B3) may be disposed to be adjacent so as to correspond to the driving electrode (TX1 in the column A2) in the first row, and the touch signal detection electrodes (RX30 and RX1 in the column B3) may be disposed to be adjacent so as to correspond to the driving electrode (TX3 in the column A2) in the second row. Further, likewise, the touch signal detection electrodes (RX30 and RX1 in the column B3) may be disposed to be adjacent so as to correspond to the driving electrode (TX3 in the column A2) in the second row, and the touch signal detection electrodes (RX1 and RX30 in the column B3) may be disposed to be adjacent so as to correspond to the driving electrode (TX5 in the column A2) in the third row. That is, the respective driving electrodes and the respective touch signal detection electrodes disposed adjacent to the respective driving electrodes may form the mutual capacitance.

It can be seen that the number ③ trace, which connects RX1 and RX1 in the column B3, also connects RX1 and RX1 in the column B4, and the number ④ trace, which connects RX30 and RX30 in the column B3, also connects RX30 and RX30 in the column B4.

Referring to FIG. 45B, it can be seen that the RX electrodes are connected by the eight traces.

That is, it can be seen that the number ① trace for connecting RX0 and RX0 and the number ② trace for connecting RX31 and RX31 are disposed in the column B1, the number ③ trace and the number ④ trace are disposed in the column B2, the number 5 trace and the number 6 race are disposed in the column B3, and the number 7 trace and the number 8 trace are disposed in the column B4, likewise.

In comparison with this, in the case of FIG. 46, it can be seen that the number ① trace, which connects RX0 and RX0 in the column B1, also connects RX0 and RX0 in the column B2, and the number ② trace, which connects RX31 and RX31 in the column B1, also connects RX31 and RX31 in the column B2. Further, likewise, it can be seen that a number ③ trace, which connects RX1 and RX1 in the column B3, also connects RX1 and RX1 in the column B4, and a number ④ trace, which connects RX30 and RX30 in the column B3, also connects RX30 and RX30 in the column B4.

That is, according to FIG. 46, it can be seen that the RX electrodes, which constitute the same channel, are connected with one trace in the horizontal direction as well as the vertical direction, such that the number of traces for connecting the RX electrodes is reduced by half in comparison with FIG. 45B.

The trace for connecting the RX electrodes disposed in the first column is bypassed upward from the electrodes that constitute the touch sensor, such that the RX electrodes disposed in the first column may be connected to the identical RX electrodes disposed in the second column by using the trace. In particular, the trace may be bypassed upward (the dotted line region) from the TX electrodes and the RX electrodes disposed in the first row of the touch sensor. As a result, a part of the trace may be disposed above the TX electrodes and the RX electrodes disposed in the first row.

When a part of the trace is disposed above the RX electrodes, the corresponding trace may enter an upper portion of a bezel part (not illustrated) of the touch input device. The bezel part (not illustrated) refers to an outer peripheral rim region of a region in which an image of the touch input device is displayed. The bezel part may include an upper portion, a lower portion, a left portion, and a right portion based on the region in which the image of the touch input device is displayed. The trace disposed above the electrode may be disposed on the upper portion of the bezel part.

The trace disposed above the RX electrodes is configured as a horizontal trace, and the horizontal trace generally causes a problem with visibility, which makes it difficult to manufacture a product. However, as illustrated in FIG. 46, in a case in which only a space having a small size of about 50 µm is allocated to the horizontal trace, the horizontal trace does not affect the visibility. In particular, in the case in which the horizontal trace is disposed on the upper portion of the bezel part, the visibility is not influenced by the horizontal trace, and the number of traces may be reduced.

FIG. 46 illustrates that a part of the number ① trace is disposed at the left side of the electrodes in the column B1 and the right side of the electrodes in the column B2. However, a part of the number ② trace may be disposed at the right side of the electrodes in the column B1 and the left side of the electrodes in the column B2. As a result, the number ① trace is disposed outside the number ② trace. This configuration may be equally/similarly applied to the number ③ trace and the number ④ trace.

Figure 47:
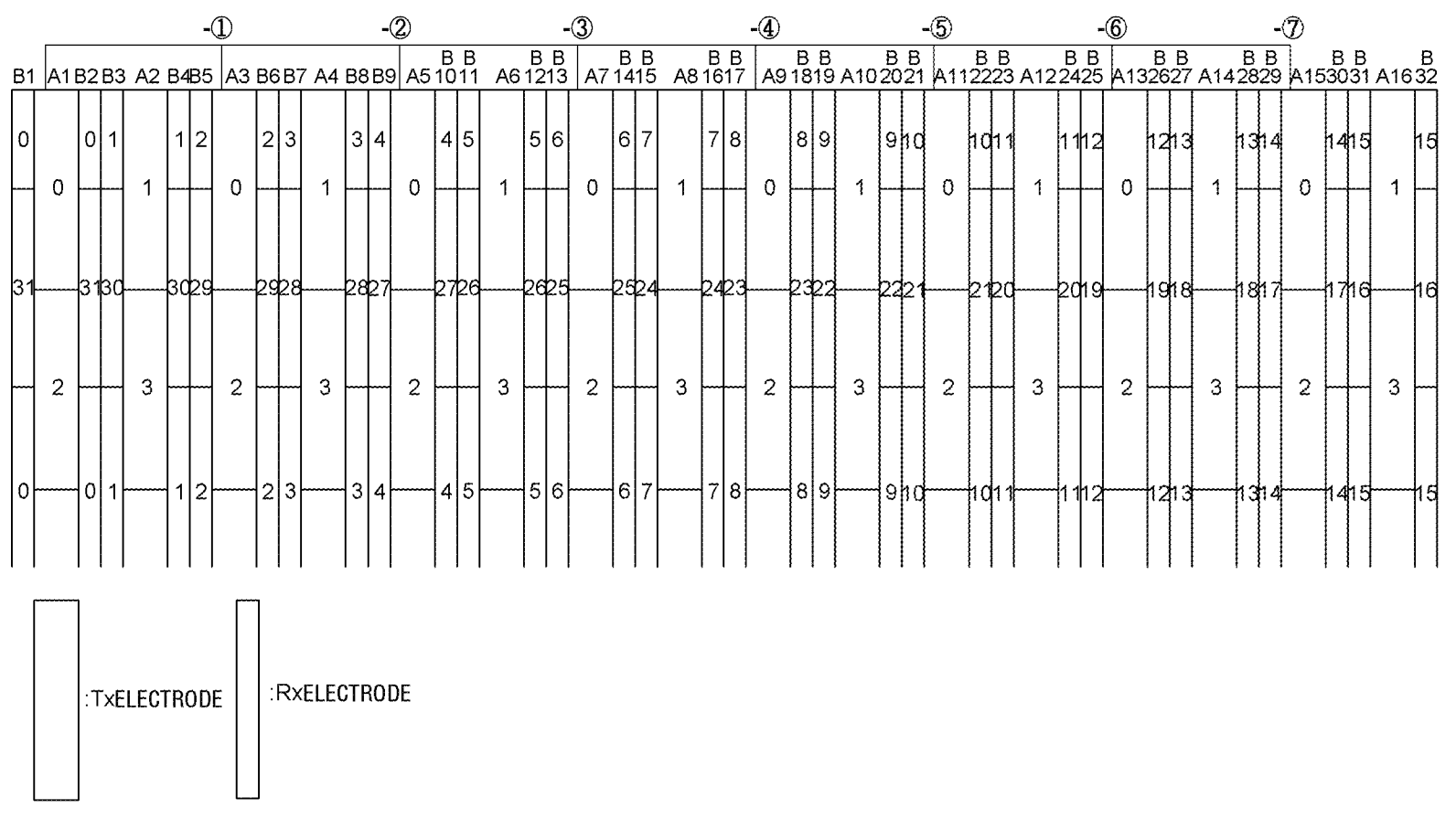

FIG. 47 illustrates an exemplary embodiment in which the electrode connection method is partially modified based on FIG. 45.

The principle described above with reference to FIG. 45 may be equally/similarly applied to FIG. 47.

It may be understood that while FIG. 46 illustrates the connection of the RX electrodes that constitute the same channel, FIG. 47 illustrates that the TX electrodes, which constitute the same channel, are connected with the horizontal trace to reduce the number of traces.

As illustrated in FIG. 47, when the driving electrodes TX0, which constitute the same channel, are connected with one trace, the number of traces is decreased one by one for each column in which TX0 is disposed.

In particular, the driving electrodes TX0, which constitute the same channel among the driving electrodes disposed in the first row of the touch sensor, are connected with one trace, such that the trace may be disposed at an upper side of the touch sensor, as illustrated in FIG. 47. In other words, the electrodes TX0, which constitute the same channel in the first row, may be connected with one trace at the upper side thereof.

According to FIG. 47, only one trace for connecting any TX electrodes (e.g., TX0) constituting the same channel may be disposed, and other traces for connecting other TX electrodes (e.g., TX1) constituting the same channel cannot be disposed.

FIG. 47 illustrates that the electrodes TX0 are connected with one trace, but according to another exemplary embodiment, one trace may connect the electrodes TX1.

When the trace is disposed on the upper portion of the first row, the corresponding trace may enter an upper portion of a bezel part (not illustrated) of the touch input device. The bezel part (not illustrated) refers to an outer peripheral rim region of a region in which an image of the touch input device is displayed. The bezel part may include an upper portion, a lower portion, a left portion, and a right portion based on the region in which the image of the touch input device is displayed. The trace disposed above the electrode may be disposed on the upper portion of the bezel part.

The corresponding trace is configured as a horizontal trace, and the horizontal trace generally causes a problem with visibility, which makes it difficult to manufacture a product. However, as illustrated in FIG. 47, in a case in which only a space having a small size of about 50 µm is allocated to the horizontal trace, the horizontal trace does not affect the visibility. In particular, in the case in which the horizontal trace is disposed on the upper portion of the bezel part, the visibility is not influenced by the horizontal trace, and the number of traces may be reduced.

Figure 48:
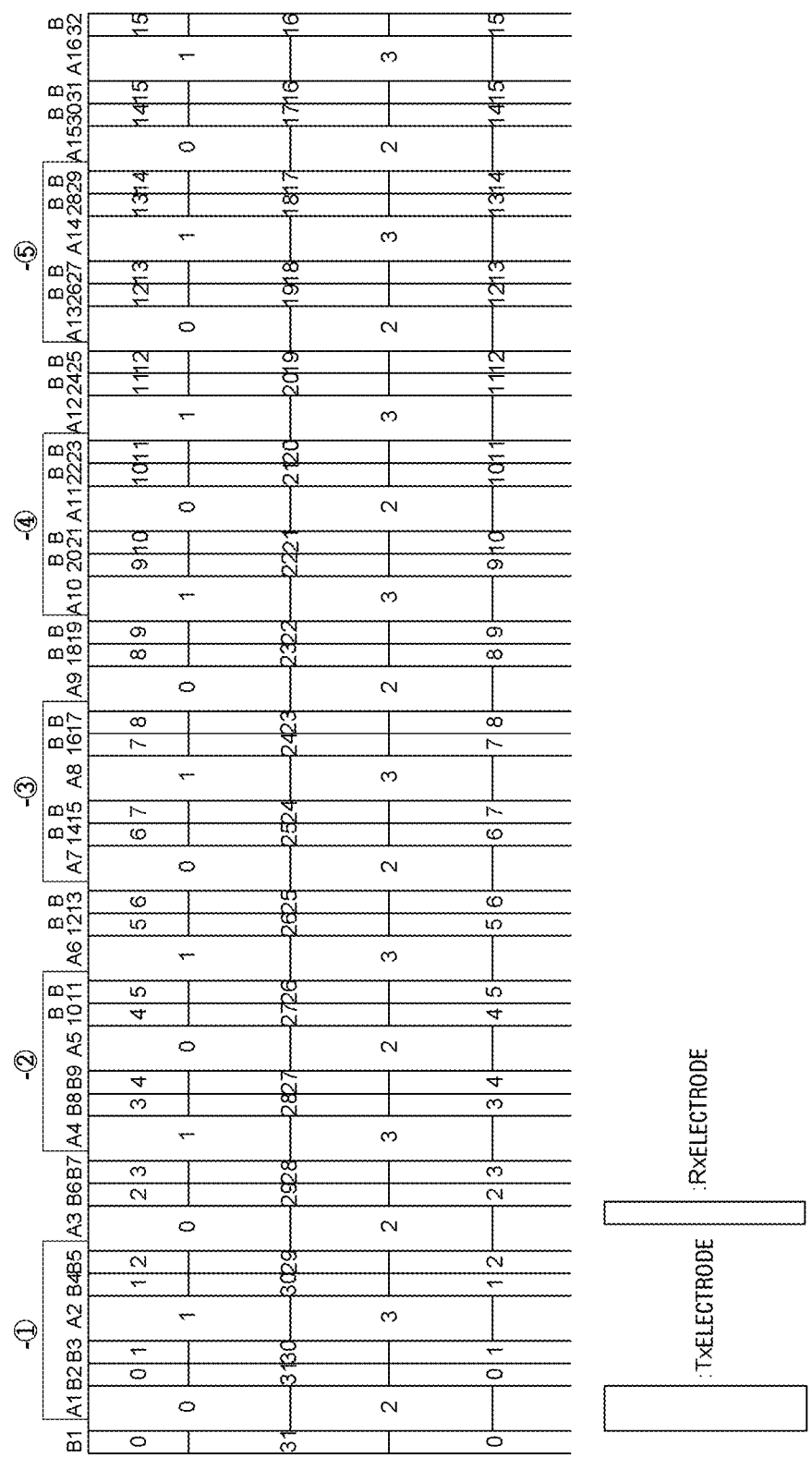

FIG. 48 illustrates an exemplary embodiment in which the electrode connection method is partially modified based on FIG. 45.

The principle described above with reference to FIG. 45 may be equally/similarly applied to FIG. 48.

It may be understood that FIG. 48 illustrates that the TX electrodes, which constitute the same channel as illustrated in FIG. 47, are connected with the horizontal trace, such that the number of traces is reduced. However, all of the TX electrodes TX0, which constitute the A channel, are not connected with one trace, and some of the electrodes TX0, which constitute the A channel, may be connected with one trace. In addition, some of the TX electrodes TX1, which constitute the B channel different from the A channel, may be connected by using one trace.

It can be seen that while FIG. 47 illustrates that all of the identical electrodes TX0 are connected with one trace such that the number of traces is reduced by 7 (−7), FIG. 48 illustrates that only some of the identical electrodes TX0 are connected with one trace such that the number of traces is reduced by 5 (−5).

In comparison with FIG. 47, the feature illustrated in FIG. 48 has an advantage of reducing the number of trances while relatively reducing resistance of the electrode pattern. For example, in the case of FIG. 47, a length of one trace is increased because all of the electrodes TX0 are connected with one trace. As such, during the process of connecting TX0 in the column A1 and TX0 disposed in the column A15, a resistance value of TX0 disposed in the column A15 becomes significantly greater than R1 when R1 is a resistance value of TX0 in column A1. This is caused because a length between the first TX0 and the last TX0 is increased. In comparison with this, in the case of FIG. 48, TX0 in the column A1 and TX0 in the column A3 are connected with one trace, and a length of the corresponding trace is shorter than the length in FIG. 47, such that the resistance value of TX0 in the column A3 is smaller than the resistance value in FIG. 47.

Consequently, there is an advantage of relatively reducing resistance of the electrode pattern even though an effect of reducing the number of traces relatively deteriorates in comparison with FIG. 47.

In particular, some of the driving electrodes TX0, which constitute the same channel among the driving electrodes disposed in the first row of the touch sensor, are connected with one trace, such that the trace may be disposed at the upper side of the touch sensor, as illustrated in FIG. 47. In other words, some of the electrodes TX0, which constitute the same channel in the first row, may be connected with one trace at the upper side thereof.

Some of the electrodes TX0 are connected with one A trace, some of the electrodes TX1 are connected with one B trace, and then some of the electrodes TX0 are connected with another A trace, such that the driving electrodes disposed in the first row are connected.

FIG. 48 illustrates that the two TX electrodes are connected with one trace, but the scope of the present invention is not limited thereto.

When the trace is disposed on the upper portion of the first row, the corresponding trace may enter an upper portion of a bezel part (not illustrated) of the touch input device.

The bezel part (not illustrated) refers to an outer peripheral rim region of a region in which an image of the touch input device is displayed. The bezel part may include an upper portion, a lower portion, a left portion, and a right portion based on the region in which the image of the touch input device is displayed. The trace disposed above the electrode may be disposed on the upper portion of the bezel part.

The corresponding trace is configured as a horizontal trace, and the horizontal trace generally causes a problem with visibility, which makes it difficult to manufacture a product. However, as illustrated in FIG. 48, in a case in which only a space having a small size of about 50 µm is allocated to the horizontal trace, the horizontal trace does not affect the visibility. In particular, in the case in which the horizontal trace is disposed on the upper portion of the bezel part, the visibility is not influenced by the horizontal trace, and the number of traces may be reduced.

The examples described above with reference to FIGS. 38 to 48 may be not only applied to the exemplified specific electrode or the exemplified specific electrode column, but also applied equally/similarly to all of the electrodes and all of the electrode columns in the touch sensor panel.

The features, structures, effects, and the like described above in the exemplary embodiments are included in one exemplary embodiment of the present invention, but the present invention is not necessarily limited to one exemplary embodiment. Furthermore, the features, structures, effects, and the like described in the respective exemplary embodiments may be combined or modified and then carried out by those skilled in the art as other exemplary embodiments. It should be interpreted that the combination and modification are included in the scope of the present invention.

The exemplary embodiments have been described above, but the exemplary embodiments are just illustrative and not intended to limit the present invention. It can be appreciated by those skilled in the art that various modifications and alterations, which are not described above, may be made without departing from the intrinsic features of the present invention. For example, the respective constituent elements specifically described in the exemplary embodiments may be modified and then carried out. Further, it should be interpreted that the differences related to the modifications and alterations are included in the scope of the present invention defined by the appended claims.

What is claimed is:

1. A touch input device having a touch surface, the touch input device comprising:
   a touch sensor comprising a plurality of electrodes; and
   a touch detection unit configured to apply a driving signal to at least some of the plurality of electrodes of the touch sensor, configured to detect a touch-position-related signal related to a touch position of an object inputted to the touch surface from at least some of the plurality of electrodes of the touch sensor, and configured to detect a low ground mass (LGM) LGM-disturbance signal-related signal related to an LGM disturbance signal generated from the touch surface from at least some of the plurality of electrodes of the touch sensor,
   wherein the touch sensor comprises a plurality of driving electrodes and a plurality of touch signal detection electrodes,
   wherein the touch detection unit detects the touch-position-related signal related to the touch position of the object inputted to the touch surface from at least one touch signal detection electrode, among the plurality of touch signal detection electrodes, which is disposed to be adjacent to one driving electrode of the plurality of driving electrodes, the one driving electrode which the driving signal is applied, and
   wherein the touch detection unit detects the LGM-disturbance-signal-related signal from at least another touch signal detection electrode, among the plurality of touch signal detection electrodes, which is disposed to be spaced apart from the one driving electrode at a predetermined distance.

2. The touch input device of claim 1, wherein the touch detection unit is configured to inhibit the LGM-disturbance-signal-related signal from the touch-position-related signal,
wherein the touch detection unit converts the touch-position-related signal into a digital signal and outputs the digital signal,
wherein the touch detection unit converts the LGM-disturbance-signal-related signal into a digital signal and outputs the digital signal, and
wherein the touch detection unit inhibits the LGM-disturbance-signal-related signal, which is converted into the digital signal, from the touch-position-related signal, which is converted into the digital signal.

3. The touch input device of claim 1, wherein the touch-position-related signal comprises information about capacitance that reduces the mutual capacitance generated by at least one of coupling between the object and at least one driving electrode and coupling between the object and at least one touch signal detection electrode, and the LGM-disturbance-signal related signal comprises information about capacitance that reduces the mutual capacitance generated by at least one of coupling between the object and at least one driving electrode and coupling between the object and at least another touch signal detection electrode.

4. The touch input device of claim 1,
wherein the at least another touch signal detection electrode is connected to a channel different from a channel to which the at least one touch signal detection electrode is connected, and
wherein at least one of the driving electrodes disposed between at least one touch signal detection electrode and at least another touch signal detection electrode is set to be grounded, or at least one touch signal detection electrode is set to be grounded.

5. The touch input device of claim 1, wherein a sum of an area of at least another touch signal detection electrode is equal to a sum of an area of at least one touch signal detection electrode.

6. A touch input device having a touch surface, the touch input device comprising:
a touch sensor comprising a plurality of electrodes; and
a touch detection unit configured to apply a driving signal to at least some of the plurality of electrodes of the touch sensor, configured to detect a touch-position-related signal related to a touch position of an object inputted to the touch surface from at least some of the plurality of electrodes of the touch sensor, and configured to detect a low ground mass (LGM)-disturbance signal-related signal related to an LGM disturbance signal generated from the touch surface from at least some of the plurality of electrodes of the touch sensor,
wherein the touch sensor comprises a plurality of driving electrodes, a plurality of touch signal detection electrodes, and a plurality of LGM disturbance signal detection electrodes,
wherein the touch detection unit detects the touch-position-related signal related to the touch position of the object inputted to the touch surface from at least one touch signal detection electrode, among the plurality of touch signal detection electrodes, which is disposed to be adjacent to at least one driving electrode to which a driving signal is applied among the plurality of driving electrodes,
wherein the touch detection unit detects the LGM-disturbance-signal-related signal from at least one LGM disturbance signal detection electrode, among the plurality of LGM disturbance signal detection electrodes, which is disposed to be spaced apart from the at least one driving electrode at a predetermined distance, and
wherein each of the plurality of LGM disturbance signal detection electrodes is disposed in each of the plurality of touch signal detection electrodes, and wherein a center of each of the plurality of LGM disturbance signal detection electrodes and a center of each of the plurality of touch signal detection electrodes are coincident.

7. The touch input device of claim 6, wherein the touch-position-related signal comprises information about capacitance that reduces the mutual capacitance generated by at least one of coupling between the object and at least one driving electrode and coupling between the object and at least one touch signal detection electrode, and the LGM-disturbance-signal-related signal comprises information about capacitance that reduces the mutual capacitance generated by at least one of coupling between the object and at least one driving electrode and coupling between the object and at least one LGM disturbance signal detection electrode.

8. The touch input device of claim 6, wherein a sum of areas of the plurality of LGM disturbance signal detection electrodes is equal to a sum of areas of the plurality of touch signal detection electrodes.

9. The touch input device of claim 6,
wherein at least one touch signal detection electrode is disposed between at least one driving electrode and at least one LGM disturbance signal detection electrode, and at least one touch signal detection electrode is set to be grounded.

10. The touch input device of claim 6,
wherein the touch detection unit is configured to inhibit the LGM-disturbance-signal-related signal from the touch-position-related signal,
wherein the touch detection unit converts the touch-position-related signal into a digital signal and outputs the digital signal,
wherein the touch detection unit converts the LGM-disturbance-signal-related signal into a digital signal and outputs the digital signal, and
wherein the touch detection unit inhibits the LGM-disturbance-signal-related signal, which is converted into the digital signal, from the touch-position-related signal, which is converted into the digital signal.

11. A touch input device having a touch surface, the touch input device comprising:
a touch sensor comprising a plurality of electrodes;
a touch detection unit configured to apply a driving signal to at least some of the plurality of electrodes of the touch sensor, configured to detect a touch-position-related signal related to a touch position of an object inputted to the touch surface from at least some of the plurality of electrodes of the touch sensor, and configured to detect a low ground mass (LGM)-disturbance-signal-related signal related to an LGM disturbance signal generated from the touch surface from at least some of the plurality of electrodes of the touch sensor,
wherein the touch sensor comprises a plurality of driving electrodes, a plurality of touch signal detection electrodes, and a plurality of LGM disturbance signal detection electrodes,
wherein the touch detection unit detects the touch-position-related signal related to the touch position of the object inputted to the touch surface from at least one touch signal detection electrode, among the plurality of touch signal detection electrodes, which is disposed to be adjacent to at least one driving electrode to which a driving signal is applied among the plurality of driving electrodes, and wherein the touch detection unit detects the LGM-disturbance-signal-related signal from at least one LGM disturbance signal detection electrode, among the plurality of LGM disturbance signal detection electrodes, which is disposed to be spaced apart from the at least one driving electrode at a predetermined distance, wherein the plurality of touch signal detection electrodes and the plurality of LGM disturbance signal detection electrodes are disposed on a layer different from a layer on which the plurality of driving electrodes is disposed, and a first region in which the plurality of driving electrodes overlaps the plurality of touch signal detection electrodes is larger than a second region in which the plurality of driving electrodes overlaps the plurality of LGM disturbance signal detection electrodes.

12. The touch input device of claim 11, wherein each of the plurality of LGM disturbance signal detection electrodes is disposed in each of the plurality of touch signal detection electrodes, and wherein a center of each of the plurality of LGM disturbance signal detection electrodes and a center of each of the plurality of touch signal detection electrodes are coincident.

13. The touch input device of claim 11, wherein a sum of areas of the plurality of LGM disturbance signal detection electrodes is equal to a sum of areas of the plurality of touch signal detection electrodes, and wherein a width of the first region is larger than a width of the second region.

14. The touch input device of claim 11,
wherein the touch detection unit is configured to inhibit the LGM-disturbance-signal-related signal from the touch-position-related signal,
wherein the touch detection unit converts the touch-position-related signal into a digital signal and outputs the digital signal,
wherein the touch detection unit converts the LGM-disturbance-signal-related signal into a digital signal and outputs the digital signal, and
wherein the touch detection unit inhibits the LGM-disturbance-signal-related signal, which is converted into the digital signal, from the touch-position-related signal, which is converted into the digital signal.

15. A touch input device having a touch surface, the touch input device comprising:
a touch sensor comprising a plurality of first electrode columns having a plurality of first electrodes, and a plurality of second electrode columns having a plurality of second electrodes,
wherein one second electrode column is disposed at a left side based on each of the first electrode column of the plurality of first electrode columns, and another second electrode column is disposed at a right side,
wherein second electrodes comprised in the one second electrode column and another second electrodes comprised in the another second electrode column constitute the same channel,
wherein the second electrodes comprise a second-1 electrode, a second-2 electrode, a second-3 electrode and a second-4 electrode,
wherein the second-1 electrode, the second-2 electrode, the second-3 electrode, and the second-4 electrode are sequentially arranged in a column direction,
wherein the second-1 electrode and the second-4 electrode are configured in the same channel,
wherein the second-2 electrode and the second-3 electrode are configured in the same channel, and
wherein the second-1 electrode and the second-2 electrode are different channels.

* * * * *